United States Patent [19]
Kondo

[11] Patent Number: 5,959,676
[45] Date of Patent: Sep. 28, 1999

[54] VIDEO SIGNAL ENCODING METHOD, VIDEO SIGNAL ENCODING APPARATUS, VIDEO SIGNAL TRANSMITTING METHOD, AND RECORDING MEDIUM

[75] Inventor: Tetsujiro Kondo, Kanagawa, Japan

[73] Assignee: Sony Corporation, Tokyo, Japan

[21] Appl. No.: 08/771,164

[22] Filed: Dec. 20, 1996

[30] Foreign Application Priority Data

Dec. 27, 1995 [JP] Japan .................................. 7-351861

[51] Int. Cl.⁶ .................................................. H04N 7/32
[52] U.S. Cl. ........................ 348/421; 348/405; 348/409; 348/420
[58] Field of Search .................................. 348/384, 390, 348/400, 405, 409–412, 415, 420, 421, 424, 458; 382/232, 236, 238, 240, 251; 386/109; H04N 7/24, 7/32

[56] References Cited

U.S. PATENT DOCUMENTS

| | | | |
|---|---|---|---|
| 5,598,214 | 1/1997 | Kondo et al. | 348/424 |
| 5,663,764 | 9/1997 | Kondo et al. | 348/421 |
| 5,703,652 | 12/1997 | Kondo et al. | 348/421 |
| 5,734,433 | 3/1998 | Kondo et al. | 348/405 |
| 5,796,438 | 8/1998 | Hosono | 348/458 |
| 5,825,313 | 10/1998 | Kondo et al. | 348/421 |
| 5,859,667 | 1/1999 | Kondo et al. | 348/421 |

Primary Examiner—Richard Lee
Attorney, Agent, or Firm—Frommer Lawrence & Haug, LLP.; William S. Frommer

[57] ABSTRACT

In a video signal encoding method and apparatus, a video signal transmitting method, and the recording medium, hierarchical encoding of image data implies problems in that a compressing efficiency is reduced as the number of hierarchical levels is increased and that the image quality is degraded particularly in lower-level hierarchical images. After data D31, D33, D35 at respective hierarchical levels are generated by an average value calculation, pixel data which can be restored by arithmetic operations using pixel data at adjacent higher hierarchical levels and pixel data at their own hierarchical levels are thinned, and higher-level hierarchical data are compressively coded with larger numbers of quantization bits. Since the amount of pixel data to be transmitted can be reduced by the thinning, it is possible to suppress an increase in number of pixels to be transmitted, caused by the hierarchical structure. In addition, higher-level hierarchical data are assigned larger numbers of quantization bits, so that degradation in image quality due to quantization errors at the higher hierarchical levels can be reduced in lower-level hierarchical images.

26 Claims, 23 Drawing Sheets

FIG. 4A
$Z_{11}$    $Z_{15}$
$Z_{51}$    $Z_{55}$
FIG. 4B
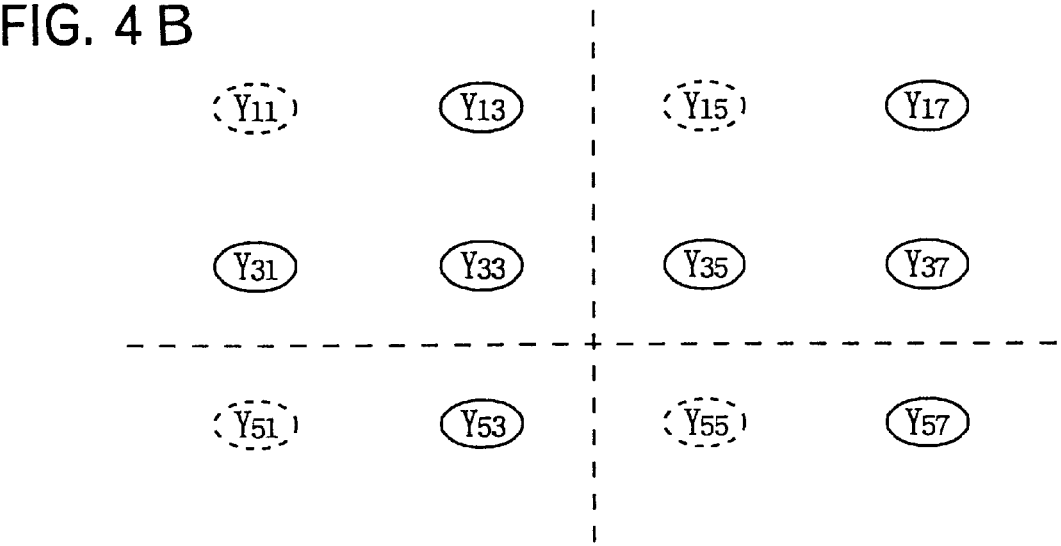
FIG. 4C
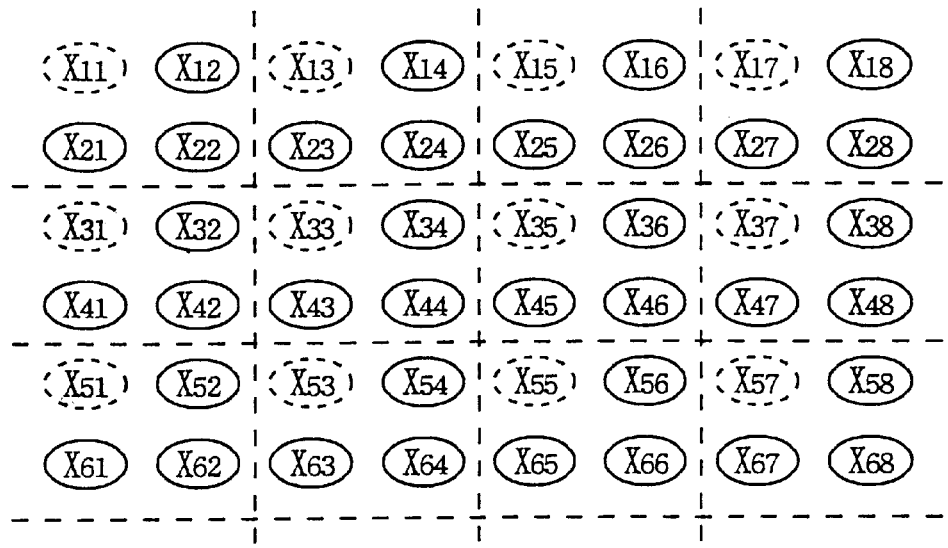

| | $Z_{11}'$ | $Y_{11}'$ | $Y_{13}'$ | $Y_{31}'$ | $Y_{33}'$ | $X_{11}'$ | $X_{12}'$ | $X_{21}'$ | $X_{22}'$ | $X_{13}'$ | $X_{14}'$ | $X_{23}'$ | $X_{24}'$ | $X_{31}'$ | $X_{32}'$ | $X_{41}'$ | $X_{42}'$ |
|---|---|---|---|---|---|---|---|---|---|---|---|---|---|---|---|---|---|
| $E(Z_{11})$ | 1 | 4 | | | | 16 | | | | | | | | | | | |
| $E(Y_{13})$ | | -1 | 1 | | | -4 | | | | | | | | | | | |
| $E(Y_{31})$ | | -1 | | 1 | | -4 | | | | 4 | | | | | | | |
| $E(Y_{33})$ | | -1 | | | 1 | -4 | | | | | | | | 4 | | | |
| $E(X_{12})$ | | | | | | -1 | 1 | | | | | | | | | | |
| $E(X_{21})$ | | | | | | -1 | | 1 | | | | | | | | | |
| $E(X_{22})$ | | | | | | -1 | | | 1 | | | | | | | | |
| $E(X_{14})$ | | | | | | | | | | -1 | 1 | | | | | | |
| $E(X_{23})$ | | | | | | | | | | -1 | | 1 | | | | | |
| $E(X_{24})$ | | | | | | | | | | -1 | | | 1 | | | | |
| $E(X_{32})$ | | | | | | | | | | | | | | -1 | 1 | | |
| $E(X_{41})$ | | | | | | | | | | | | | | -1 | | 1 | |
| $E(X_{42})$ | | | | | | | | | | | | | | -1 | | | 1 |

FIG. 6

VIDEO SIGNAL ENCODING METHOD, VIDEO SIGNAL ENCODING APPARATUS, VIDEO SIGNAL TRANSMITTING METHOD, AND RECORDING MEDIUM

BACKGROUND OF THE INVENTION

1. Field of the Invention

This invention relates to a video signal encoding method, a video signal encoding apparatus, a video signal transmitting method, and a recording medium in which the encoded data generated by the video signal encoding method or apparatus have been recorded, and more particularly is applicable to the case where predetermined image data are divided into a plurality of hierarchical image data respectively having different resolutions and the plurality of hierarchical image data are encoded respectively to generate encoded data (i.e., image data is hierarchically encoded).

2. Description of the Related Art

Conventionally, in a video signal encoding apparatus of the type mentioned above, high resolution input image data is defined as first hierarchical image data, and second hierarchical data having a resolution lower than that of the first hierarchical data, third hierarchical data having a resolution lower than that of the second hierarchical data, and so on are sequentially formed from the first hierarchical image data. Then, the plurality of hierarchical data are compressively coded, respectively. Therefore, hierarchically encoded data are formed for a plurality of levels having gradually reduced amounts of information. The plurality of hierarchically encoded data are transmitted through a communication path or a recording/reproducing path.

A video signal decoding apparatus which decodes the plurality of hierarchically encoded data is capable of entirely decoding the plurality of hierarchically encoded data as well as selectively decoding a desired one of the hierarchically encoded data in accordance with the resolution or the like of a television monitor corresponding thereto. In this way, when desired hierarchical data only is decoded from a plurality of hierarchical data, desired image data may be produced with a minimally required amount of transmitted data.

Referring now to FIG. 1, a video signal encoding apparatus 1 for realizing, for example, four levels of encoding as the hierarchical encoding comprises thinning filters 2, 3, 4 and interpolation filters 5, 6, 7 at three stages, wherein input image data D1 is processed by the thinning filters 2, 3, 4 at the respective stages to form reduced image data D2, D3, D4 having sequentially lower resolutions, and the interpolation filters 5, 6, 7 restore the reduced image data D2, D3, D4 to have their original resolutions before the reduction.

The outputs D2 to D4 of the respective thinning filters 2 to 4 and outputs D5 to D7 of the respective interpolation filters 5 to 7 are inputted to differential filters 8, 9, 10, respectively, to generate differential data D8, D9, D10. Since the frequency distribution of the differential data D8 to D10 concentrate in the vicinity of zero, the video signal encoding apparatus 1 can reduce the amounts of respective hierarchical data as well as the signal power thereof. Further, the runlength coding or Hoffman coding, etc. is used so as to reduce the amounts of data. Here, the differential data D8 to D10 and the reduced image data D4 are in a dimensional relationship in which the differential data D9, D10 and the reduced image data D4 respectively have sizes equal to, a quarter of, and a sixteenth of the size of the input image data D1.

The differential data D8 to D10 generated by the differential circuits 8 to 10 and the reduced image data D4 generated by the thinning filters 2 to 4 are encoded or compressed by encoders 11, 12, 13, 14, respectively. As a result, first, second, third, and fourth hierarchical data D11, D12, D13, D14 having different resolutions from each other are sent from the respective encoders 11, 12, 13, 14 to a communication path in a predetermined order or are recorded in a recording medium through the transmission path.

The first to fourth hierarchical data D11 to D14 thus transmitted are decoded by a video signal decoding apparatus 20 illustrated in FIG. 2. Specifically, the first to fourth hierarchical data D11 to D14, which are supplied from the communication path or the recording medium via an input terminal, are decoded by decoders 21, 22, 23, 24, respectively, and as a result, the decoded fourth hierarchical data D24 is outputted from the decoder 24.

An output of the decoder 23 is added to interpolation data for the fourth hierarchical data D24 generated by an interpolation filter 26 in an adder circuit 29 to restore third hierarchical data D23. Similarly, an output of the decoder 22 is added to interpolation data for third hierarchical data D23 generated by an interpolation filter 27 in an adder circuit 30 to restore second hierarchical data D22. Further, an output of the decoder 21 is added to interpolation data for second hierarchical data D22 generated by an interpolation filter 28 in an adder circuit 31 to restore first hierarchical data D21.

However, in the video signal encoding apparatus 1 for realizing the hierarchical encoding as mentioned above, the input image data D1 is divided into a plurality of hierarchical data for the encoding, so that the amount of data to be transmitted is necessarily increased by the number of hierarchical levels. Thus, the video signal encoding apparatus 1 has a problem that its compressing efficiency is correspondingly reduced as compared with a highly efficient encoding scheme which does not employ the hierarchical encoding.

In the video signal decoding apparatus 20, in turn, the hierarchical data D24, D23, D22, D21 are orderly restored from the highest hierarchical data toward the lowest hierarchical data. Stated another way, lower level hierarchical data is restored based on restored higher level hierarchical data. Thus, the video signal decoding apparatus 20 has a problem that when the encoded higher level hierarchical data such as D14 and D13 are decoded, if errors due to the compressive coding are included in the decoded data, the compressive coding errors are propagated to the decoded lower level hierarchical data D21, D22 for which a high resolution is essentially desired, and a deteriorated image quality due to the compressive coding errors prominently appears in the restored lower level hierarchical data.

SUMMARY OF THE INVENTION

In view of the foregoing, an object of this invention is to provide a video signal encoding method and apparatus, a video signal transmitting method, and the recording medium in which the encoded data encoded by the video signal encoding method or the apparatus is recorded, which can improve a compressing efficiency when image data is hierarchically encoded as well as reduce deterioration in image quality.

The foregoing object and other objects of the invention have been achieved by the provision of a video signal encoding method or apparatus for generating from input image data a plurality of hierarchical image data with different resolutions to encode each of the hierarchical image data. The video signal encoding method or apparatus comprises: a step or unit for averaging a plurality of pixel values in each hierarchical image data to form higher hierarchy image data; a step or unit for excluding from the pixel data in each hierarchy other than the top hierarchy with the lowest resolution, pixel data corresponding to one of a plurality of lower hierarchy pixels used in the same averaging operation to generate one pixel for a higher hierarchy in order to form thinned-out data formed of the remaining pixels; and a quantization step or unit for compression-coding each of the top hierarchy image data and the thinned-out data in respective hierarchies except the top hierarchy to generate a plurality of hierarchical coded data, wherein the quantization step or unit quantizes the data in higher hierarchies more finely.

Further, this invention provides a video signal encoding method or apparatus for generating from input image data a plurality of hierarchical image data with different resolutions to encode each of the hierarchical image data. The video signal encoding method or apparatus comprises: a step or unit for averaging a plurality of image values in each hierarchical image data to form higher hierarchy image data; a step or unit for calculating the differential between each hierarchical image data other than the top hierarchy with the lowest resolution and the image data in the adjacent higher hierarchy to form hierarchical differential data; a step or unit for excluding from the hierarchical differential data in each hierarchy, differential pixel data that can be recovered by a mathematics operation using the differential data in one hierarchy and in the adjacent higher hierarchy in order to form thinned-out data formed of the remaining pixels; and a quantization step or unit for compression-coding each of the top hierarchy image data and the thinned-out data in respective hierarchies except the top hierarchy to generate a plurality of hierarchical coded data. The quantization step or unit quantizes the data in higher hierarchies more finely.

Further, this invention provides a video signal encoding method or apparatus for generating from input image data a plurality of hierarchical image data with different resolutions to encode each of the hierarchical image data. The video signal encoding method or apparatus comprises: a step or unit for averaging a plurality of pixel values in each hierarchical image data to form higher hierarchy image data; a step or unit for excluding from the pixel data in each hierarchy other than the top hierarchy with the lowest resolution, pixel data corresponding to one of a plurality of lower hierarchy pixels used in the same averaging operation to generate one pixel for a higher hierarchy in order to form thinned-out data formed of the remaining pixels; and a quantization step or unit for compression-coding each of the top hierarchy image data and the thinned-out data in respective hierarchies except the top hierarchy to generate a plurality of hierarchical coded data. Depending on the polarity of the quantization error occurring when quantizing the image data in the top hierarchy, the quantization step or unit controls the quantization characteristics used in quantizing lower hierarchy pixel data spatially corresponding to a top hierarchy pixel in such a way that the quantization error will have the same polarity as in the quantization of the top hierarchy pixel data.

Further, this invention provides a video signal encoding method or apparatus for generating from input image data a plurality of hierarchical image data with different resolutions to encode each of the hierarchical image data. The video signal encoding method or apparatus comprises: a step or unit for averaging a plurality of pixel values in each hierarchical image data to form higher hierarchy image data; a step or unit for calculating the differential between each hierarchical image data other than the top hierarchy with the lowest resolution and the image data in the adjacent higher hierarchy to form hierarchical differential data; a step or unit for excluding from the hierarchical differential data in each of the hierarchies, differential pixel data that can be recovered by a mathematics operation using the differential data in one hierarchy and in the adjacent higher hierarchy in order to form thinned-out data formed of the remaining pixels; and a quantization step or unit for compression-coding each of the top hierarchy image data and the thinned-out data in respective hierarchies except the top hierarchy to generate a plurality of hierarchical coded data. Depending on the polarity of the quantization error occurring when quantizing the image data in the top hierarchy, the quantization step or unit controls the quantization characteristics used in quantizing lower hierarchy pixel data corresponding to a top hierarchy pixel in such a way that the quantization error will have the same polarity as in the quantization of the top hierarchy pixel data.

Further, this invention provides a video signal encoding method or apparatus for generating from input image data a plurality of hierarchical image data with different resolutions to encode each of the hierarchical image data. The video signal encoding method or apparatus comprises: a step or unit for averaging a plurality of pixel values in each hierarchical image data to form higher hierarchy image data; a step or unit for excluding from the image data in each hierarchy other than the top hierarchy with the lowest resolution, pixel data corresponding to one of a plurality of lower hierarchy pixels used in the same averaging operation to generate one pixel for a higher hierarchy in order to form thinned-out data formed of the remaining pixels; and a quantization step or unit for compression-coding each of the top hierarchy image data and the thinned-out data in respective hierarchies except the top hierarchy to generate a plurality of hierarchical coded data. The quantization step or unit quantizes the image data in at least one hierarchy in such a manner that the polarity of the quantization errors in adjacent pixel data is randomly inverted.

Further, this invention provides a video signal encoding method or apparatus for generating from input image data a plurality of hierarchical data with different resolutions to encode each of the hierarchical image data. The video signal encoding method or apparatus comprises: a step or unit for averaging a plurality of pixel values in each hierarchical image data to form higher hierarchy image data; a step or unit for calculating the differential between each hierarchical image data other than the top hierarchy with the lowest resolution and the image data in the adjacent higher hierarchy to form hierarchical differential data; a step or unit for excluding from the hierarchical differential data in each of the hierarchies, differential pixel data that can be recovered by a mathematics operation using the differential data in one hierarchy and in the adjacent higher hierarchy in order to form thinned-out data formed of the remaining pixels; and a quantization step or unit for compression-coding each of the top hierarchy image data and the thinned-out data in respective hierarchies except the top hierarchy to generate a plurality of hierarchical coded data. The quantization step or unit quantizes the pixel data or differential pixel data in at least one hierarchy in such a manner that the polarity of the quantization errors in adjacent pixel data or differential pixel data is randomly inverted.

Further, this invention provides a video signal encoding method or apparatus for generating from input image data a plurality of hierarchical image data with different resolutions to encode each of the hierarchical image data. The video signal encoding method or apparatus comprises: a step or unit for averaging a plurality of pixel values in each hierarchical image data to form higher hierarchy image data; a step or unit for excluding from the pixel data in each hierarchy other than the top hierarchy with the lowest resolution, pixel data corresponding to one of a plurality of lower hierarchy pixels used in the same averaging operation to generate one pixel for a higher hierarchy in order to form thinned-out data formed of the remaining pixels; and a quantization step or unit for compression-coding each of the top hierarchy image data and the thinned-out data in respective hierarchies except the top hierarchy to generate a plurality of hierarchical coded data. Taking into consideration the effects of the propagation of quantization errors occurring during the recovery of the lower hierarchy pixel data, the quantization step or unit controls the quantization characteristics used for each pixel in such a way that the effects of the propagated quantization errors will be generally minimized.

Further, this invention provides a video signal encoding method or apparatus for generating from input image data a plurality of hierarchical image data with different resolutions to encode each of the hierarchical image data. The video signal encoding method or apparatus comprises: a step or unit for averaging a plurality of pixel values in each hierarchical image data to form higher hierarchy image data; a step or unit for calculating the differential between each hierarchical image data other than the top hierarchy with the lowest resolution and the image data in the adjacent higher hierarchy to form hierarchical differential data; a step or unit for excluding from the hierarchical differential data in each of the hierarchies, differential pixel data that can be recovered by a mathematics operation using the differential data in one hierarchy and in the adjacent higher hierarchy in order to form thinned-out data formed of the remaining pixels; and a quantization step or unit for compression-coding each of the top hierarchy image data and the thinned-out data in respective hierarchies except the top hierarchy to generate a plurality of hierarchical coded data. Taking into consideration the effects of the propagation of quantization errors occurring during the recovery of the lower hierarchy pixel data, the quantization step controls the quantization characteristics used for each pixel in such a way that the effects of the propagated quantization errors will be generally minimized.

Furthermore, this invention provides a video signal transmitting methods respectively comprising a transmitting step for transmitting the transmission image data encoded by the video signal encoding methods or apparatuses described above.

Furthermore, this invention provides a recording mediums respectively having a recording signal formed by the video signal encoding methods or apparatuses described above.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A, 4B, and 4C are diagrams explaining the formation of hierarchy and pixels to be transmitted;

FIG. 6 is a table showing the influence of quantization errors at respective hierarchical levels exerting on restored pixels at the respective hierarchical levels;

DETAILED DESCRIPTION OF THE EMBODIMENT

Preferred embodiments of this invention will be described with reference to the accompanying drawings:

(1) First Embodiment

Figure 1:
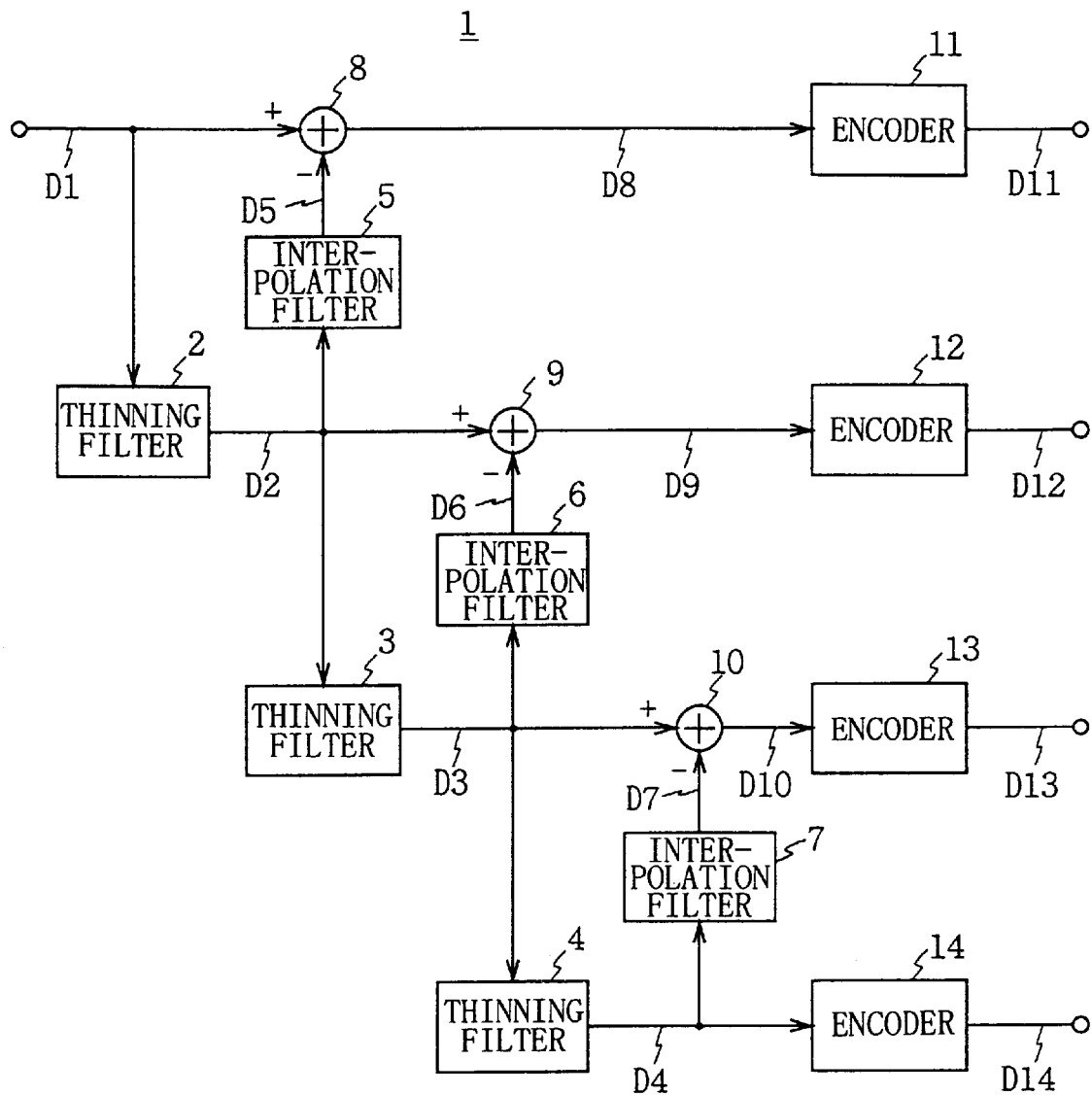
FIG. 1 is a block diagram showing the configuration of a video signal encoding apparatus for realizing hierarchical encoding relating to the present invention.
Figure 2:
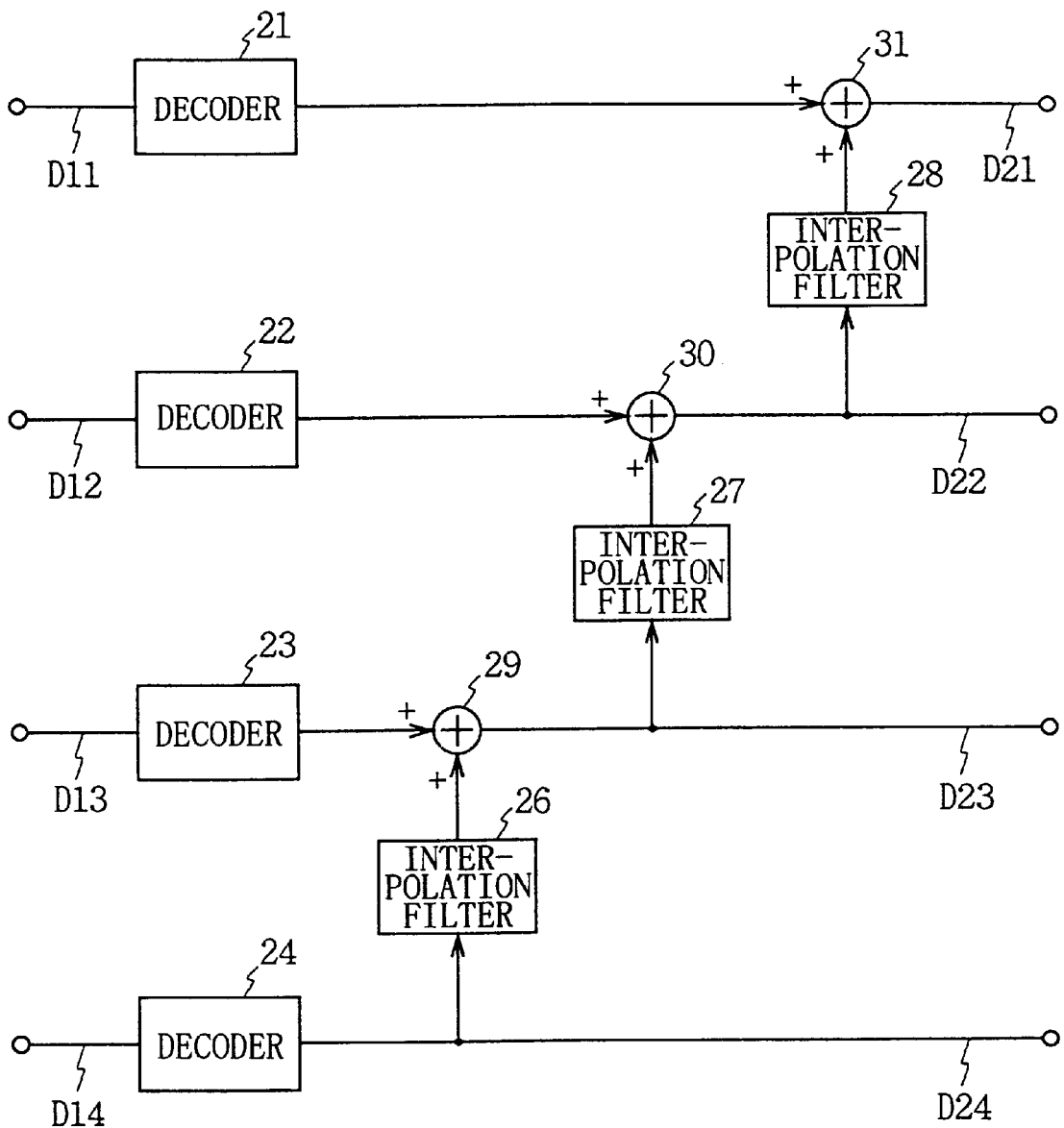
FIG. 2 is a block diagram showing the configuration of a conventional video signal decoding apparatus for decoding hierarchically encoded data.
Figure 3:
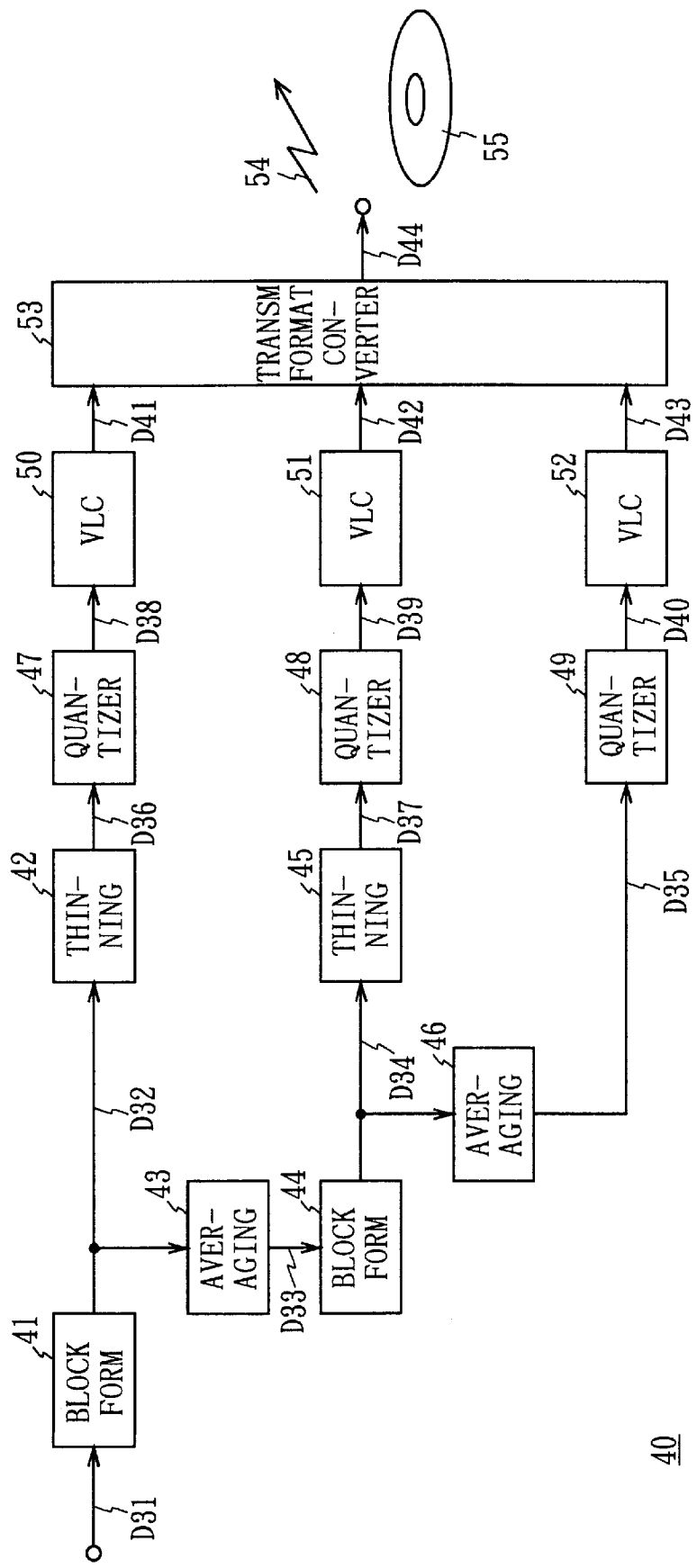
FIG. 3 is a block diagram showing the configuration of a video signal encoding apparatus according to a first embodiment.

FIG. 3 shows a video signal encoding apparatus 40 according to a first embodiment as a whole. The embodiment shows how hierarchical data are formed at three levels and compressively coded for transmission. The video signal encoding apparatus 40 divides, for example, high resolution 16-bit input image data D31 (hereinafter called the "first-level hierarchical image data") into small blocks each having two lines by two pixels in a block formation circuit 41 to form first-level hierarchical block data D32 which is sent to a thinning circuit 42 and an averaging circuit 43.

The averaging circuit 43 averages pixel values of respective blocks in the block data D32 to generate second-level hierarchical image data D33 which is reduced to a quarter of that of the input image data D31. The second-level hierarchical image data D33 are sent to a block formation circuit 44. The block formation circuit 44, similarly to the block formation circuit 41, divides the second-level hierarchical image data D33 into small blocks each having two lines by two pixels to form second-level hierarchical block data D34 which are sent to a thinning circuit 45 and an averaging circuit 46.

The averaging circuit 46, similarly to the averaging circuit 43, averages pixel values in respective blocks of the block data D34 to generate third-level hierarchical image data D35 which is reduced to a quarter of the second-level hierarchical image data D33, i.e., one sixteenth of the first-level hierarchical image data D31. Specifically, regarding to the averaging processing, the averaging circuit 43 calculates an average value of four pixels (for example, $X_{11}$, $X_{12}$, $X_{21}$, $X_{22}$) in a block in the first-level hierarchical image data D31, as indicated by broken lines in FIG. 4C, in accordance with the following equation:

$$Y_{11} = \frac{X_{11} + X_{12} + X_{21} + X_{22}}{4} \quad (1)$$

and generates a pixel at the second hierarchical level (for example $Y_{11}$) shown in FIG. 4B. Likewise, pixels $Y_{13}$, $Y_{31}$, . . . , are also generated by averaging four pixels in associated blocks in the first-level hierarchical image data D31.

Similarly, the averaging circuit 46 calculates an average value of four pixels (for example, $Y_{11}$, $Y_{13}$, $Y_{31}$, $Y_{33}$) in a block in the second-level hierarchical image data D33, as shown in FIG. 4B, in accordance with the following equation:

$$Z_{11} = \frac{Y_{11} + Y_{13} + Y_{31} + Y_{33}}{4} \quad (2)$$

and generates a pixel (for example, $Z_{11}$) at the third hierarchical level shown in FIG. 4A. Likewise, pixels $Z_{15}$, $Z_{51}$, . . . are also generated by averaging four pixels in associated blocks in the second-level hierarchical image data D33.

The thinning circuits 42, 45 receive the block data D32 from the block formation circuit and the block data D34 from the block formation circuit 44, and remove one pixel in each of blocks formed of four pixels in the block data D32, D34, respectively, to form thinned data D36, D37 comprising blocks each formed of three pixels excepting the removed pixel. The thinned data D36, D37 are sent to quantizer circuits 47, 48, respectively. Specifically, the thinning circuit 42 removes pixels $X_{11}$, $X_{13}$, . . . , as indicated by broken lines in FIG. 4C by thinning, while the thinning circuit 45 removes pixels $Y_{11}$, $Y_{15}$, . . . , as indicated by broken lines in FIG. 4B by thinning.

Thus, pixels subjected to quantization in the first hierarchical level quantizer circuit 47 and the second hierarchical level quantizer circuit 48 are pixels $X_{12}$, $X_{21}$, $X_{22}$, . . . and $Y_{13}$, $Y_{31}$, $Y_{33}$, . . . indicated by solid lines in FIGS. 4B and 4C. The number of pixels to be transmitted at the first hierarchical level is reduced to three quarters, as compared with the case where all pixels at the first hierarchical level are quantized and transmitted. Also, the number of pixels to be transmitted at the second hierarchical levels is reduced to three quarters, as compared with the case where all pixels generated by the average value calculation are quantized and transmitted.

In this way, the video signal encoding apparatus 40 can generally transmit image data at a plurality of hierarchical levels with a number of pixels equal to the number of pixels when the first-level hierarchical image data D31 only is compressed and transmitted. As a result, the video signal encoding apparatus 40 can transmit image data at a plurality of hierarchical levels without increasing the amount of information to be transmitted. In addition, the pixels thinned by the thinning circuits 42, 45 can be restored on the decoding side (receiver), later described, using a simple arithmetic equation.

The first hierarchical level quantizer circuit 47 compresses each pixel (e.g., 16 bits) of the first-level hierarchical thinned data D36 by requantizing it, for example, with one bit, and sends requantized data D38 to a variable length coding circuit (VLC) 50. The second hierarchical level quantizer circuit 48 requantizes each pixel (e.g., 16 bits) of the second-level hierarchical thinned data D37, for example, with four bits to generate requantized data D39 which is sent to a variable length coding circuit 51. Also, a third hierarchical level quantizer circuit 49 requantizes each pixel (e.g., 16 bits) of the third-level hierarchical image data D35, for example, with 16 bits to generate requantized data D40 which is sent to a variable length coding circuit 52.

In this way, the video signal encoding apparatus 40 according to the first embodiment of this invention assigns larger numbers of quantization bits to data at higher hierarchical levels for requantization (in other words, narrower quantization widths are assigned to higher-level hierarchical data), so that quantization errors, arising during the requantization, are reduced more in higher-level hierarchical data.

The variable length coding circuit 50 to 52 assign shorter Hoffman codes to the requantized data D38 to D40 with quantization codes having larger generation frequencies to form first-level hierarchical encoded data D41, second-level hierarchical encoded data D42, and third-level hierarchical encoded data D43 which represent the requantized data D38 to D40, respectively, with the smallest possible amounts of codes. The first-, second-, and third-level hierarchical encoded data D41 to D43 are sent to a transmission format converter circuit 53.

The transmission format converter circuit 53 arranges the first-level hierarchical encoded data D41, the second-level hierarchical encoded data D42, and the third-level hierarchical encoded data D43 in a predetermined order and adds identification codes to them for identifying the hierarchical level of the respective hierarchical encoded data to form transmission image data D44 which is outputted. Thereafter, the output transmission image data D44 is supplied to a receiver side through a communication path 54 or is recorded in a recording medium 55 such as a disc, a tape, or a semiconductor memory through a recording transmission path.

Figure 5:
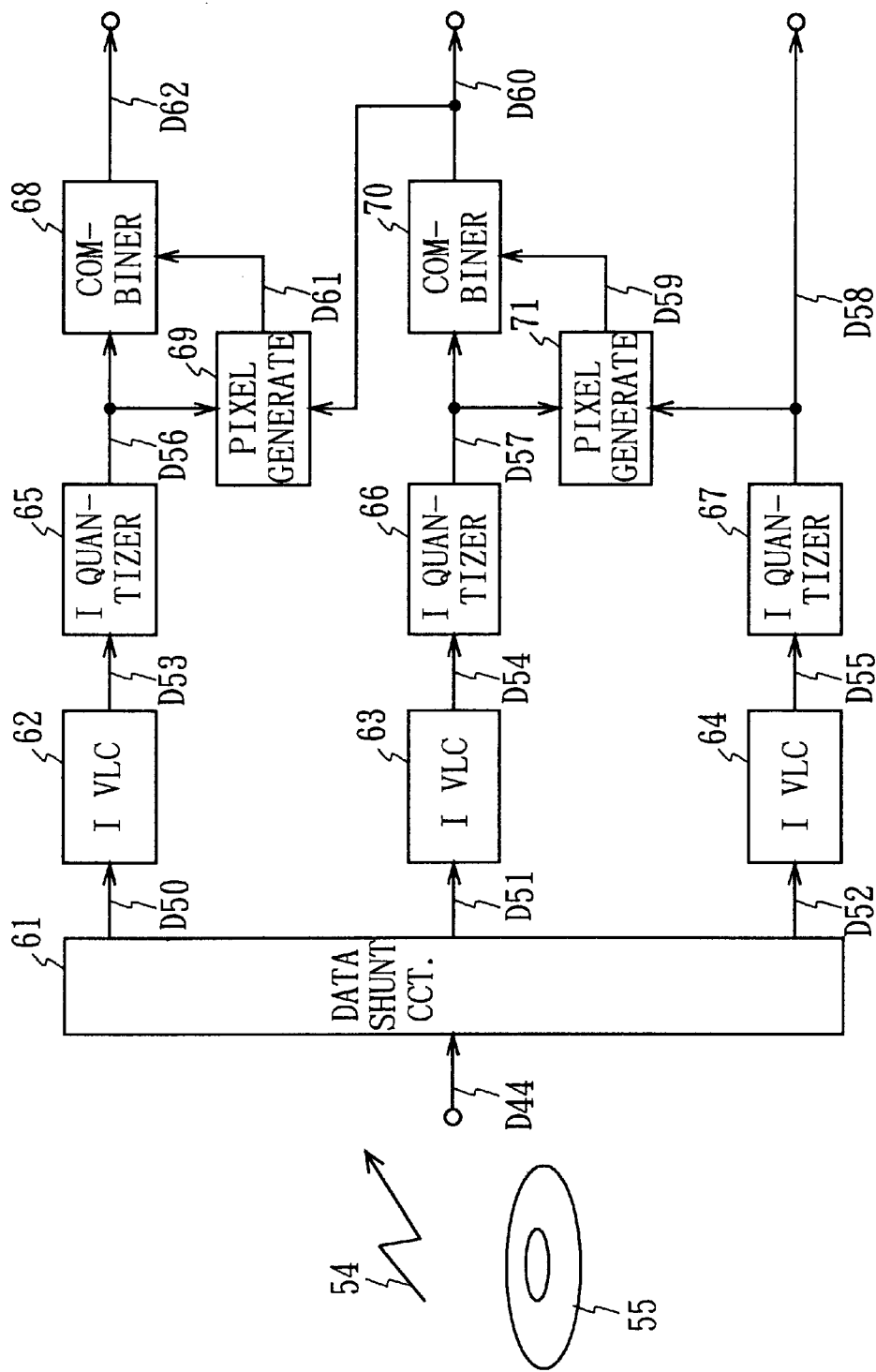
FIG. 5 is a block diagram showing the configuration of a video signal decoding apparatus according to the first embodiment.

A video signal decoding apparatus 60 for decoding the transmission image data D44 thus formed can be configured as shown in FIG. 5. The video signal decoding apparatus 60 inputs the transmission image data D44 which is supplied through the communication path 54 or reproduced from the recording medium through a reproducing transmission path to a data shunt circuit 61. The data shunt circuit 61 has a switching circuit (not shown) which divides the transmission image data D44 into first-level hierarchical encoded data D50, second-level hierarchical encoded data D51, and third-level hierarchical encoded data D52 with reference to the identification codes of the respective hierarchical levels included in the transmission image data D44. The divided first-, second-, and third-level hierarchical encoded data D51 to D53 are sent to inverse variable length coding circuits (IVLC) 62, 63, 64, respectively.

The inverse variable length coding circuit 62, 63, 64 respectively perform processing reverse to that of the aforementioned variable length coding circuits 50, 51, 52 to convert the first-level hierarchical encoded data D50, the second-level hierarchical encoded data D51, and the third-level hierarchical encoded data D52, represented by Hoffman codes, to requantized data D53, D54, D55 represented by requantization codes. Then, the requantized data D53, D54, D55 are sent to inverse quantizer circuits 65, 66, 67, respectively.

The inverse quantizer circuit 65 inversely quantizes the requantized data D53, processed by the quantizer circuit 47 shown in FIG. 3 to have one bit per pixel, e.g., to 16-bit data to generate decoded first-level hierarchical thinned data D56 which is sent to a combiner circuit 68 and a pixel generator circuit 69. The inverse quantizer circuit 66 inversely quantizes the requantized data D54, processed by the quantizer circuit 48 shown in FIG. 3 to have four bits per pixel, e.g., to 16-bit data to generate decoded second-level hierarchical thinned data D57 which is sent to a combiner circuit 70 and a pixel generator circuit 71.

The inverse quantizer circuit 67 outputs the requantized data D55, processed by the quantizer circuit 49 shown in FIG. 3 to have 16 bits per pixel, e.g., as unchanged 16-bit data to provide decoded third-level hierarchical image data D58 which is sent, for example, to a low resolution television monitor having a less number of pixels as well as to a pixel generator circuit 71 through an output terminal.

The image generator circuit 71 uses the decoded third-level hierarchical image data D58 and the decoded second-level hierarchical thinned data D57 to restore the second-level hierarchical pixels thinned by the thinning circuit 45 in the video signal encoding apparatus 40 shown in FIG. 3 (i.e., pixels indicated by broken lines in FIG. 4B). For example, the second-level hierarchical pixel $Y_{11}$ removed by the thinning may be restored by a calculation expressed by the following equation:

$$Y_{11}=4\times Z_{11}-Y_{13}-Y_{31}-Y_{33} \quad (3)$$

Similarly, the higher-level hierarchical pixels generated by the averaging and pixels which have been used for generating the higher-level hierarchical pixels and have not been thinned are used to restore all the thinned pixels.

The combiner circuit 70 inserts the restored second-level hierarchical pixel data D59 into the decoded second-level hierarchical thinned data D57 at predetermined position, and combines the restored second-level hierarchical pixel data D59 and the decoded second-level hierarchical thinned data D57 to form decoded second-level hierarchical image data D60 which is sent, for example, to a television monitor having a moderate number of pixels as well as to a pixel generator circuit 69 through an output terminal.

The image generator circuit 69 uses the decoded second-level hierarchical pixel data D60 and the decoded first-level hierarchical thinned data D56 to restore the first-level hierarchical pixels thinned by the thinning circuit 42 in the video signal encoding apparatus 40 shown in FIG. 3 (i.e., pixels indicated by broken lines in FIG. 4C). For example, the first-level hierarchical pixel $X_{11}$ removed by the thinning can be restored by a calculation expressed by the following equation:

$$X_{11}=4\times Y_{11}-X_{12}-X_{21}-X_{22} \quad (4)$$

Similarly, the higher-level hierarchical pixels generated by the averaging and pixels which have been used for generating the higher-level hierarchical pixels and have not been thinned are used to restore all the thinned pixels.

The combiner circuit 68 inserts the restored first-level hierarchical pixel data D61 into the decoded first-level hierarchical thinned data D56 at predetermined positions, and combines the restored first-level hierarchical pixel data D61 and the decoded first-level hierarchical thinned data D56 to form decoded first-level hierarchical image data D62 which is sent, for example, to a high-vision television monitor having a large number of pixels for display through an output terminal.

In the configuration described above, the video signal encoding apparatus 40 generates image data D31, D33, D35 at a plurality of hierarchical levels by calculating average values of plural pixels at lower hierarchical levels to generate higher-level hierarchical pixels.

In addition, the video signal encoding apparatus 40 removes a pixel used in the same average value calculation, from pixels to be transmitted, for hierarchical image data except for the highest hierarchical level (i.e., the third-level hierarchical image data) because such pixels can be restored by simple arithmetic operations in the decoding side. As a result, the video signal encoding circuit 40 can realize hierarchical encoding processing without an increase in the number of pixels to be transmitted, which would be otherwise caused by the hierarchical data structure.

Incidentally, the video signal encoding apparatus 40 requantizes image data the respective hierarchical levels by the quantizer circuits 47 to 49 to compress the amounts of data at the respective hierarchical levels. As a result, the respective requantized data D38, D39, D40 necessarily have values including quantization errors generated during the requantization. As the quantization errors are larger, the decoded image data D58, D60, D62 deviate more from true values to result in a degraded image quality.

To attend to this problem, it will be better to consider the influence of the quantization errors on data at the respective hierarchical levels in the video signal encoding apparatus 40 and the image data decoding apparatus 60. Assuming here that decoded values of respective pixels $Z_{11}$, $Y_{11}$, . . . are designated by $Z_{11}'$, $Y_{11}'$, . . . , true values by $Z_{11}$, $Y_{11}$, . . . , and quantization errors by $E(Z_{11})$ $E(Y_{11})$, . . . , the decoded value $Z_{11}'$ of the third-level hierarchical pixel $Z_{11}$ restored by the inverse quantizer circuit 67, for example, is expressed by the following equation:

$$Z_{11}'=Z_{11}+E(Z_{11}) \quad (5)$$

Also, decoded values $Y_{13}'$, $Y_{31}'$, $Y_{33}'$ of second-level hierarchical pixels $Y_{13}$, $Y_{31}$, $Y_{33}$ restored by the inverse quantizer circuit 66 are expressed by the following equations:

$$Y_{13}'=Y_{13}+E(Y_{13})$$

$$Y_{31}'=Y_{31}+E(Y_{31})$$

$$Y_{33}'=Y_{33}+E(Y_{33}) \quad (6)$$

However, since the second-level hierarchical pixel $Y_{11}$ restored by the image generator circuit 71 is generated by the equation (3), its decoded value $Y_{11}'$ is expressed by the following equation:

$$Y_{11}' = 4 \times Z_{11}' - Y_{13}' - Y_{31}' - Y_{33}' \quad (7)$$

$$= Y_{11} + 4 \times E(Z_{11}) - E(Y_{13}) - E(Y_{31}) - E(Y_{33})$$

It can be seen from the equation (7) that a quantization error associated with $Z_{11}$ influences the decoded value $Y_{11}'$ by a factor of four.

In addition, decoded values $X_{12}'$, $X_{21}'$, $X_{22}'$, $X_{14}'$, $X_{23}'$, $X_{24}'$ of first-level hierarchical pixels $X_{12}$, $X_{21}$, $X_{22}$, $X_{14}$, $X_{23}$, $X_{24}$ restored by the inverse quantizer circuit 65 are expressed by the following equations:

$$X_{12}' = X_{12} + E(X_{12})$$

$$X_{21}' = X_{21} + E(X_{21})$$

$$X_{22}' = X_{22} + E(X_{22})$$

$$X_{14}' = X_{14} + E(X_{14})$$

$$X_{23}' = X_{23} + E(X_{23})$$

$$X_{24}' = X_{24} + E(X_{24}) \quad (8)$$

On the other hand, since first-level hierarchical pixels $X_{13}$, $X_{31}$, $X_{33}$ restored by the pixel generator circuit 69 are generated based on the equation (4), their decoded values $X_{13}'$, $X_{31}'$, $X_{33}'$ are expressed by the following equations:

$$X_{13}' = 4 \times Y_{13}' - X_{14}' - X_{23}' - X_{24}' \quad (9)$$

$$= X_{13} + 4 \times E(Y_{13}) - E(X_{14}) - E(X_{23}) - E(X_{24})$$

$$X_{31}' = 4 \times Y_{31}' - X_{32}' - X_{41}' - X_{42}'$$

$$= X_{31} + 4 \times E(Y_{31}) - E(X_{32}) - E(X_{41}) - E(X_{42})$$

$$X_{33}' = 4 \times Y_{33}' - X_{34}' - X_{43}' - X_{44}'$$

$$= X_{33} + 4 \times E(Y_{33}) - E(X_{34}) - E(X_{43}) - E(X_{442})$$

It can be seen from the equation (9) that quantization errors associated with $Y_{13}$, $Y_{31}$, $Y_{33}$ influences the decoded values $X_{13}'$, $X_{31}'$, $X_{33}'$ by a factor of four.

Further, for the first-level hierarchical pixel $X_{11}$ restored by the pixel generator circuit 69 through the image generator circuit 71, its decoded value $X_{11}'$ is influenced by a quantization error associated with $Z_{11}$ by a factor of "16", in addition to the quantization errors associated with $Y_{13}$, $Y_{31}$, $Y_{33}$ which influence the decoded value $X_{11}'$ by a factor of four, as expressed by the following equation:

$$X_{11}' = 4 \times Y_{11}' - X_{12}' - X_{21}' - X_{22}' \quad (10)$$

$$= X_{11} + 4 \times E(Y_{11}) - E(X_{12}) - E(X_{21}) - E(X_{22})$$

$$= X_{11} + 16 \times E(Z_{11}) - 4 \times E(Y_{13}) - 4 \times E(X_{31}) -$$

$$4 \times E(Y_{33}) - E(X_{12}) - E(X_{21}) - E(X_{22})$$

FIG. 6 shows how respective quantization errors $E(Z_{11})$, $E(Y_{13})$, $E(Y_{31})$, ... influence respective decoded pixel values $Z_{11}'$, $Y_{11}'$, $Y_{13}'$, ... in a table form. As will be apparent from FIG. 6, quantization errors at higher hierarchical levels more largely influence decoded values at lower hierarchical levels.

In the present invention, taking into account the fact revealed from FIG. 4, quantizer circuits for quantizing higher-level hierarchical data perform finer quantization to reduce quantization errors possibly introduced into higher-level hierarchical data so that the degradation in image quality can be reduced in decoded pixels at lower hierarchical level. Specifically, as described above, quantization bits for the quantizer circuits 47, 48, 49 in the video signal encoding apparatus 40 are selected to be one bit, four bits, and 16 bits, respectively, to perform finer quantization for higher-level hierarchical data. In this case, the number of quantization bits is selected in consideration of the influence of the quantization errors at the higher hierarchical level given on the restored pixel value in recording the lower hierarchical data.

Further, the influence of the quantization errors at the higher hierarchical level on the lower hierarchical data relates to the number of hierarchical levels from the lowermost hierarchy and the number of pixels used in generating the higher hierarchical data. Accordingly, the number of quantization bits can be selected in accordance with the number of hierarchical levels from the lowermost hierarchy and the number of pixels used in generating the higher-level hierarchical data.

As a result, for example, considering the equation (10), the magnitude of the quantization error $E(Z_{11})$ is reduced to $\frac{1}{16}$ as much as the magnitude of the quantization errors $E(X_{12})$, $E(X_{21})$, $E(X_{22})$, and the magnitudes of the quantization errors $E(Y_{13})$, $E(Y_{31})$, $E(Y_{33})$ are reduced to a quarter of the magnitude of the quantization errors $E(X_{12})$, $E(X_{21})$, $E(X_{22})$. Thus, even if the magnitude of the quantization error $E(Z_{11})$ is increased by a factor of 16 and the magnitudes of the quantization errors $E(X_{12})$, $E(X_{21})$, $E(X_{22})$ are increased by a factor of four during a decoding operation, errors generated thereby are at most similar to the quantization errors $E(X_{12})$, $E(X_{21})$, $E(X_{22})$ directly generated from the inverse quantizer circuit 65. It is therefore possible to significantly reduce a degraded quality of images at lower hierarchical levels due to quantization distortion occurring at higher hierarchical level.

In the first embodiment, since the numbers of quantization bits are increased at higher hierarchical levels, the amount of information to be transmitted appears to be correspondingly increased. Actually, however, the number of pixels are reduced more at higher hierarchical levels so that an increase in the amount of information caused by larger numbers of quantization bits is limited to a practically ignorable degree.

Further, the above first embodiment has been dealt with the case where the number of quantization bits of the quantizer circuits 47, 48, 49 are selected by one bit, four bits, and sixteen bits, respectively and the above second embodiment has been dealt with the case where the number of quantization bits of the quantizer circuits 85, 86, 87 are selected by one bit, two bits, and four bits, respectively. However, this invention is not limited to this, but considering the influence of the quantization errors in the higher hierarchical data on the lower hierarchical data, as the hierarchical level of the quantizer circuit becomes higher, the number of quantization bits is larger (the quantization width is smaller) to quantize finely.

According to the foregoing configuration of the first embodiment, in the video signal encoding apparatus 40 which generates image data D31, D33, D35 at a plurality of hierarchical levels, having different resolutions from each other, from input image data D31 by an average calculation, and quantizes the respective image data D31, D33, D35 to generate encoded data D41, D42, D43 at a plurality of hierarchical levels, pixels $Y_{11, Y15}, \ldots, X_{11}, X_{13}, \ldots$, which can be restored by arithmetic operations using pixels at adjacent higher hierarchical levels and pixels at their own hierarchical levels, are omitted from pixels to be transmitted at respective hierarchical levels except for the highest hierarchical level. In addition, quantizer circuits for quantizing higher-level hierarchical data are designed to perform finer quantization. Thus, the amount of pixel information to be transmitted can be reduced to improve the compressing efficiency. Also, since lower-level hierarchical pixels are less influenced by quantization errors in higher-level hierarchical pixels, degradation in image quality can be reduced.

(2) Second Embodiment

Figure 7:
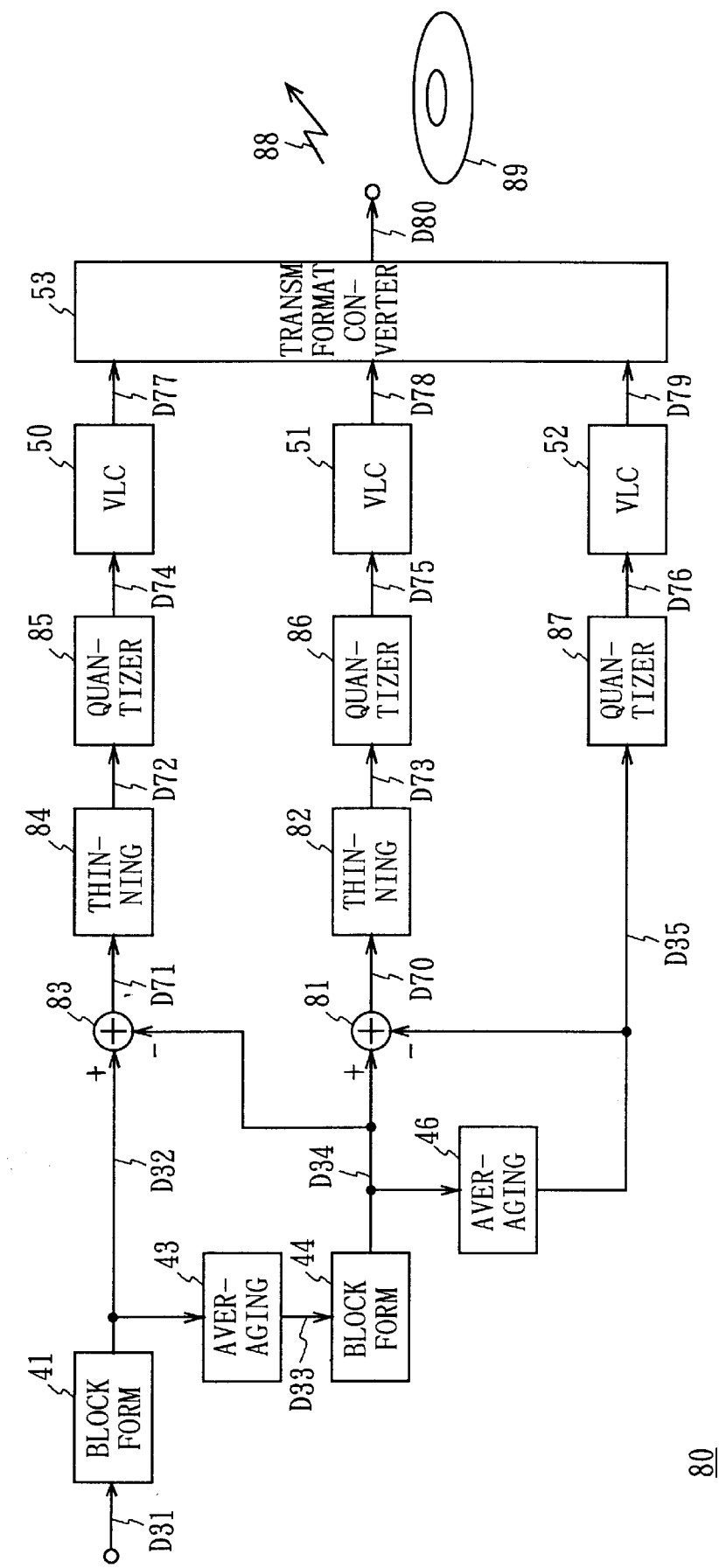
FIG. 7 is a block diagram showing the configuration of a video signal encoding apparatus according to a second embodiment.

FIG. 7 generally shows a video signal encoding apparatus 80 of a second embodiment. Comparing with the first embodiment, the video signal encoding apparatus 80 has a similar configuration to the video signal encoding apparatus 40 of FIG. 3 except that residues (differentials) of data between hierarchical levels other than the highest hierarchical level are compressively coded and that difference are introduced in the assignment of quantization bits to quantizer circuits. Accordingly, parts corresponding to those in FIG. 3 are designated by the same reference numerals.

Specifically, while the video signal encoding apparatus 40 of the first embodiment transmits each pixel in a pulse code modulation (PCM) form, the video signal encoder apparatus 80 of the second embodiment transmits each pixel in a differential pulse code modulation (DPCM) form. In this way, the video signal encoding apparatus 80 can more largely reduce the amount of information to be transmitted.

Specifically explaining, the video signal encoding apparatus 80 supplies third-level hierarchical image data D35 and second-level hierarchical block data D34 to a differential circuit 81 which calculates a differential between spatially corresponding pixels in the third-level hierarchical image data D35 and the second-level hierarchical block data D34 to form second-level hierarchical differential data D70 which is sent to a thinning circuit 82. In this event, the differential circuit 81 calculates differential values $\Delta Y_{13}$, $\Delta Y_{31}$, $\Delta Y_{33}$ of second-level hierarchical pixels $Y_{13}, Y_{31}, Y_{33}$ using a higher-level hierarchical pixel $Z_{11}$, as expressed by the following equations:

$$\Delta Y_{13} = Y_{13} - Z_{11}$$

$$\Delta Y_{31} = Y_{31} - Z_{11}$$

$$\Delta Y_{33} = Y_{33} - Z_{11} \qquad (11)$$

Similarly, the video signal encoding apparatus 80 supplies second-level hierarchical image data D34 and first-level hierarchical block data D32 to a differential circuit 83 which calculates a differential between spatially corresponding pixels in the second-level hierarchical image data D34 and the first-level hierarchical block data D32 to form first-level hierarchical differential data D71 which is sent to a thinning circuit 84. In this event, the differential circuit 83 calculates differential values $\Delta X_{12}$, $\Delta X_{21}$, $\Delta X_{22}$ of first-level hierarchical pixels $X_{12}, X_{21}, X_{22}$ using a higher-level hierarchical pixel $Y_{11}$ corresponding to these pixels, as expressed by the following equations:

$$\Delta X_{12} = X_{12} - Y_{11}$$

$$\Delta X_{21} = X_{21} - Y_{11}$$

$$\Delta X_{22} = X_{22} - Y_{11} \qquad (12)$$

The thinning circuits 84, 82, similarly to the aforementioned thinning circuits 42, 45 shown in FIG. 3, receive the block data D32 from the block formation circuit 41 and the block data D34 from the block formation circuit 44. Then, the thinning circuits 84, 82 thin one pixel from each of blocks formed of four pixels in the first and second-level hierarchical differential data D71, D70, corresponding to block data D32, D34 comprising blocks each formed of four pixels, to form first and second-level hierarchical thinned differential data D72, D73 comprising blocks each formed of three pixels excepting one pixel removed for each block, which are then sent to quantizer circuit 85, 86, respectively.

Here, the first hierarchical level quantizer circuit 85, the second hierarchical level quantizer circuit 86, and a third hierarchical level quantizer circuit 87 have their respective numbers of quantization bits selected to be one bit, two bits, and four bits, for a reason later described. The number of the quantization bits is assigned to the requantization of each pixel in each of the quantizer circuits 85 to 87. By providing the respective quantizer circuits 85, 86, 87 with the quantization characteristics mentioned above in the video signal encoding apparatus 80, degradation in image quality, particularly in lower-level hierarchical images, can be reduced on the decoding side.

In addition, the quantizer circuits 85, 86 have the quantization characteristics selected to provide a smaller (finer) quantization step width as the value is closer to zero. Thus, quantization with smaller quantization errors can be performed on the hierarchical differential thinned data D72, D73 in which data concentrate generally near zero. More specifically, this is because since the pixels between hierarchical levels of video signal have the correlation, there is a strong possibility that the differential data becomes zero and the differential data is closer to zero.

Requantized data D74, D75, D76 generated by the quantizer circuits 85, 86, 87 are variable-length-coded by variable length coding circuits (VLC) 50, 51, 52, respectively, to be output as first-, second-, and third-level hierarchical encoded data D77, D78, D79. Then, the first-, second, and third-level hierarchical encoded data D77, D78, D79 are input to the following transmission format converter circuit 53 for form transmission image data D80 to be output. Thereafter, the output transmission image data D80 is supplied to a receiving side through a communication path or recorded in a recording medium 89 such as a disc, a tape, or a semiconductor memory through a recording transmission path.

Figure 8:
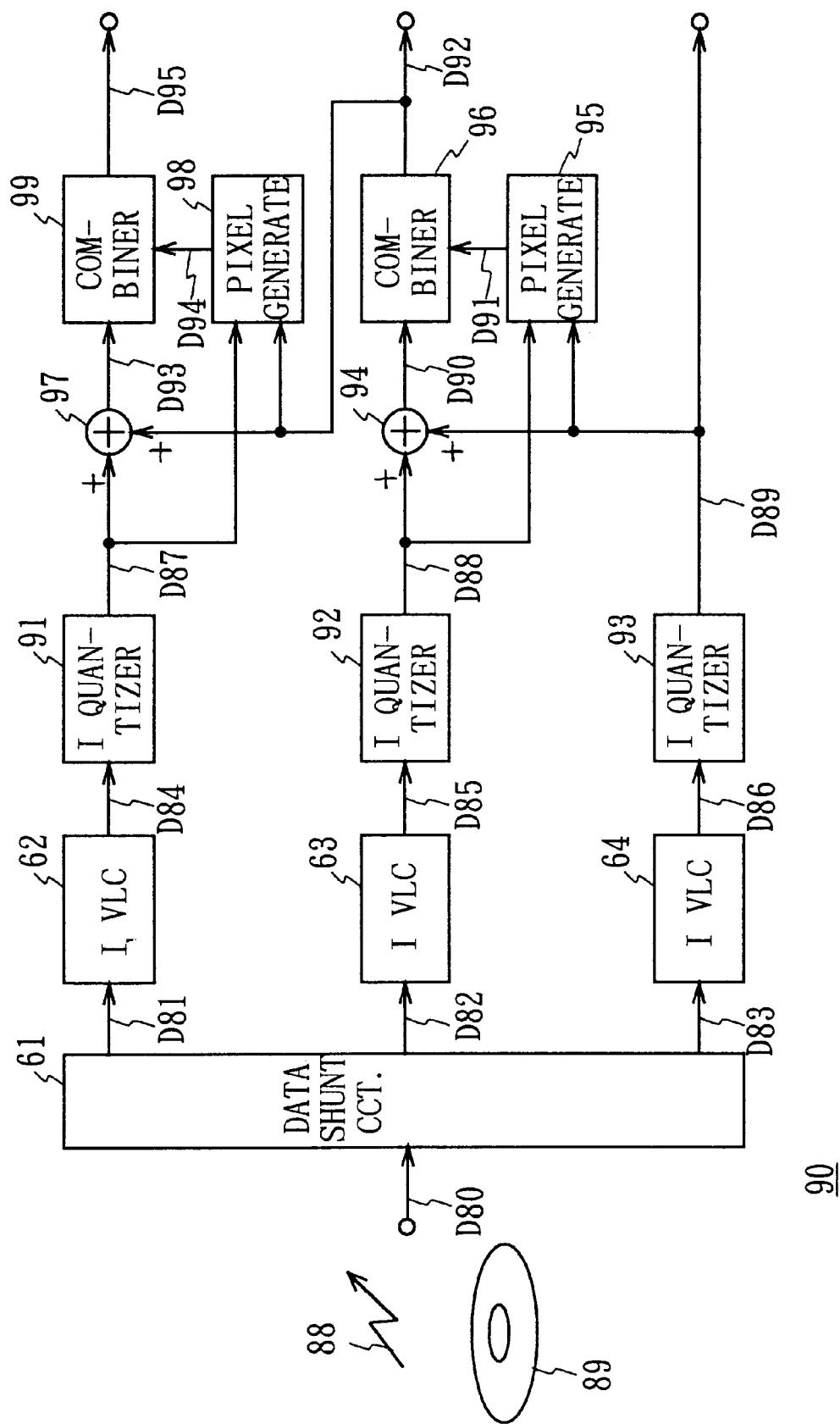
FIG. 8 is a block diagram showing the configuration of a video signal decoding apparatus according to the second embodiment.

FIG. 8 shows the configuration of a video signal decoding apparatus 90 for decoding the transmitted image data D80 compressively coded by the video signal encoding apparatus 80. In the video signal decoding apparatus 90, parts corresponding to those in FIG. 5 are designated by the same reference numerals. The video signal decoding circuit 90 inputs the transmission Image data D80 supplied through the communication path 88 or reproduced from the recording medium 89 through a reproducing transmission path into a data shunt circuit 61. The data shunt circuit 61 divides the transmission image data D80 into first-, second-, and third-level hierarchical encoded data D81, D82, D83, which are supplied to an inverse variable length coding circuits (IVLC) 62, 63, 64, respectively. The inverse variable length coding circuit (IVLC) 62, 63, 64 inversely variable-length-codes the divided first-, second-, and third-level hierarchical encoded data D81, D82, D83 to generate requantized data D84, D85, D86 which are sent to inverse quantizer circuits 91, 92, 93, respectively. Note that the inverse variable length coding circuit (IVLC) 62, 63, 64 execute the inverse processing respectively corresponding to the processing of the variable length coding circuit (VLC) 50, 51, 52 shown in FIG. 7.

The inverse quantizer circuits 91, 92, 93 inversely quantize the requantized data D84, D85, D86, which have been requantized to one bit, two bits, and four bits per pixel, to data having 16 bits per pixel, thereby generating first- and second-level hierarchical differential thinned data D87, D88 and decoded third-level hierarchical image data D89. Note that the inverse quantizer circuits 91, 92, 93 execute the inverse processing respectively corresponding to the processing of the quantizer circuits 85, 86, 87 shown in FIG. 7.

The decoded third-level hierarchical image data D89 is outputted as it is to a low resolution television monitor or the like as well as sent to an adder circuit 94 and a pixel generator circuit 95. The adder circuit 94 performs an addition as expressed by the following equations:

$$Y_{13}=Z_{11}-\Delta Y_{13}$$

$$Y_{31}=Z_{11}-\Delta Y_{31}$$

$$Y_{33}=Z_{11}-\Delta Y_{33} \qquad (13)$$

to calculate decoded second-level hierarchical thinned data D90.

The pixel generator circuit 95 uses the second-level hierarchical differential thinned data D88 and the decoded third-level hierarchical image data D89 to restore the second-level hierarchical pixel $Y_{11}$, which has been thinned by the thinning circuit 82 shown in FIG. 7 in accordance with the following equation:

$$\begin{aligned} Y_{11} &= 4\times Z_{11} - Y_{13} - Y_{31} - Y_{33} \qquad (14)\\ &= 4\times Z_{11} - (Z_{11}+\Delta Y_{13}) - (Z_{11}+\Delta Y_{31}) - (Z_{11}+\Delta Y_{33})\\ &= Z_{11} - \Delta Y_{13} - \Delta Y_{31} - \Delta Y_{33} \end{aligned}$$

Comparing the equation (14) with the aforementioned equation (3), it is understood that a multiplication coefficient of the third-level hierarchical pixel $Z_{11}$ is "4" in the equation (3) and "1" in the equation (14). This means that the influence of a third-level hierarchical pixel value is smaller in the equation (14) than in the equation (3).

A combiner circuit 96 combines the decoded second-level hierarchical thinned data D90 with restored second-level hierarchical pixel data D91 to form decoded second-level hierarchical image data D92 which is outputted to a television monitor or the like as well as is sent to an adder circuit 97 and a pixel generator circuit 98 through an output terminal. The adder circuit 97 performs an addition as expressed by the following equations:

$$X_{12}=Y_{11}-\Delta X_{12}$$

$$X_{21}=Y_{11}-\Delta X_{21}$$

$$X_{22}=Y_{11}-\Delta X_{22}$$

$$X_{14}=Y_{13}-\Delta X_{14}$$

$$X_{23}=Y_{13}-\Delta X_{23}$$

$$X_{24}=Y_{13}-\Delta X_{24} \qquad (15)$$

to calculate decoded first-level hierarchical thinned data D93.

The pixel generator circuit 98 uses the first-level hierarchical thinned data D93 and the decoded second-level hierarchical image data D92 to obtain first-level hierarchical pixel $X_{14}, X_{31}, X_{33}$, which have been thinned by the thinning circuit 84 shown in FIG. 5, in accordance with the following equations:

$$\begin{aligned} X_{13} &= 4\times Y_{13} - X_{14} - X_{23} - X_{24} \qquad (16)\\ &= 4\times Y_{13} - (Y_{13}+\Delta X_{14}) - (Y_{13}+\Delta X_{23}) - (Y_{13}+\Delta X_{24})\\ &= Y_{13} - \Delta X_{14} - \Delta X_{23} - \Delta X_{24} \end{aligned}$$

$$\begin{aligned} X_{31} &= 4\times Y_{31} - X_{32} - X_{41} - X_{42}\\ &= 4\times Y_{31} - (Y_{31}+\Delta X_{32}) - (Y_{32}+\Delta X_{41}) - (Y_{32}+\Delta X_{42})\\ &= Y_{31} - \Delta X_{32} - \Delta X_{41} - \Delta X_{42} \end{aligned}$$

$$\begin{aligned} X_{33} &= 4\times Y_{33} - X_{34} - X_{43} - X_{44}\\ &= 4\times Y_{33} - (Y_{33}+\Delta X_{34}) - (Y_{33}+\Delta X_{43}) - (Y_{33}+\Delta X_{44})\\ &= Y_{33} - \Delta X_{34} - \Delta X_{43} - \Delta X_{44} \end{aligned}$$

Also, the pixel generator circuit 98 obtains the thinned first-level hierarchical pixel $X_{11}$ in accordance with the following equation:

$$\begin{aligned} X_{11} &= 4\times Y_{11} - X_{12} - X_{21} - X_{22} \qquad (17)\\ &= 4\times (Z_{11} - \Delta Y_{13} - \Delta Y_{31} - \Delta Y_{33}) -\\ &\quad (Y_{11}+\Delta X_{12}) - (Y_{11}+\Delta X_{21}) - (Y_{11}+\Delta X_{21})\\ &= Z_{11} - \Delta Y_{13} - \Delta Y_{31} - \Delta Y_{33} - \Delta X_{12} - \Delta X_{21} - \Delta X_{22} \end{aligned}$$

A combiner circuit 99 combines the decoded first-level hierarchical thinned data D93 and restored first-level hierarchical pixel data D94 to form decoded first-level hierarchical image data D95 which is outputted to a high resolution television monitor or the like through an output terminal.

Next, a consideration will be made on the influence of the quantization errors on data at the respective hierarchical levels in the video signal encoding apparatus 80 and the image data decoding apparatus 90 of the second embodiment, as has been made in the first embodiment. It should be noted that since the numbers of quantization bits set at the quantizer circuit 49 and the inverse quantizer circuit 93, the quantizer circuit 48 and the inverse quantizer circuit 92, the quantizer circuit 47 and the inverse quantizer circuit 91, according to the second embodiment, are different from that of the first embodiment, similar explanation about the quantization errors cannot be actually given to the first and second embodiments. In the following explanation, however, it is assumed that the same number of quantization bits is assigned to the same hierarchical level.

A decoded value $Z_{11}'$ of the second-level hierarchical pixel $Z_{11}$ restored by the inverse quantizer circuit 93 is equally expressed by the equation (5). Decoded values $Y_{13}'$, $Y_{31}'$, $Y_{33}'$ of the second-level hierarchical pixels $Y_{13}$, $Y_{31}$, $Y_{33}$ restored by the adder circuit 94, in turn, are expressed by the following equations:

$$Y_{13}'=Z_{11}'+\Delta Y_{13}'=Y_{13}+E(Z_{11})+E(\Delta Y_{13})$$

$$Y_{31}'=Z_{11}'+\Delta Y_{31}'=Y_{31}+E(Z_{11})+E(\Delta Y_{31})$$

$$Y_{33}'=Z_{11}'+\Delta Y_{33}'=Y_{33}+E(Z_{11})+E(\Delta Y_{33}) \qquad (18)$$

Since the second-level hierarchical pixel $Y_{11}$ restored by the pixel generator circuit 95 is generated based on the equation (14), its decoded value $Y_{11}'$ is expressed by the following equation:

$$Y'_{11} = Z'_{11} - \Delta Y'_{13} - \Delta Y'_{31} - \Delta Y'_{33} \quad (19)$$

$$= Y_{11} - 2 \times E(Z_{11}) - E(\Delta Y_{13}) - E(\Delta Y_{31}) - E(\Delta Y_{33})$$

Comparing the equation (19) with the aforementioned equation (7), it is understood that a multiplication coefficient of the quantization error $E(Z_{11})$ of the third-level hierarchical pixel $Z_{11}$ is "4" in the equation (7) and "2" in the equation (19). This means that the influence of a third-level hierarchical pixel on the decoding of a second-level hierarchical pixel can be reduced to approximately one half. More specifically, in the first embodiment, as is apparent from the equations (6) and (7), the quantization errors of the third-level hierarchical pixel $Z_{11}$ is reflected on only the second-level hierarchical decoded pixel value $Y_{11}'$, and is not reflected on the second-level hierarchical decoded pixel values $Y_{13}'$, $Y_{31}'$, $Y_{33}'$. However, in the second embodiment, as is apparent from the equations (18) and (19), the difference between hierarchies is calculated, so that the quantization errors of the third-level hierarchical pixel $Z_{11}$ is reflected on all of the second-level hierarchical decoded pixel values $Y_{11}'$, $Y_{13}'$, $Y_{31}'$, $Y_{33}'$. Therefore, the influence given by the quantization errors of the three-level hierarchical pixel on the decoding of the second-level hierarchical pixel can be reduced.

Decoded values $X_{12}'$, $X_{21}'$, $X_{22}'$, $X_{32}'$, $X_{41}'$, $X_{42}'$ of first-level hierarchical pixels $X_{12}$, $X_{21}$, $X_{22}$, $X_{32}$, $X_{41}$, $X_{42}$ obtained by the differential circuit 97 are expressed by the following equations:

$$X'_{12} = Y'_{11} + \Delta X'_{12} \quad (20)$$

$$= X_{12} - 2 \times E(Z_{11}) - E(\Delta Y_{13}) - E(\Delta Y_{31}) - E(\Delta Y_{33}) + E(\Delta X_{12})$$

$$X'_{21} = Y'_{11} + \Delta X'_{21}$$

$$= X_{22} - 2 \times E(Z_{11}) - E(\Delta Y_{13}) - E(\Delta Y_{31}) - E(\Delta Y_{33}) + E(\Delta X_{12})$$

$$X'_{22} = Y'_{11} + \Delta X'_{22}$$

$$= X_{22} - 2 \times E(Z_{11}) - E(\Delta Y_{13}) - E(\Delta Y_{31}) - E(\Delta Y_{33}) + E(\Delta X_{22})$$

$$X'_{32} = Y'_{11} + \Delta X'_{32}$$

$$= X_{32} + E(Z_{11}) + E(\Delta Y_{31}) + E(\Delta X_{22})$$

$$X'_{41} = Y'_{11} + \Delta X'_{41}$$

$$= X_{41} + E(Z_{11}) + E(\Delta Y_{31}) + E(\Delta X_{41})$$

$$X'_{42} = Y'_{11} + \Delta X'_{42}$$

$$= X_{42} + E(Z_{11}) + E(\Delta Y_{31}) + E(\Delta X_{42})$$

A decoded value $X_{31}'$ of the first-level hierarchical pixel $X_{31}$ restored by the image generator circuit 98 is expressed by the following equation:

$$X'_{31} = Y'_{31} - \Delta X'_{32} - \Delta X'_{41} - \Delta X'_{42} \quad (21)$$

$$= X_{31} - 2 \times E(Z_{11}) - 2 \times E(\Delta Y_{31}) - E(\Delta X_{32}) -$$

$$E(\Delta X_{41}) - E(\Delta X_{42})$$

Further, a decoded value $X_{11}'$ of the first-level hierarchical pixel $X_{11}$ restored by the pixel generator circuit 98 through the pixel generator circuit 95 is expressed by the following equation:

$$X'_{11} = Z'_{11} - \Delta Y'_{13} - \Delta Y'_{31} - \Delta Y'_{33} - \Delta X'_{12} - \Delta X'_{21} - \Delta X'_{22} \quad (22)$$

$$= X_{11} + 4 \times E(Z_{11}) + 2 \times E(\Delta Y_{13}) + 2 \times E(\Delta Y_{31}) +$$

$$2 \times E(\Delta Y_{33}) - E(\Delta X_{12}) - E(\Delta X_{21}) - E(\Delta X_{22})$$

It can be seen from the equation (22) that the decoded value $X_{11}'$ is influenced by a quantization error associated with $Z_{11}$ by a factor of four and by quantization errors associated with $Y_{13}$, $Y_{31}$, $Y_{33}$ by a factor of two. However, as is apparent from a comparison of the equation (22) with the equation (10), the influence of the quantization errors associated with $Z_{11}$, $Y_{13}$, $Y_{31}$, $Y_{33}$ on the decoded value $X_{11}'$ is significantly reduced as compared with the first embodiment.

More specifically, in the first embodiment, for example as is apparent from the equations (9) and (10), the quantization errors of the third-level hierarchical pixel $Z_{11}$ and the quantization errors of the second-level hierarchical pixels $Y_{13}$, $Y_{31}$, $Y_{33}$ are reflected only on the decoded pixel $X_{11}'$, and are not reflected on the decoded pixels $X_{12}'$, $X_{21}'$, $X_{22}'$ of the first hierarchy.

However, in the second embodiment, as is apparent from the equations (20) and (21), the quantization errors of the third-level hierarchical pixel $Z_{11}$ and the quantization errors of the second-level hierarchical pixels $Y_{13}$, $Y_{31}$, $Y_{33}$ are reflected on the decoded pixels $X_{11}'$, $X_{12}'$, $X_{21}'$, $X_{22}'$ of the first hierarchy since the difference between hierarchies are calculated. Therefore, the influence given from the quantization errors of the third-level hierarchical pixel and second-level hierarchical pixels on the decoding of the first-level hierarchical pixel can be reduced.

In the video signal encoding apparatus 80 of the second embodiment, the quantizer circuits 47, 48, 49 in the first embodiment are assigned quantization bits of one bit, four bits, and 16 bits, respectively, whereas the quantizer circuits 85, 86, 87 are assigned quantization bits of one bit, two bits, and four bits, respectively, thus making it possible to sufficiently suppress degradation in image quality at lower hierarchical levels due to quantization errors occurring at higher hierarchical levels. That is, the number of quantization bits is determined by the influence of quantization error given to the lower hierarchy. Also, the number of quantization bits may be determined in accordance with the number of hierarchical levels from the highest hierarchy and the number of pixels used for generating the higher hierarchical pixels. As a result, the video signal encoding apparatus 80 can provide restored images in a higher quality while requiring a far less amount of information to be transmitted.

According to the configuration of the second embodiment, in the video signal encoding apparatus 80 for generating hierarchical differential data between each of hierarchical image data at a plurality of hierarchical levels, derived from the input image data D31 by an average value calculation, and corresponding hierarchical data at the adjacent higher-level, and for generating a plurality of hierarchy encoded data by respectively quantizing the highest-level hierarchical data D35 and a plurality of the hierarchical differential data D72, D73, differential pixel data $\Delta Y_{11}$, $\Delta Y_{15}$, . . . , $\Delta X_{11}$, $\Delta X_{13}$, . . . , which can be restored by arithmetic operations using pixels at adjacent lower hierarchical levels and pixels at their own hierarchical levels, are omitted from pixels to be transmitted at respective hierarchical levels except for the highest hierarchical level. Further, higher hierarchical level quantizer circuits are designed to perform finer quantization. It is therefore possible to largely reduce the amount of information to be transmitted while limiting degradation in image quality.

(3) Third Embodiment

Figure 9:
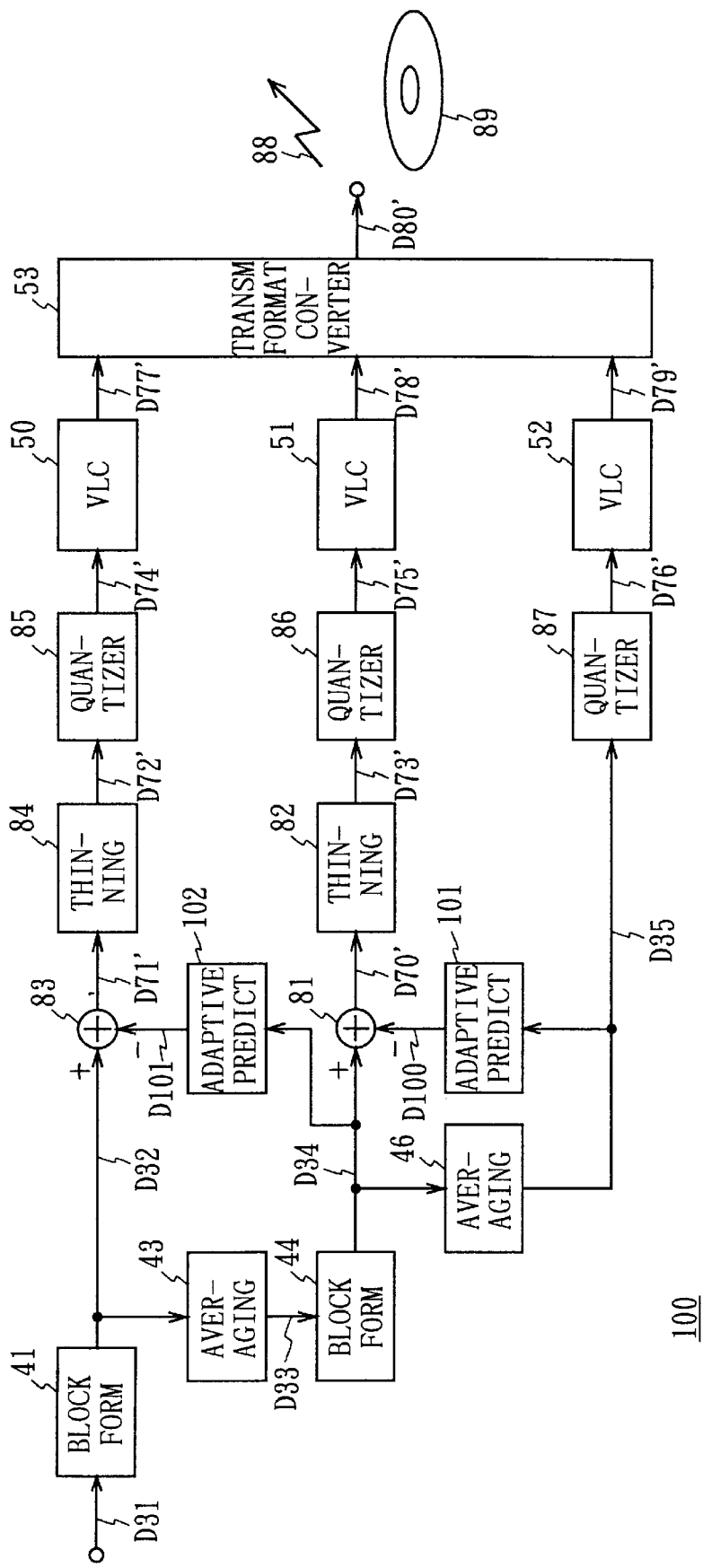
FIG. 9 is a block diagram showing the configuration of a video signal encoding apparatus according to a third embodiment.

FIG. 9 shows a video signal encoding apparatus 100 according to the third embodiment. The video signal encoding apparatus 100 has a configuration similar to that of the video signal encoding apparatus 80 of the second embodiment except that adaptive prediction circuits 101, 102 are additionally provided. Therefore, parts corresponding to those in FIG. 7 are designated by the same reference numerals.

The adaptive prediction circuit 101 performs predetermined predictive processing based on third-level hierarchical image data D35 to generate second-level hierarchical predictive data D100 corresponding to second-level hierarchical image data D34 which is sent to a differential circuit 81. Similarly, the adaptive prediction circuit 102 performs predetermined predictive processing based on the second-level hierarchical image data D34 to generate first-level hierarchical predictive data D101 corresponding to first-level hierarchical image data D32 which is sent to a differential circuit 83.

Practically, the adaptive prediction circuits 101, 102 are designed to use classification adaptive processing to predict one pixel at a lower hierarchical level from a plurality of pixels at a higher hierarchical level. Specifically, each of pixels at a lower hierarchical level to be predicted is classified based on a level distribution of a plurality of higher level pixels spatially located near the pixel at the lower hierarchical level. Also, the adaptive prediction circuits 101, 102 have a memory in which a plurality of predictive coefficients or one predicted value previously acquired by learning for each class has been stored, and read the plurality of predictive coefficients or the one predicted value from the memory in correspondence to the class determined by the above classification. The predicted value is used as it is, whereas the predictive coefficients are used to generate a predicted value by linear first-order coupling the plurality of predictive coefficients and a plurality of pixels. Details of such classification predictive processing are described, for example, in the U.S. patent application Ser. No. 08/504,040.

According to the configuration of the third embodiment, the residues of the first-level hierarchical differential data D71' and the second-level hierarchical differential data D70', generated by the differential circuits 83, 81 can be further reduced, thereby making it possible to realize a video signal encoding apparatus which can more largely reduce the amount of information to be transmitted.

As is apparent from the first and second embodiments described above, the influence of the quantization errors of the high-level hierarchical data on the low-level hierarchical data relates to the number of levels of hierarchy from the lowest-level hierarchy and the number of pixels used in generating the high-level hierarchical data. Therefore, when the number of quantization bits of the high-level hierarchy is determined, the number of quantization bits or more is set such that the quantization errors influenced on the lowest-level hierarchy is reduced to a minimum, so that the video signal encoding apparatus which reduces the degradation in image quality can be provided.

Further, as is apparent from the second embodiment, by obtaining the differential data between the hierarchies, the quantization errors of the high-level hierarchical pixels is not influenced only on the pixels thinned in decoding but on the pixels to be transmitted used for decoding the thinned data, so that the video signal encoding apparatus which further reduces the degradation in image quality can be provided.

According to the present invention as described above, in the video signal encoding apparatuses of the first to third embodiments, pixels which can be restored by arithmetic operations using pixel data at adjacent higher hierarchical levels and pixels at their own hierarchical levels are omitted from pixel data to be transmitted at respective hierarchical levels except for the highest hierarchical level having the lowest resolution, and higher hierarchical level data are subjected to finer quantization with a large number of quantization bits (narrower quantization widths), thereby making it possible to realize a hierarchical encoding scheme which improves the compressing efficiency and reduces degradation in image quality.

(4) Fourth Embodiment

Figure 10:
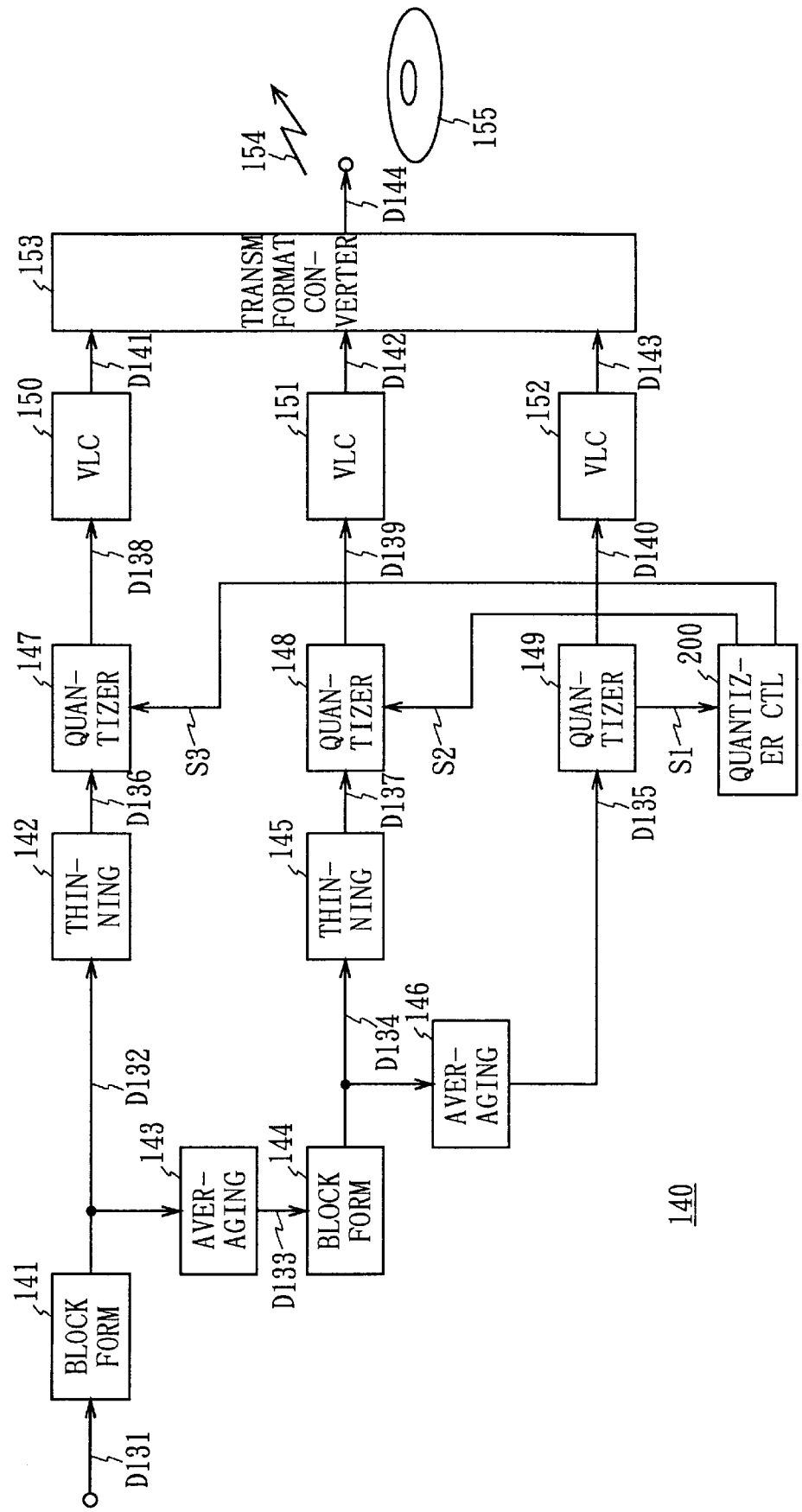
FIG. 10 is a block diagram showing the configuration of a video signal encoding apparatus according to a fourth embodiment.

FIG. 10 generally shows a video signal encoding apparatus 140 according to a fourth embodiment. The fourth embodiment shows the case in which three hierarchies of hierarchical data is formed and each compressed and encoded before transmission, as in the first embodiment. The same components as in the first embodiment is described using the equations and drawings used in the first embodiment. The video signal encoding apparatus 140 uses a blocking circuit 141 to divide high resolution input data D131 (hereafter referred to as "first hierarchy image data") into small blocks of 2 lines×2 pixels to form first hierarchy blocked data D132 and to then send it out to a thinning circuit 142 and an averaging circuit 143.

The averaging circuit 143 averages the pixel values in each block of the blocked data D132 to compress input image data D130 to one-fourth into second hierarchy image data D133, and transmits it to a blocking circuit 144. As in the blocking circuit 141, the blocking circuit 144 divides the second hierarchy image data D133 into small blocks of 2 lines×2 pixels to form second hierarchy blocked data D134 and to then send it out to a thinning circuit 145 and an averaging circuit 146.

As in the averaging circuit 143, the averaging circuit 146 averages the pixel values in each block of the blocked data D134 to compress the second hierarchy image data D133 to one-fourth or the first hierarchy image data D131 to one-sixteenth into third hierarchy image data D135. That is, as shown by the dotted lines in FIG. 4C, the averaging circuit 143 uses four pixels in a block in the first hierarchy (for example, $X_{11}$, $X_{12}$, $X_{21}$, and $X_{22}$) to perform an averaging operation using the equation (1) described above in order to generate a single pixel (for example, $Y_{11}$) for the second hierarchy shown in FIG. 4B. Pixels $Y_{13}$, $Y_{31}$, . . . are similarly generated by averaging four pixels in the first hierarchy.

Similarly, the averaging circuit 146 uses four pixels in a block in the second hierarchy (for example, $Y_{11}$, $Y_{13}$, $Y_{31}$, and $Y_{33}$) to perform an averaging operation using the equation (2) described above in order to generate a single pixel for the third hierarchy shown in FIG. 4C (for example, $Z_{11}$). Pixels $Z_{15}$, $Z_{51}$, . . . are similarly generated by averaging four pixels in the second hierarchy.

The thinning circuits 142 and 145 receives the blocked data D132 and D134 from the blocking circuits 141 and 144, respectively, removes one pixel from the blocked data D132 and D134 composed of four pixels to form thinned-out data D136, D137 composed of the three remaining pixels, and sends the thinned-out data D136 and D137 out to quantizer circuits 147 and 148, respectively. That is, the thinning circuit 142 uses a thinning operation to remove the pixels $X_{11}$, $X_{13}$, . . . shown by the dotted lines in FIG. 4C, while the thinning circuit 145 uses a thinning operation to remove the pixels $Y_{11}$, $Y_{15}$, . . . shown by the dotted lines in FIG. 4B.

Thus, the quantizer circuit 147 in the first hierarchy and the quantizer circuit 148 in the second hierarchy quantizes the pixels $X_{12}$, $X_{21}$, $X_{22}$, . . . and $Y_{13}$, $Y_{31}$, $Y_{33}$, . . . shown by the solid lines in FIGS. 4C and 4B, respectively. For the first hierarchy, the number of pixels to be transmitted can be reduced to three-fourth compared to the quantization and transmission of all the pixels in the first hierarchy. For the second hierarchy, the number of pixels to be transmitted can be reduced to three-fourth compared to the quantization and transmission of all the pixels in the second hierarchy which are generated by the averaging operation.

In general, compared to the compression and transmission of only the first hierarchy image data D131, the video signal encoding apparatus 140 can transmit image data in a plurality of hierarchies using the same number of transmitted pixels. As a result, the video signal encoding apparatus 140 can transmit image data in a plurality of hierarchies without increasing the amount of transmitted information. The pixels removed by the thinning circuits 142 and 145 can be recovered by a decoder (a receiver) described below, using a simple equation.

The quantizer circuits 147, 148, and 149 re-quantizes each pixel (8 bits) in the thinned-out data D136 and D137 and the third hierarchy image data D135 into, for example, two bits to compress the information. The quantizer circuit 149 in the third hierarchy sends out to a quantizer control circuit 200 quantization error information signal S1 indicating the polarity of a quantization error.

Based on the quantization error information signal S1, the quantizer control circuit 200 transmits quantizer control signals S2 and S3 to the quantizer circuits 148 and 147 in the second and first hierarchies, respectively, to control the quantization characteristics so that the polarity of a quantization error in the quantizer circuits 148 and 147 is the same as the polarity of a quantization error in the quantizer circuits 149. In this case, it is assumed that the quantizer circuits 148 and 147 have quantized the pixels in the lower hierarchies spatially corresponding to the pixels in the top hierarchy which have been quantized by the quantizer circuit 149.

Figure 11:
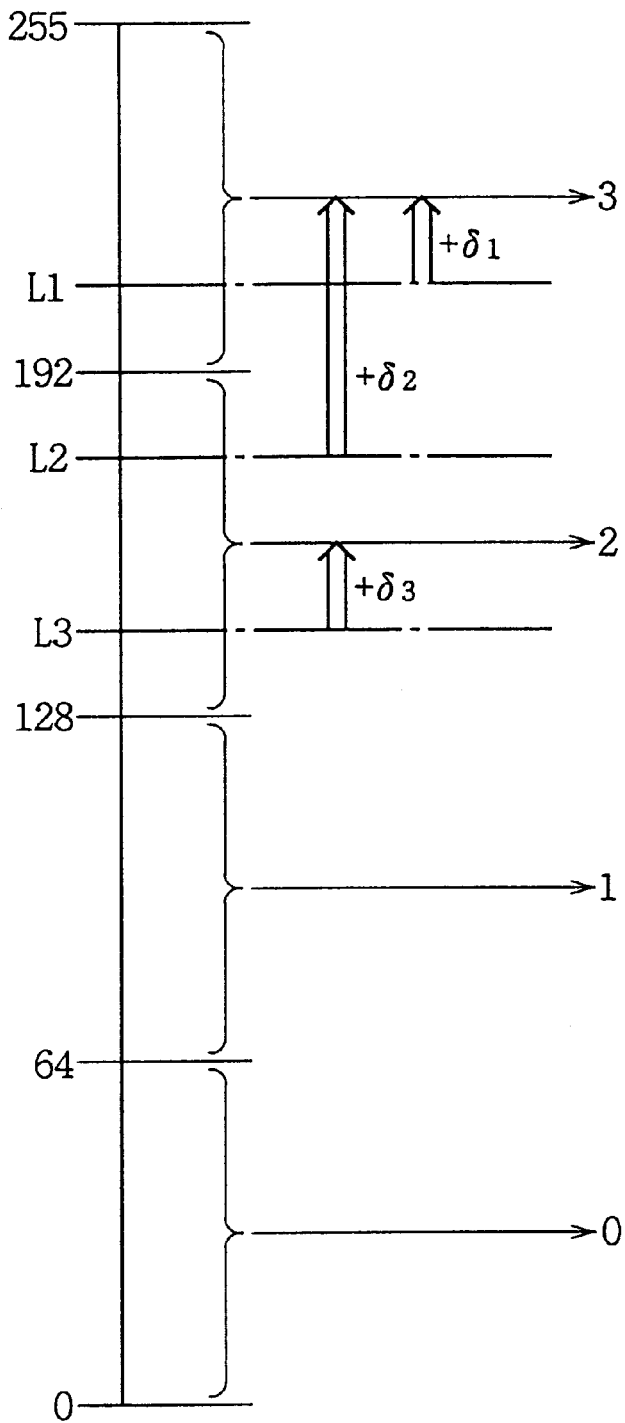
FIG. 11 is a diagram explaining the control of quantization characteristics according to a fourth, a fifth, a sixth, and a seventh embodiments.

This is specifically described with reference to FIG. 11. This figure shows 2-bit quantization in which if input data comprises eight bits per pixel and has a level between 0 and 255, a quantization value "0" is output for the level between 0 to 63, a quantization value "1" is output for the level between 64 to 127, a quantization value "2" is output for the level between 128 to 191, and a quantization value "3" is output for the level between 192 to 255. This is called the "distortion minimization norm" that has been generally used to minimize quantization errors.

The video signal encoding apparatus 140 according to the fourth embodiment does not use such a distortion minimization norm in the quantizer circuits 147 and 148 but allow the quantizer circuit 149 in the top hierarchy to execute quantization depending on the polarity of a quantization error. If, for example, pixel data input to the quantizer circuit 149 is at the level L1 shown in FIG. 11, the quantizer circuit 149 outputs the quantization value "3" according to the distortion minimization norm. In this case, the quantizer circuit 149 transmits to the quantizer control circuit 200 the quantization error information signal S1 indicating that the quantization error is $+\delta1$, that is, of the positive polarity.

In this case, the quantizer circuits 147 and 148 do not follow the distortion minimization norm but executes quantization so that the quantization error will be positive based on the quantizer control signals S2 and S3. If, for example, the pixel data input to the quantizer circuits 147 or 148 is at the level L2 shown in FIG. 11, the quantization value "2" is output according to the distortion minimization norm, but the quantizer circuits 147 and 148 according to the fourth embodiment outputs the quantization value "3" based on the quantization error information signal S1 (in this case, indicating the positive polarity).

Re-quantized data D138, D139, and D140 obtained by the quantizer circuits 147, 148, and 149 is supplied to variable length coding circuits (VLC) 150, 151, and 152. The variable length coding circuits 150 to 152 each assign a shorter Hoffman code to a more frequently-generated quantization code in the re-quantized data D138 to D140 to form first hierarchy coded data D141, second hierarchy coded data D142, and third hierarchy coded data D143 which represent the re-quantized data D138 to D140, respectively, using as small amount of codes as possible, and send these data D141, D142, and D143 out to a transmission format conversion circuit 153.

The transmission format conversion circuit 153 forms transmit image data D144 by arranging the first hierarchy coded data D141, the second hierarchy coded data D142, and the third hierarchy coded data D143 in a specified order or providing identification codes for identifying the hierarchy of each coded data, and outputs the data D144. The output transmit image data D144 is subsequently supplied to the receiver via a communication path 154 or recorded on a recording medium 155 such as a disc, a tape, or a semiconductor memory via a recording path.

A video signal decoder for decoding the transmit image data D144 formed in this manner can be configured, for example, as shown in FIG. 5 described above.

As described above, the video signal encoding apparatus 140 according to the fourth embodiment of this invention uses the average value of a plurality of lower hierarchy pixels to generate higher hierarchy pixels in order to produce image data D131, D133, and D135 for the plurality of hierarchies.

In addition, for image data in those hierarchies other than the top hierarchy, that is, the third hierarchy, the video signal encoding apparatus 140 excludes one of the pixels used in the same averaging operation because it can be recovered by the decoder using a simple mathematics operation. Consequently, the video signal encoding apparatus 140 can implement hierarchical coding processing without an increase in the number of pixels to be transmitted due to the hierarchical structure.

As in the embodiments described above, the video signal encoding apparatus 140 uses the quantizer circuits 147 to 149 to re-quantize each hierarchical image data in order to compress the data in each hierarchy. As a result, the re-quantized data D138, D139, and D140 each necessarily include a quantization error occurring during re-quantization. As the quantization error becomes larger, decoded image data D158, D160, and D162 have a larger difference from the true values, thereby degrading image quality.

That is, a decoded pixel value $Y_{11}'$ is affected by the quadruple value of the quantization error in $Z_{11}$. In addition, decoded pixel values $X_{13}'$, $X_{31}'$ and $X_{33}'$ are affected by the quadruple values of the quantization errors in $Y_{13}$, $Y_{31}$, and $Y_{33}$. Furthermore, decoded pixel values $X_{11}'$ is affected by the quadruple values of the quantization errors in $Y_{13}$, $Y_{31}$, and $Y_{33}$ and the value sixteen times as large as the quantization error in $Z_{11}$.

The magnitude of the effects of the quantization errors $E(Z_{11})$, $E(Y_{13})$, $E(Y_{31})$, . . . on the decoded image values $Z_{11}'$, $Y_{11}'$, $Y_{13}'$, . . . are shown in FIG. 6 described above, and as in apparent from this figure, quantization errors in a higher hierarchy significantly affect decoded values in a lower hierarchy.

Thus, according to the fourth embodiment of this invention, based on the polarity of the quantization error occurring during the quantization of the top hierarchy pixel $Z_{11}$, control is provided so that the lower hierarchy pixels $Y_{13}$, $Y_{31}$, $Y_{33}$, $X_{12}$, $X_{21}$, and $X_{22}$ spatially corresponding to the pixel $Z_{11}$ are quantized in such a way that the polarity of the quantization errors in the pixels $Y_{13}$, $Y_{31}$, $Y_{33}$, $X_{12}$, $X_{21}$, and $X_{22}$ will be the same as in the quantization of the pixel Z11.

That is, as is apparent from, for example, the equation (7), when a reverse averaging operation is performed to decode the second hierarchy pixel $Y_{11}$, the resulting data includes the quantization error $E(Z_{11})$ in the higher hierarchy pixel $Z_{11}$ and the quantization errors $E(Y_{13})$, $E(Y_{31})$, and $E(Y_{33})$ in the same (second) hierarchy pixels (present within the same block) $Y_{13}$, $Y_{31}$, and $Y_{33}$. As is apparent from the equation (7), however, the quantization error $E(Z_{11})$ in the higher hierarchy pixel $Z_{11}$ and the quantization errors $E(Y_{13})$, $E(Y_{31})$, and $E(Y_{33})$ in the second hierarchy pixels $Y_{13}$, $Y_{31}$, and $Y_{33}$ act to offset one another. Thus, the quantization errors during decoding can be reduced by executing coding in such a way that the quantization error $E(Z_{11})$ in the higher hierarchy pixel Z11 has the same polarity as the quantization errors $E(Y_{13})$, $E(Y_{31})$, and $E(Y_{33})$ in the second hierarchy pixels $Y_{13}$, $Y_{31}$, and $Y_{33}$. As is apparent from the equation (7), the fourth embodiment of this invention can quantize the lower hierarchies during coding in such a way that they have the same polarity as the top hierarchy so that the quantization errors offset one another during decoding, thereby reducing the degradation of images in the lower hierarchies.

Likewise, as is apparent from the equation (10), when a reverse averaging operation is performed to decode the first hierarchy pixel $X_{11}$, the resulting data includes the quantization error $E(Z_{11})$ in the top (third) hierarchy pixel $Z_{11}$, the quantization errors $E(Y_{13})$, $E(Y_{31})$, and $E(Y_{33})$ in the higher (second) hierarchy pixels $Y_{13}$, $Y_{31}$, and $Y_{33}$, and the quantization errors $E(X_{12})$, $E(X_{21})$, and $E(X_{22})$ in the same (first) pixels (present within the same block) $X_{12}$, $X_{21}$, and $X_{22}$. As is apparent from the equation (10), however, the quantization error $E(Z_{11})$ in the top hierarchy pixel $Z_{11}$, the quantization errors $E(Y_{13})$, $E(Y_{31})$, and $E(Y_{33})$ in the higher hierarchy pixels $Y_{13}$, $Y_{31}$, and $Y_{33}$, and the quantization errors $E(X_{12})$, $E(X_{21})$, and $E(X_{22})$ in the first hierarchy pixels $X_{12}$, $X_{21}$, and $X_{22}$ act to offset one another. Thus, the quantization errors during decoding can be reduced by executing coding in such a way that the quantization error $E(Z_{11})$ in the top hierarchy pixel Z11 has the same polarity as the quantization errors $E(Y_{13})$, $E(Y_{31})$, and $E(Y_{33})$ in the higher hierarchy pixels $Y_{13}$, $Y_{31}$, and $Y_{33}$ and the quantization errors $E(X_{12})$, $E(X_{21})$, and $E(X_{22})$ in the first hierarchy pixels $X_{12}$, $X_{21}$, and $X_{22}$. As is apparent from the equation (10), the fourth embodiment of this invention can quantize the lower hierarchies during coding in such a way that they have the same polarity as the top hierarchy so that the quantization errors offset one another during decoding, thereby reducing the degradation of images in the lower hierarchies.

As described above, the video signal encoding apparatus 140 enables the decoder to execute quantization taking into consideration quantization errors propagated from a higher hierarchy to a lower hierarchy, thereby reducing the degradation of images caused by such errors.

The fourth embodiment described above prevents the transmission of pixel data $Y_{11}$, $Y_{15}$, . . . , $X_{11}$, $X_{13}$, . . . corresponding to one of a plurality of lower hierarchy pixels used in the same averaging operation to generate one pixel for a higher hierarchy, and controls the quantization characteristics used in quantizing lower hierarchy pixels corresponding to a top hierarchy pixel in such a way that depending on the polarity of a quantization error occurring when the top hierarchy pixel was quantized, the quantization errors in the lower hierarchy pixels will have the same polarity as in the quantization of the top hierarchy, thereby improving compression efficiency and reducing the degradation of image quality.

(5) Fifth Embodiment

Figure 12:
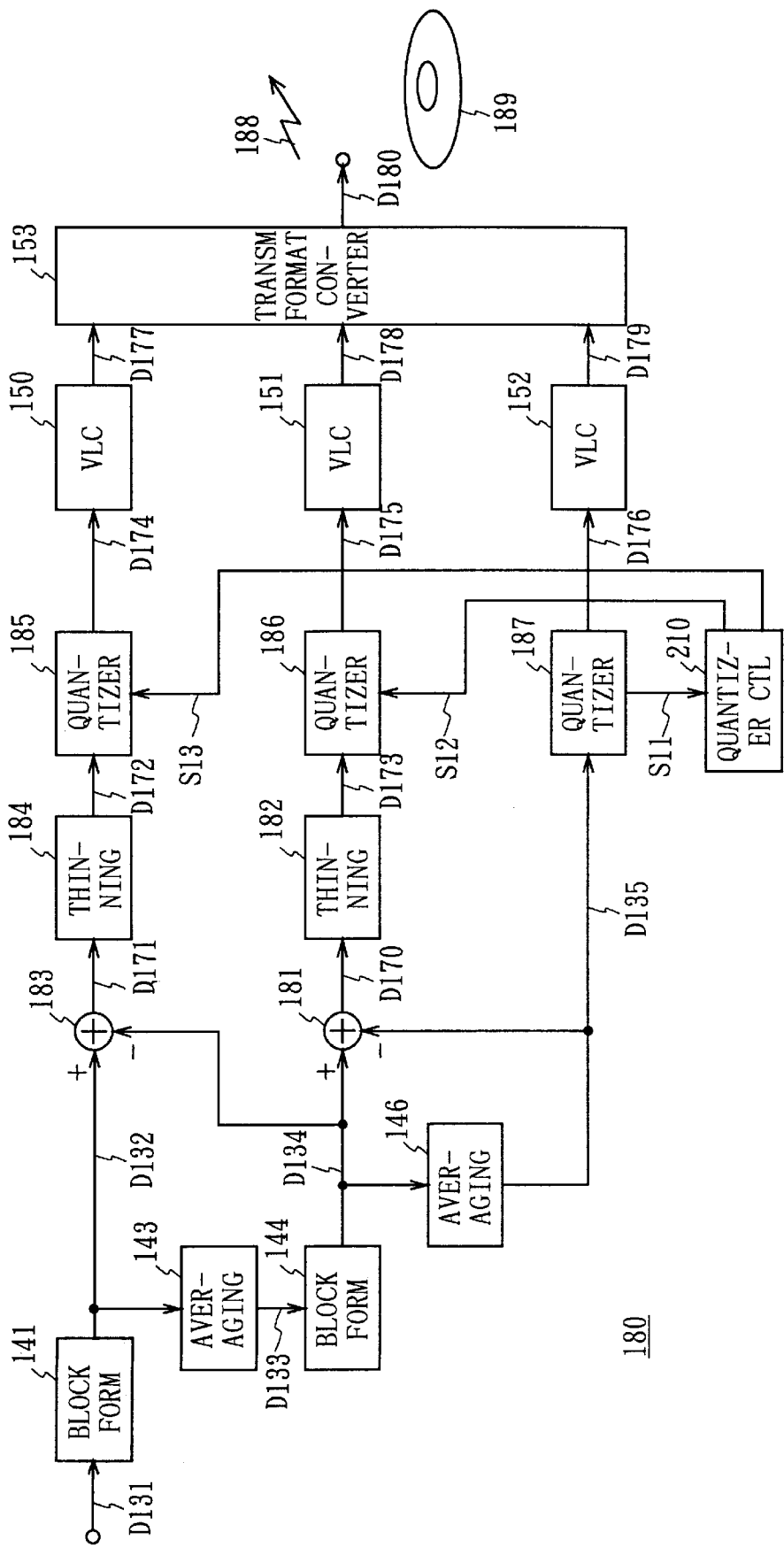
FIG. 12 is a block diagram showing the configuration of a video signal encoding apparatus according to the fifth embodiment.

FIG. 12 generally shows a video signal encoding apparatus 180 according to a fifth embodiment of this invention. Compared to the fourth embodiment, this apparatus has the same configuration as the video signal encoding apparatus 140 in FIG. 10 except that the differential data between hierarchies is compressed and coded except for the top hierarchy. Thus, the same components as in FIG. 10 has the same reference numerals.

While the video signal encoding apparatus 140 according to the fourth embodiment transmits each pixel using the pulse code modulation (PCM), the video signal encoding apparatus 180 according to the fifth embodiment transmits each pixel using the differential pulse code modulation (DPCM). Thus, the video signal encoding apparatus 180 can further reduce the amount of information to be transmitted.

Specifically, the video signal encoding apparatus 180 supplies the third hierarchy image data D135 and the second hierarchy blocked data D134 to a differential circuit 181. The differential circuit 181 then calculates the differential between a pixel in the third hierarchy image data D135 and the spatially corresponding pixels in the second hierarchy blocked data D134 to form second hierarchy differential data D170, and sends this data D170 to a thinning circuit 182. In this case, the differential circuit 181 determines the differential values $\Delta Y_{13}$, $\Delta Y_{31}$, and $\Delta Y_{33}$ of the second hierarchy pixels $Y_{13}$, $Y_{31}$, and $Y_{33}$ as described in the equation (11), using the higher hierarchy pixel $Z_{11}$ corresponding to these pixels.

The video signal encoding apparatus 180 similarly supplies the second hierarchy image data D134 and the first hierarchy blocked data D132 to a differential circuit 183. The differential circuit 183 then calculates the differential between pixels in the second hierarchy image data D134 and the spatially corresponding pixels in the first hierarchy blocked data D132 to form first hierarchy differential data D171, and sends this data D171 to a thinning circuit 184. In this case, the differential circuit 183 determines the differential values $\Delta X_{12}$, $\Delta X_{21}$, and $\Delta X_{22}$ of the first hierarchy pixels $X_{12}$, $X_{21}$, and $X_{22}$ as described in the equation (12), using the higher hierarchy pixel $Y_{11}$ corresponding to these pixels.

The thinning circuits 184 and 182 receive the blocked data D132 and D134 from the blocking circuit 141 and the blocked data D144, respectively, as in the thinning circuits 142 and 145 shown in FIG. 10. The thinning circuits 184 and 182 remove one pixel from the first and second hierarchy differential data D171 and D170, respectively, including 4 pixels in each block so as to correspond to the blocked data D132 and D134 composed of 4 pixels, respectively. The thinning circuits 184 and 182 thus form hierarchical differential thinned-out data D172 and D173 composed of the three remaining pixels, and transmit the hierarchical differential thinned-out data D172 and D173 to quantizer circuits 185 and 186.

A quantizer circuit in the third hierarchy receives the third hierarchy image data from the averaging circuit 146, and quantizes each pixel into, for example, two bits according to the distortion minimization norm, as in the fourth embodiment. The quantizer circuit 187 then transmits to a quantization control circuit 210 quantization error information signal S11 indicating that the quantization error has a positive or a negative polarity.

The quantizer circuit 185 in the first hierarchy and the quantizer circuit 186 in the second hierarchy have their quantization characteristics controlled on the basis of quantizer control signals S12 and S13 output from the quantizer control circuit 210 depending on the polarity of quantization errors in the quantizer circuit 187 in the third hierarchy (the top hierarchy), as in the fourth embodiment. That is, if errors in the quantization of higher hierarchy pixels by the quantizer circuit 187 have a positive polarity, the quantization characteristics of the quantizer circuits 185 and 186 used in quantizing the lower hierarchy pixel spatially corresponding to the higher hierarchy pixels are controlled in such a way that the resulting quantization error will have a positive polarity. In addition, if errors in the quantization of higher hierarchy pixels by the quantization circuit 187 have a negative polarity, the quantization characteristics of the quantizer circuits 185 and 186 used in quantizing the lower hierarchy pixel spatially corresponding to the higher hierarchy pixels are controlled in such a way that the resulting quantization error will have a negative polarity.

Re-quantized data D174, D175, and D176 obtained by the quantizer circuits 185, 186, and 187, respectively, is variable-length-coded by the variable length coding circuits (VLCs) 150, 151, and 152 and output as first, second, and third hierarchy coded data D177, D178, and D179. The first, second, and third hierarchy coded data D177, D178, and D179 is then input to the transmission format conversion circuit 153, which forms and outputs transmit image data D180. The output transmit image data D180 is subsequently supplied to the receiver via a communication path 188 or recorded on a recording medium 189 such as a disc, a tape, or a semiconductor memory via a recording path.

A video signal decoder for decoding the transmit image data D144 formed in this manner can be configured as shown in FIG. 8.

The video signal encoding apparatus 180 according to the fifth embodiment transmits hierarchical differential data between hierarchies as transmit data except for top hierarchy data, as in the second embodiment. That is, the equation (7) described above has a multiplication coefficient of "4" for the quantization error $E(Z_{11})$ of the third hierarchy pixel $Z_{11}$, whereas the equation (19) described above has a multiplication coefficient of "2" for the same error $E(Z_{11})$. This means that the coding and decoding according to the fifth embodiment can reduce the effects of quantization errors in third hierarchy pixels on the decoding of second hierarchy pixels to half. That is, as is apparent from the equation (19), since the differential between hierarchies is calculated, the quantization error in the third hierarchy pixel $Z_{11}$ is reflected in all the second hierarchy decoded pixel values $Y_{11}'$, $Y_{13}'$, $Y_{31}'$, and $Y_{33}'$. This embodiment can thus reduce the effects of quantization errors in third hierarchy pixels on the decoding of second hierarchy pixels.

In addition, as is apparent from the equation (22) described above, the decoded value $X_{11}'$ of the first hierarchy pixel $X_{11}$ is affected by the quadruple value of the quantization error in $Z_{11}$ and the double value of the quantization errors in $Y_{13}$, $Y_{31}$, and $Y_{33}$. As is apparent from the comparison of the equation (22) to the equation (10), however, the effects of the quantization errors in $Z_{11}$, $Y_{13}$, $Y_{31}$, and $Y_{33}$ on the decoded value $X_{11}'$ are significantly smaller than in the fourth embodiment.

That is, as is apparent from, for example, the equation (10), the fourth embodiment reflects the quantization errors in the third hierarchy pixel Z11 and in the second hierarchy pixels $Y_{13}$, $Y_{31}$, and $Y_{33}$, only in the first hierarchy decoded pixel value $X_{11}'$ and not in the first hierarchy decoded pixels $X_{12}'$, $X_{21}'$, and $X_{22}'$.

According to the fifth embodiment, however, as is apparent from the equation (22), since the differential between hierarchies is calculated, the quantization error in the third hierarchy pixel $Z_{11}$ and the quantization errors in the second hierarchy pixels $Y_{13}$, $Y_{31}$, and $Y_{33}$ are reflected in the first hierarchy decoded pixels $X_{11}'$, $X_{12}'$, $X_{21}'$, and $Y_{22}'$. This embodiment can thus reduce the effects of quantization errors in third and second hierarchy pixels on the decoding of first hierarchy pixels.

Thus, according to the video signal encoding apparatus in accordance with the fifth embodiment, the video signal encoding apparatus 180 for generating hierarchical differential data between the image data in each of a plurality of hierarchies obtained from the input image data D131 through the averaging operation and the data in the adjacent higher hierarchy and quantizing the top hierarchy data D135 and a plurality of differential data between hierarchies D172 and D173 to generate a plurality of hierarchical coded data, prevents the transmission of the differential pixel data $\Delta Y_{11}$, $\Delta Y_{15}$, ..., $\Delta X_{11}$, $\Delta X_{13}$, ... which can be decoded by a mathematics operation using pixels in a hierarchy different from the top hierarchy and the corresponding pixels in the adjacent lower hierarchy, and when quantizing the pixel data in each hierarchy, alternatively inverses the polarity of the quantization error between the positive and the negative polarities, thereby improving compression efficiency with the degradation of image quality restrained.

(6) Sixth Embodiment

Figure 13:
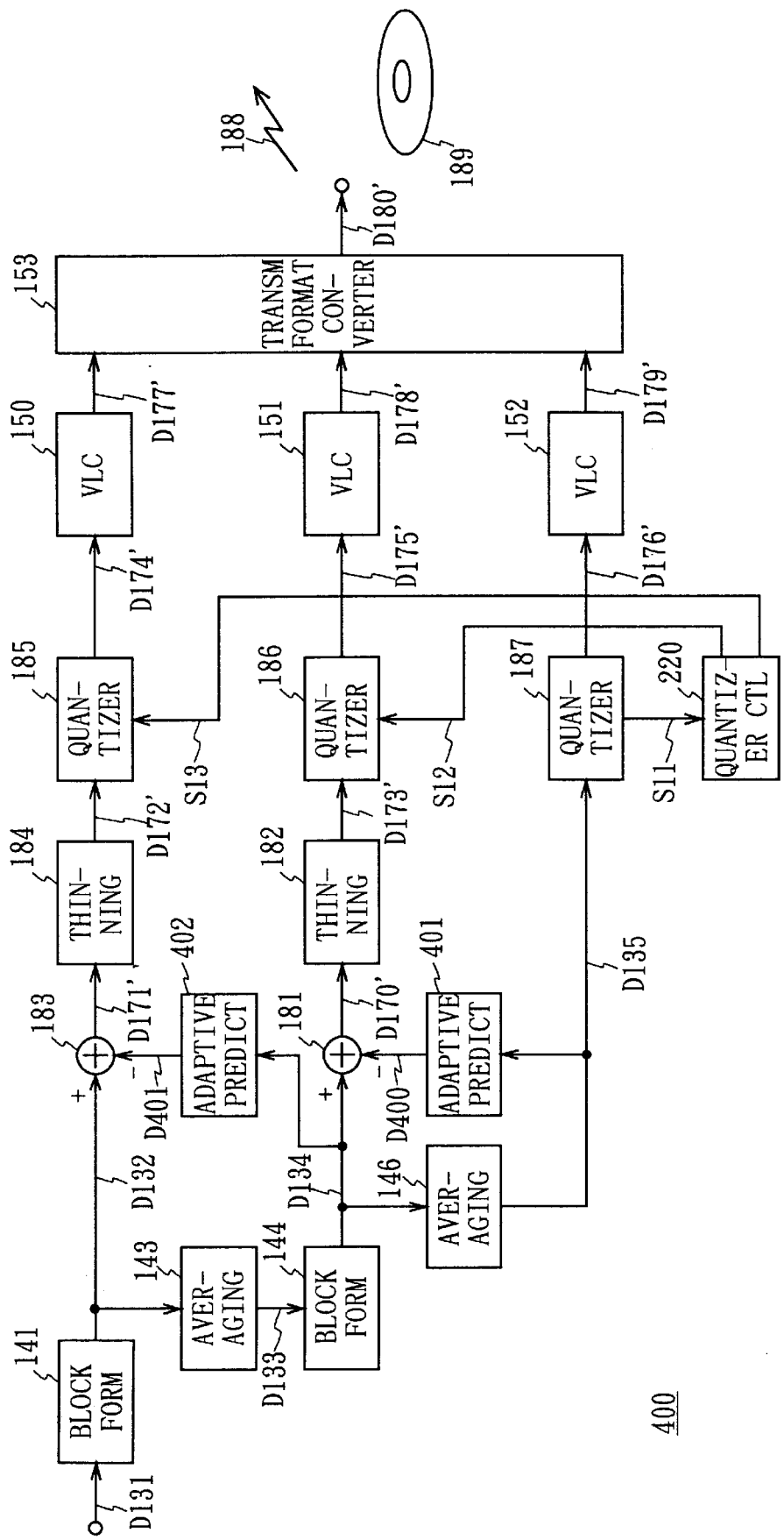
FIG. 13 is a block diagram showing the configuration of a video signal encoding apparatus according to the sixth embodiment.

FIG. 13 generally shows a video signal encoding apparatus 400 according to a sixth embodiment. Compared to the fifth embodiment, the video signal encoding apparatus 400 has a configuration similar to that of the video signal encoding apparatus 180 according to the fifth embodiment except for adaptive prediction circuits 401 and 402. Thus, the same components as in FIG. 12 have the same reference numerals.

The adaptive prediction circuit 401 executes predetermined prediction processing based on the third hierarchy image data D135 to generate second hierarchy predicted data D400 corresponding to the second hierarchy image data D134. The second hierarchy predicted data is then sent out to the differential circuit 181. Likewise, the adaptive prediction circuit 402 executes predetermined prediction processing based on the second hierarchy image data D134 to generate first hierarchy predicted data D401 corresponding to the first hierarchy image data D132. The first hierarchy predicted data is then sent out to the differential circuit 183.

In effect, the adaptive prediction circuits 401 and 402 utilize classification-adaptive processing to predict one lower hierarchy pixel from a plurality of higher hierarchy pixels. Specifically, the lower hierarchy pixel to be predicted is classified on the basis of the level distribution of a plurality of higher hierarchy pixels located spatially near the lower hierarchy pixel. In addition, the adaptive prediction circuits 401 and 402 have a memory that stores a plurality of prediction coefficients or one predicted value for each class which have been obtained through learning, and reads from this memory the plurality of prediction coefficients or one predicted value corresponding to the class determined through classification. The predicted value is directly used as a predicted pixel, while the prediction coefficients are linearly primarily combined with the plurality of pixels to generate a predicted value. If the predicted value is normalized, it is subjected to predetermined processing to generate a predicted pixel. The details of such classification-adaptive processing are described in U.S. patent application Ser. No. 08/504,040. In addition, algorithms for such classification-adaptive processing have been known. Although the classification-adaptive processing algorithm has been used in the adaptive prediction circuit according to the sixth embodiment, this invention is not limited to this aspect and other current prediction methods may be used.

(7) Seventh Embodiment

As described above in the fourth to sixth embodiments, the seventh embodiment controls the quantization characteristics used in quantizing pixels in a lower hierarchy corresponding to a pixel in the top hierarchy in such a way that depending on the polarity of a quantization error occurring when the pixel in the top hierarchy was quantized, the quantization error in the pixels in the lower hierarchy will have the same polarity as in the quantization of the top hierarchy, and enables the quantizer circuits in higher hierarchies to execute finer quantization with a larger number of quantization bits (a smaller quantization width). Consequently, the effects of the first to third embodiments are not only provided but the degradation of image quality is also reduced during decoding.

According to the seventh embodiment, with respect to the fourth embodiment, the quantization characteristics of the quantizer circuits 147 to 149 are controlled so that the quantizer circuit 147 quantizes one bit, so that the quantizer circuit 148 quantizes four bits, and so that the quantizer circuit 149 quantizes sixteen bits. The numbers of quantized bits are selected considering the magnitude of the effects of quantization errors in higher hierarchies on decoded pixel values during the decoding of lower hierarchy data.

As a result, when the equation (10) described above is considered, the magnitude of the quantization error $E(Z_{11})$ is one-sixteenth of that of the quantization errors $E(X_{12})$, $E(X_{21})$, and $E(X_{22})$, and the magnitude of the quantization errors $E(Y_{13})$, $E(Y_{31})$, and $E(Y_{33})$ is one-fourth of that of the quantization errors $E(X_{12})$, $E(X_{21})$, and $E(X_{22})$. Thus, even if the quantization error $E(Z_{11})$ is multiplied by sixteen or the quantization errors $E(Y_{13})$, $E(Y_{3j})$, and $E(Y_{33})$ are multiplied by four to determine the pixel removed during decoding, the resulting error will be almost equal to the quantization errors $E(X_{12})$, $E(X_{21})$, and $E(X_{22})$ directly obtained by a reverse quantizer circuit 65. This can further reduce the degradation of the image quality of lower hierarchy pixels caused by quantization distortion in a higher hierarchy.

In addition, the effects of quantization errors in higher hierarchy data on lower hierarchy data are related to the number of hierarchies starting from the bottom hierarchy and the number of pixels used to generate top hierarchy data. Thus, by selecting that number of quantized bits for higher hierarchies which serves to minimize those quantization errors which may affect the bottom hierarchy depending on the number of existing hierarchies from the bottom hierarchy and the number of pixels used to generate top hierarchy data, the video signal encoding apparatus that can reduce the degradation of image quality can be provided.

When the number of quantized bits for higher hierarchies is increased in this manner, the amount of transmitted information appears to be increased, but in fact, the increase in the amount of information has been restrained so as not to produce adverse effects because the number of transmitted images is smaller in higher hierarchies.

In addition, with respect to the fifth and sixth embodiments, the quantization characteristics of the quantizer circuits 85 to 87 are controlled so that the quantizer circuit 85 quantizes one bit, so that the quantizer circuit 86 quantizes two bits, and so that the quantizer circuit 87 quantizes four bits.

The numbers of quantized bits assigned to the quantizer circuits according to the fourth embodiment are smaller than the numbers of quantized bits assigned to the quantizer circuits according to the fifth and sixth embodiments because in the latter embodiments, differential data between hierarchies is transmitted except for top hierarchy data. Thus, as is apparent from the comparison of the equation (3) to the equation (14), the equation (7) to the equation (19), and the equation (10) to the equation (22), a smaller multiplication coefficient is used to recover removed pixels in the fifth and sixth embodiments than in the fourth embodiment. That is, the number of quantized bits is determined by the magnitude of the effects of quantization errors on the lower hierarchies.

As described above, the video signal encoding apparatuses according to the fourth, fifth, sixth, and seventh embodiments of this invention prevents the transmission of pixel data corresponding to one of a plurality of lower hierarchy pixels used in the same averaging operation to generate one pixel for a higher hierarchy, and controls the quantization characteristics used in quantizing lower hierarchy pixels corresponding to a specific top hierarchy pixel in such a way that the quantization errors in the lower hierarchy pixels will have the same polarity as in the quantization of the top hierarchy pixel, thereby improving compression efficiency and enabling video coding with the degradation of image quality restrained.

(8) Eighth Embodiment

Figure 14:
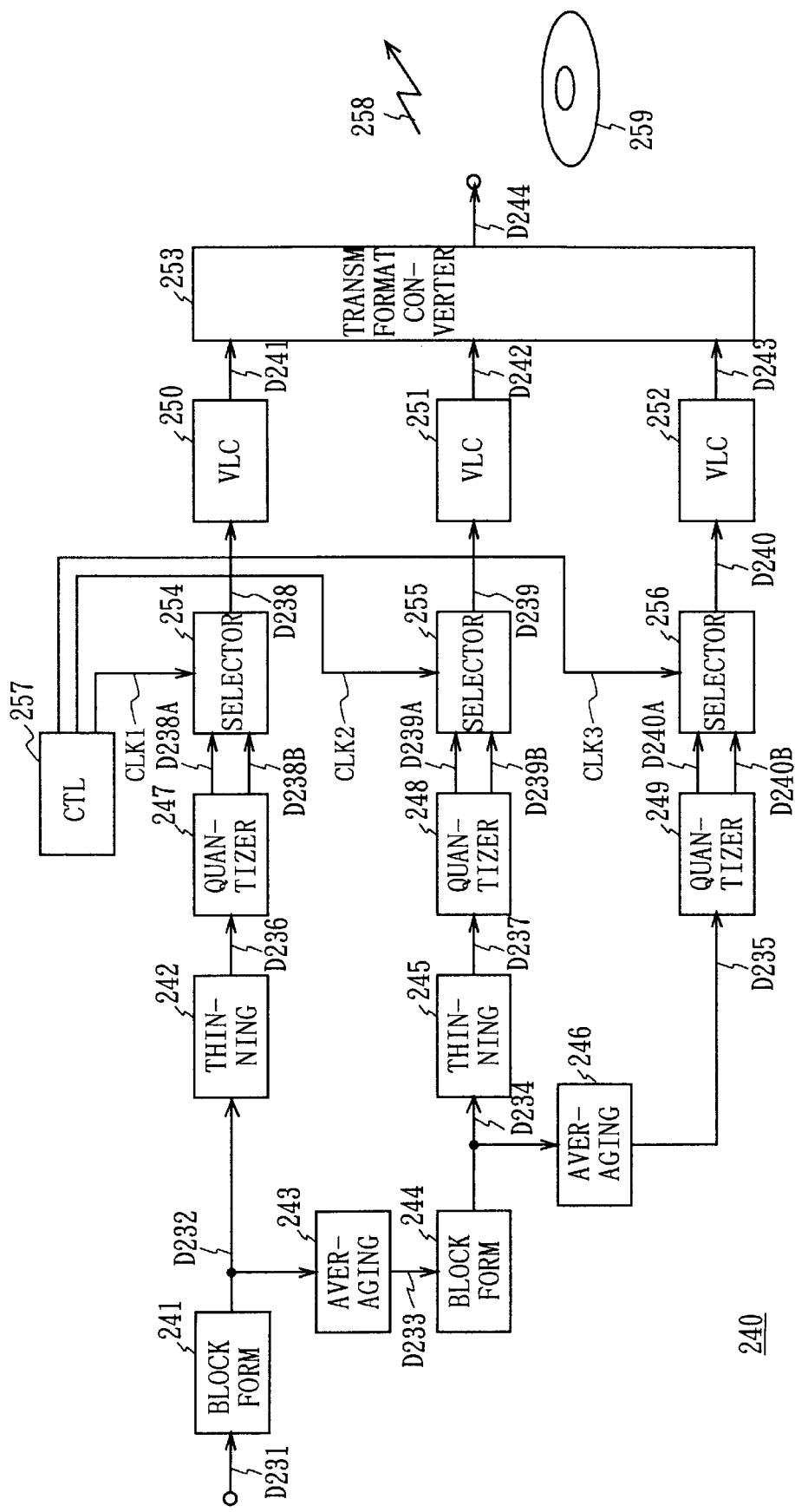
FIG. 14 is a block diagram showing the configuration of a video signal encoding apparatus according to an eighth embodiment.

FIG. 14 generally shows a video signal encoding apparatus 240 according to an eighth embodiment. The eighth embodiment shows the case in which three hierarchies of hierarchical data is formed and each compressed and encoded before transmission, as in the first embodiment. The same components as in the first embodiment are described using the equations and drawings used in the first embodiment. The video signal encoding apparatus 240 uses a blocking circuit 241 to divide high resolution input data D231 (hereafter referred to as "first hierarchy image data") into small blocks of 2 lines×2 pixels to form first hierarchy blocked data D232 and to then send it out to a thinning circuit 242 and an averaging circuit 243.

The averaging circuit 243 averages the pixel values in each block of the blocked data D232 to compress input image data D230 to one-fourth into second hierarchy image data D233, and transmits it to a blocking circuit 244. As in the blocking circuit 241, the blocking circuit 244 divides the second hierarchy image data D233 into small blocks of 2 lines×2 pixels to form second hierarchy blocked data D234 and to then send it out to a thinning circuit 245 and an averaging circuit 246.

As in the averaging circuit 243, the averaging circuit 246 averages the pixel values in each block of the blocked data D234 to compress the second hierarchy image data D233 to one-fourth or the first hierarchy image data D231 to one-sixteenth into third hierarchy image data D235. That is, as shown by the dotted lines in FIG. 4C, the averaging circuit 243 uses four pixels in a block in the first hierarchy (for example, $X_{11}$, $X_{12}$, $X_{21}$, and $X_{22}$) to perform an averaging operation using the equation (1) described above in order to generate a single pixel (for example, $Y_{11}$) for the second hierarchy shown in FIG. 4B. Pixels $Y_{13}$, $Y_{31}$, . . . are similarly generated by averaging four pixels in the first hierarchy.

Similarly, the averaging circuit 246 uses four pixels in a block in the second hierarchy (for example, $Y_{11}$, $Y_{13}$, $Y_{31}$, and $Y_{33}$) to perform an averaging operation using the equation (2) described above in order to generate a single pixel for the third hierarchy shown in FIG. 4C (for example, $Z_{11}$). Pixels $Z_{15}$, $Z_{51}$, . . . are similarly generated by averaging four pixels in the second hierarchy.

The thinning circuits 242 and 245 receives the blocked data D232 and D234 from the blocking circuits 241 and 244, respectively, removes one pixel from the blocked data D232 and D234 composed of four pixels to form thinned-out data D236, D237 composed of the three remaining pixels, and sends the thinned-out data D236 and D237 out to quantizer circuits 247 and 248, respectively. That is, the thinning circuit 242 uses a thinning operation to remove the pixels $X_{11}$, $X_{13}$, . . . shown by the dotted lines in FIG. 4C, while the thinning circuit 245 uses a thinning operation to remove the pixels $Y_{11}$, $Y_{15}$, . . . shown by the dotted lines in FIG. 4B.

Thus, the quantizer circuit 247 in the first hierarchy and the quantizer circuit 248 in the second hierarchy quantizes the pixels $X_{12}$, $X_{21}$, $X_{22}$, . . . and $Y_{13}$, $Y_{31}$, $Y_{33}$, . . . shown by the solid lines in FIGS. 4C and 4B, respectively. For the first hierarchy, the number of pixels to be transmitted can be reduced to three-fourth compared to the quantization and transmission of all the pixels in the first hierarchy. For the second hierarchy, the number of pixels to be transmitted can be reduced to three-fourth compared to the quantization and transmission of all the pixels in the second hierarchy which are generated by the averaging operation.

In general, compared to the compression and transmission of only the first hierarchy image data D231, the video signal encoding apparatus 240 can transmit image data in a plurality of hierarchies using the same number of transmitted pixels. As a result, the video signal encoding apparatus 240 can transmit image data in a plurality of hierarchies without increasing the amount of transmitted information. The pixels removed by the thinning circuits 242 and 245 can be recovered by a decoder (a receiver) described below, using a simple equation.

The quantization circuits 247, 248, and 249 re-quantizes each pixel (8 bits) in the thinned-out data D236 and D237 and the third hierarchy image data D235 into, for example, two bits to compress the information.

In this case, the quantizer circuits 247, 248, and 249 each execute quantization to allow quantization errors to have either a positive or a negative polarity instead of quantizing each pixel according to the distortion minimization norm. The quantizer circuit 247 generates positive re-quantized data D238A and negative re-quantized data D238B, the quantizer circuit 248 generates positive re-quantized data D239A and negative re-quantized data D239B, and the quantizer circuit 249 generates positive re-quantized data D240A and negative re-quantized data D240B. The circuits then sends the re-quantized data D238A and D238B, D239A and D239B, and D240A and D240B out to selectors 254, 255, and 256, respectively.

Image clock signals CLK1, CLK2, and CLK3 output from a controller 257 for controlling the overall video signal encoding apparatus 240 are input to the selectors 254, 255, and 256. The selectors alternatively selects between the positive re-quantized data D238A and the negative re-quantized data D238B, between the positive re-quantized data D239A and the negative re-quantized data D239B, and between the positive re-quantized data D240A and the negative re-quantized data D240B based on the timing with which the clock signal has been input, and transmits the selected re-quantized data as re-quantized data D238, D237, D240 to the variable length coding circuit (VLC) 50. In effect, the image clock signals CLK1 to CLK3 output from the controller 257 have an image clock frequency that decreases to three-fourths from one hierarchy to the next higher hierarchy. Thus, if the frequency of the image clock signal CLK1 is referred to as (f), the frequency of the image clock signal CLK2 is set at f/4 and the frequency of the image clock signal CLK3 is set at f/16.

The quantizer circuits 247 to 249 are specifically described with reference to FIG. 15. This figure shows two-bit quantization in which if input data comprises 8 bits per pixel and has a level between "0" and "255", a quantization value "0" is output for the level between "0" to "63", a quantization value "1" is output for the level between "64" to "127", a quantization value "2" is output for the level between "128" to "191", and a quantization value "3" is output for the level between "192" to "255". This is called the distortion minimization norm that has been generally used to minimize quantization errors.

Instead of using the distortion minimization norm, the quantizer circuits 247 to 249 according to the eighth embodiment executes quantization to allow the quantization error in each pixel to have either a positive or a negative polarity. If, for example, image data input to the quantizer circuits 247 to 249 is at the level L1 shown in FIG. 15, the quantizer circuits 247 to 249 output the quantization value "3" as positive re-quantized data D238A, D239A, and D240A, respectively, so as to provide positive quantization errors, (+δ1 in FIG. 15), while outputting the quantization value "2" as negative re-quantized data D238B, D239B, and D240B, respectively, so as to provide negative quantization errors (−δ2 in FIG. 15).

Figure 15:
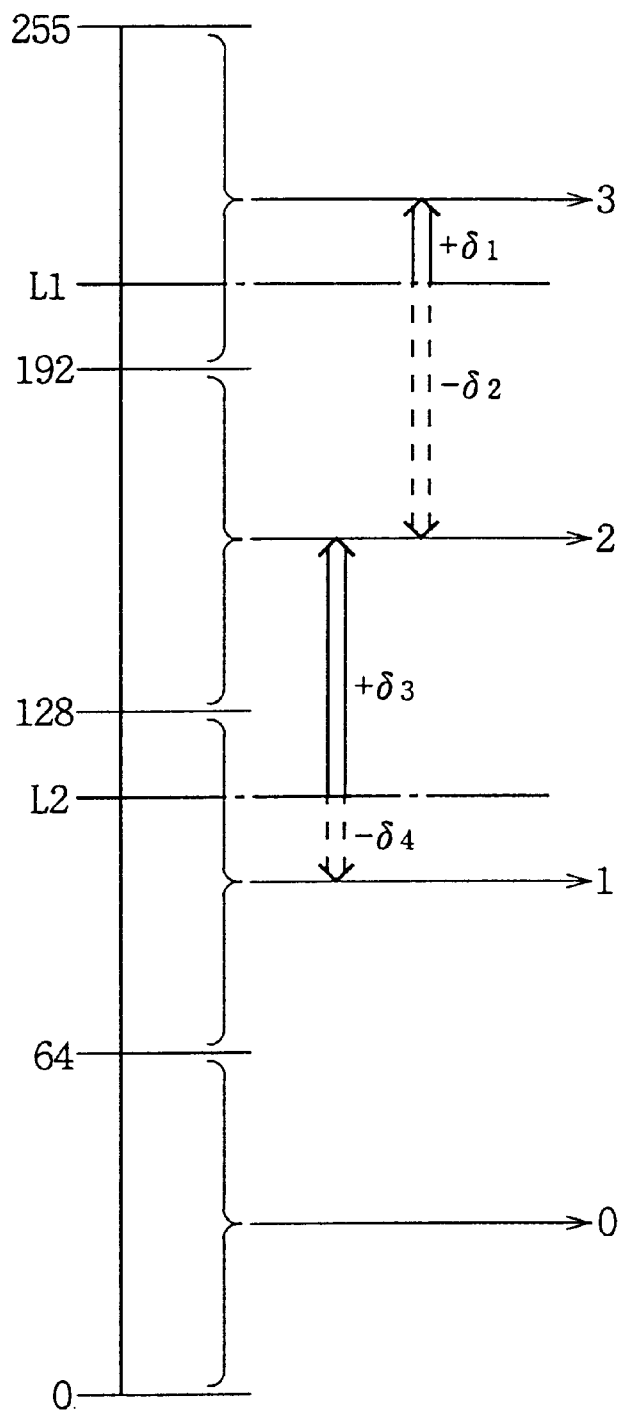
FIG. 15 is a diagram explaining the quantization characteristics according to the eighth, a ninth, and a tenth embodiment.

Likewise, if input data has a level such as L2 shown in FIG. 15, the quantizer circuits 247 to 249 each output the quantization value "2" as the positive re-quantized data D238A, D239A, and D240A and the quantization value "1" as the negative re-quantized data D238B, D239B, and D240B.

Each of the pixels in FIG. 4C is sequentially input to the thinning circuit 242, the quantizer circuit 247, and the selector 254 in blocks as shown by the dotted lines. The pixels are input, for example, in order of $X_{12}$, $X_{21}$, $X_{22}$, $X_{14}$, $X_{23}$, $X_{24}$, . . . . Thus, based on the clock signal CLK1 from the controller 257, the selector 254 alternatively selects between the quantized data D238A quantized so as to have a positive error for each block and the quantized data D238B quantized so as to have a negative error and outputs the selected data. This prevents the three pixels in the block, for example, the pixels $X_{12}$, $X_{21}$, and $X_{22}$ from having a quantization error of the same polarity. This further avoids block distortion that may occur if all the pixels in the block have a quantization error of the same polarity, thereby restraining the degradation of image quality.

Likewise, each of the pixels in FIG. 4B is sequentially input to the thinning circuit 245, the quantizer circuit 248, and the selector 255 in blocks as shown by the dotted lines. The pixels are input, for example, in the order of $Y_{13}$, $Y_{31}$, $Y_{33}$, $Y_{17}$, $Y_{35}$, $Y_{37}$, . . . . Thus, based on the clock signal CLK2 from the controller 257, the selector 255 alternatively selects between the quantized data D239A quantized so as to have a positive error for each block and the quantized data D239B quantized so as to have a negative error and outputs the selected data. This prevents the three pixels in the block, for example, the pixels $Y_{13}$, $Y_{31}$, and $Y_{33}$ from having a quantization error of the same polarity. This further avoids block distortion that may occur if all the pixels in the block have a quantization error of the same polarity, thereby restraining the degradation of image quality.

Furthermore, each of the pixels in FIG. 4A is sequentially input to the quantizer circuit 249 and the selector 256 in blocks as shown by the dotted lines. The pixels are input, for example, in the order of $Z_{15}$, $Z_{51}$, $Z_{55}$, . . . . Thus, based on the clock signal CLK3 from the controller 257, the selector 256 alternatively selects between the quantized data D240A quantized so as to have a positive error for each block and the quantized data D240B quantized so as to have a negative error and outputs the selected data. This prevents the three pixels in the block, for example, the pixels $Z_{15}$, $Z_{51}$, and $Z_{55}$ from having a quantization error of the same polarity. This further avoids block distortion that may occur if all the pixels in the block have a quantization error of the same polarity, thereby restraining the degradation of image quality.

Re-quantized data D38, D39, and D40 output from the selectors 254, 255, and 256 is supplied to variable length coding circuits (VLC) 250, 251, and 252. The variable length coding circuits 250 to 252 each assign a shorter Hoffman code to a more frequently-generated quantization code in the re-quantized data D238 to D240 to form first hierarchy coded data D41, second hierarchy coded data D42, and third hierarchy coded data D43 which represent the re-quantized data D38 to D40, respectively, using as small amount of codes as possible, and sends these data D241 and D243 out to a transmission format conversion circuit 253.

The transmission format conversion circuit 253 forms transmit image data D244 by arranging the first hierarchy coded data D241, the second hierarchy coded data D242, and the third hierarchy coded data D243 in a specified order and providing identification codes for identifying the hierarchy of each coded data, and outputs the data D244. The output transmit image data D244 is subsequently supplied to the receiver via a communication path 258 or recorded on a recording medium 259 such as a disc, a tape, or a semiconductor memory via a recording path.

According to the eighth embodiment described above, the quantizer circuit in each hierarchy outputs two types of re-quantized data (that is, the re-quantized data so as to have a positive error and the re-quantized data so as to have a negative error) to the selector, and alternatively selects between these data and outputs the selected data, according to the clock signal from the controller. This invention, however, is not limited to this aspect, and the selectors may not be used. That is, the clock signals CLK1, CLK2, and CLK3 from the controller 257 may be directly supplied to the quantizer circuits 247, 248, and 249, respectively, and each of the quantizer circuits 247, 248, and 249 alternatively carries out quantization with positive and negative errors based on the clock signal so as to dither the pixels in the block $X_{12}$, $X_{21}$, and $X_{22}$. Consequently, as in the above embodiments, block distortion that may occur if all the pixels in the block have a quantization error of the same polarity, thereby restraining the degradation of image quality. Due to the need for the quantizer circuits to calculate only one re-quantized data for each pixel as well as the lack of selectors, this variation can significantly reduce the size of the circuits.

A video signal decoder for decoding the transmit image data D244 formed in this manner can be configured, for example, as shown in FIG. 5 described above.

As described above, the video signal encoding apparatus according to the eighth embodiment of this invention uses the average value of a plurality of lower hierarchy pixels to generate higher hierarchy pixels in order to produce image data D31, D33, and D35 for the plurality of hierarchies.

In addition, for image data in those hierarchies other than the top hierarchy, that is, the third hierarchy, the video signal encoding apparatus 240 excludes one of the pixels used in the same averaging operation because it can be recovered by the decoder using a simple mathematics operation. Consequently, the video signal encoding apparatus 240 can implement hierarchical coding processing without an increase in the number of pixels to be transmitted due to the hierarchical structure.

The video signal encoding apparatus 240 uses the quantizer circuits 247 to 249 to re-quantize each hierarchical image data in order to compress the data in each hierarchy. As a result, the re-quantized data D238, D239, and D240 each necessarily include a quantization error occurring during re-quantization. As the quantization error becomes larger, decoded image data D258, D260, and D262 have a larger difference from the true values, thereby degrading image quality.

That is, since the second hierarchy pixel $Y_{11}$ to be decoded is generated on the basis of the equation (3) described above, the decoded value $Y_{11}'$ is as shown in the equation (7) and is affected by the quadruple value of the quantization error in $Z_{11}$.

In addition, the decoded values $X_{12}'$, $X_{21}'$, $X_{22}'$, $X_{14}'$, $X_{23}'$, and $X_{24}'$ of the first hierarchy pixels $X_{12}$, $X_{21}$, $X_{22}$, $X_{14}$, $X_{23}$, and $X_{24}$ are as shown in the equation (8) described above. The first hierarchy pixels $X_{13}$, $X_{31}$, and $X_{33}$ to be decoded are generated on the basis of the equation (4) described above. Thus, the decoded values $X_{13}'$, $X_{31}'$ and $X_{33}'$ are as shown in the equation (9) described above and are affected by the quadruple values of the quantization errors in the higher hierarchy pixels $Y_{13}$, $Y_{31}$, and $Y_{33}$.

For the first hierarchy pixel $X_{11}$ to be decoded, as shown in the equation (10) described above, the decoded value $X_{11}'$ is affected by the quadruple values of the quantization errors in the higher (second) hierarchy pixels $Y_{13}$, $Y_{31}$, and $Y_{33}$ and a value as sixteen times as large as the quantization error in the higher (third) hierarchy pixel $Z_{11}$.

The magnitude of the effects of the quantization errors $E(Z_{11})$, $E(Y_{13})$, $E(Y_{31})$, . . . on the decoded pixel values $Z_{11}'$, $Y_{11}'$, $Y_{13}'$, . . . is shown in FIG. 6. As is apparent from this figure, quantization errors in a higher hierarchy significantly affects decoded values in a lower hierarchy.

If decoded values in a higher hierarchy has continuous quantization errors of either a positive or a negative polarity, the errors not only appear as block distortion in that higher hierarchy but also affect a lower hierarchy.

Thus, the eighth embodiment reduces in all the hierarchies the degradation of image quality caused by quantization distortion by allowing adjacent pixels to each have a quantization error of an opposite polarity (dithering) when an image in each hierarchy is compressed through quantization.

As described above, the eighth embodiment of this invention prevents the transmission of image data $Y_{11}$, $Y_{15}$, . . . , $X_{11}$, $X_{13}$, . . . corresponding to one of a plurality of lower hierarchy pixels used in the same averaging operation to generate one higher hierarchy pixel, and when quantizing the pixel data in each hierarchy, alternatively inverses the polarity of the quantization error between the positive and the negative polarities, thereby improving compression efficiency and reducing the degradation of image quality.

(9) Ninth Embodiment

Figure 16:
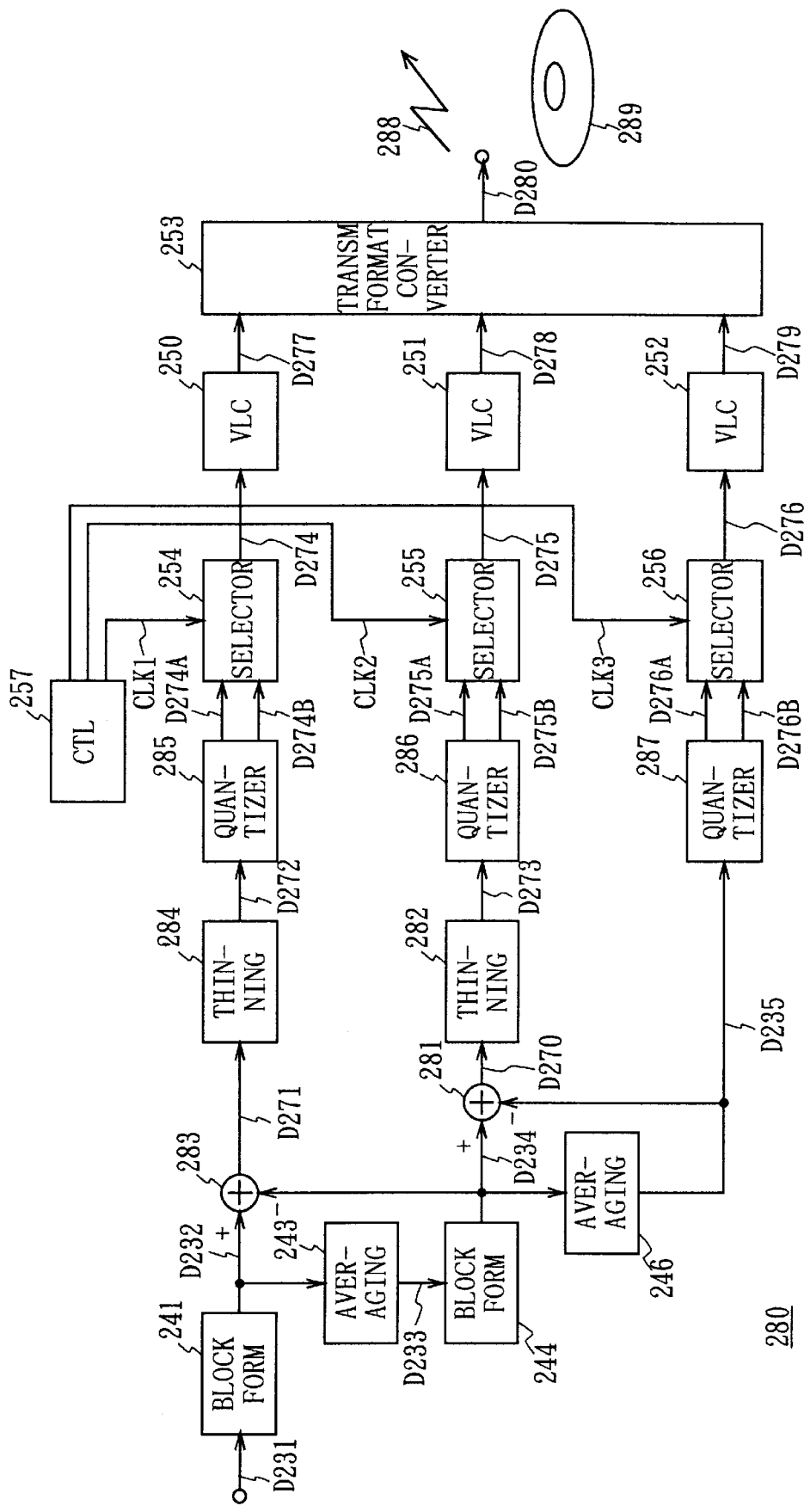
FIG. 16 is a block diagram showing the configuration of a video signal encoding apparatus according to the ninth embodiment.

FIG. 16 generally shows a video signal encoding apparatus 280 according to a ninth embodiment of this invention. Compared to the eighth embodiment, this apparatus has the same configuration as the video signal encoding apparatus 240 in FIG. 14 except that the differential data between hierarchies is compressed and coded except for the top hierarchy. Thus, the same components as in FIG. 14 has the same reference numerals.

While the video signal encoding apparatus 240 according to the fourth embodiment transmits each pixel using the pulse code modulation (PCM), the video signal encoding apparatus 280 according to the ninth embodiment transmits each pixel using the differential pulse code modulation (DPCM). Thus, the video signal encoding apparatus 280 can further reduce the amount of information to be transmitted.

Specifically, the video signal encoding apparatus 280 supplies the third hierarchy image data D235 and the second hierarchy blocked data D234 to a differential circuit 281. The differential circuit 281 then calculates the differential between a pixel in the third hierarchy image data D235 and the spatially corresponding pixels in the second hierarchy blocked data D234 to form second hierarchy differential data D270, and sends this data D270 to a thinning circuit 282. In this case, the differential circuit 281 determines the differential values $\Delta Y_{13}$, $\Delta Y_{31}$, and $\Delta Y_{33}$ of the second hierarchy pixels $Y_{13}$, $Y_{31}$, and $Y_{33}$ as described in the equation (11), using the higher hierarchy pixel $Z_{11}$ corresponding to these pixels.

The video signal encoding apparatus 280 similarly supplies the second hierarchy image data D234 and the first hierarchy blocked data D232 to a differential circuit 283. The differential circuit 283 then calculates the differential between pixels in the second hierarchy image data D234 and the spatially corresponding pixels in the first hierarchy blocked data D232 to form first hierarchy differential data D271, and sends this data D271 to a thinning circuit 284. In this case, the differential circuit 283 determines the differential values $\Delta X_{12}$, $\Delta X_{21}$, and $\Delta X_{22}$ of the first hierarchy pixels $X_{12}$, $X_{21}$, and $X_{22}$ as described in the equation (12), using the higher hierarchy pixel $Y_{11}$ corresponding to these pixels.

The thinning circuits 284 and 282 receive the blocked data D232 and D234 from the blocking circuit 241 and the blocked data D244, respectively, as in the thinning circuits 242 and 245 shown in FIG. 14 described above. The thinning circuits 284 and 282 remove one pixel from the first and second hierarchy differential data D271 and D270, respectively, including four pixels in each block so as to correspond to the blocked data D232 and D234 composed of four pixels, respectively. The thinning circuits 284 and 282 thus form hierarchical differential thinned-out data D272 and D273 composed of the three remaining pixels, and transmit these data D272 and D273 to quantizer circuits 285 and 286.

The quantizer circuit 285, 286, or 287 in each hierarchy executes quantization to allow the quantization error in each input pixel to have either a positive or a negative polarity, and outputs pairs of positive re-quantized data with a positive quantization error D274A, D275A, and D276A and negative re-quantized data with a negative quantization error D274B, D275B, and D276B. The positive or the negative polarity is alternatively selected in such a manner that if the selector 254, 255, or 256 selects the positive re-quantized data D274A, D275A, or D276A for a pixel at a particular location based on the clock signal CLK1, CLK2, or CLK3, it will select the negative re-quantized data D274B, D275B, or D276B for the next pixel.

Re-quantized data D274, D275, and D276 output from the selectors 254, 255, and 256, respectively, is variable-length-coded by the variable length coding circuits (VLCs) 250, 251, and 252 and output as first, second, and third hierarchy coded data D277, D278, and D279. The first, second, and third hierarchy coded data D277, D278, and D279 is then input to the transmission format conversion circuit 253, which forms and outputs transmit image data D280. The output transmit image data D288 is subsequently supplied to the receiver via the communication path 257 or recorded on the recording medium 259 such as a disc, a tape, or a semiconductor memory via a recording path.

As a variation, the clock signals from the controller may be directly supplied to the quantizer circuits, which may alternatively generate re-quantized data with either the positive or the negative polarity, as described above in the eighth embodiment. This variation does not have selectors.

A video signal decoder for decoding the transmit image data D280 formed in this manner can be configured as shown in FIG. 8.

The video signal encoding apparatus 280 according to the ninth embodiment transmits hierarchical differential data between hierarchies as transmit data except for top hierarchy data, as in the second and fifth embodiments. That is, the equation (7) described above has a multiplication coefficient of "4" for the quantization error $E(Z_{11})$ in the third hierarchy pixel $Z_{11}$, whereas the equation (19) described above has a multiplication coefficient of "2" for the same error $E(Z_{11})$. This means that the coding and decoding according to the fifth embodiment can reduce the effects of quantization errors in a third hierarchy pixel on the decoding of second hierarchy pixels to half. That is, as is apparent from the equation (19), since the differential between hierarchies is calculated, the quantization error in the third hierarchy pixel Z11 is reflected in all the second hierarchy decoded pixel values $Y_{11}'$, $Y_{13}'$, $Y_{31}'$, and $Y_{33}'$. This embodiment can thus reduce the effects of quantization errors in third hierarchy pixels on the decoding of second hierarchy pixels.

In addition, as is apparent from the equation (22) described above, the decoded value $X_{11}'$ of the first hierarchy pixel $X_{11}$ is affected by the quadruple value of the quantization error in $Z_{11}$ and the doubled value of the quantization errors in $Y_{13}$, $Y_{31}$, and $Y_{33}$. As is apparent from the comparison of the equation (22) to the equation (10), however, the effects of the quantization errors in $Z_{11}$, $Y_{13}$, $Y_{31}$, and $Y_{33}$ on the decoded value $X_{11}'$ are significantly smaller than in the eighth embodiment.

That is, as is apparent from, for example, the equation (10), the eighth embodiment reflects the quantization errors in the third hierarchy pixel $Z_{11}$ and in the second hierarchy pixels $Y_{13}$, $Y_{31}$, and $Y_{33}$, only in the first hierarchy decoded pixel value $X_{11}'$ and not in the first hierarchy decoded pixels $X_{12}'$, $X_{21}'$, and $X_{22}'$.

According to the ninth embodiment, however, as is apparent from the equation (22), since the differential between hierarchies is calculated, the quantization error in the third hierarchy pixel $Z_{11}$ and the quantization errors in the second hierarchy pixels $Y_{13}$, $Y_{31}$, and $Y_{33}$ are reflected in the first hierarchy decoded pixels $X_{11}'$, $X_{12}'$, $X_{21}'$, and $Y_{22}'$. This embodiment can thus reduce the effects of quantization errors in third and second hierarchy pixels on the decoding of first hierarchy pixels.

Thus, according to the video signal encoding apparatus in accordance with the ninth embodiment, the video signal coding apparatus 280 for generating hierarchical differential data between the image data in each of a plurality of hierarchies obtained from the input image data D231 through the averaging operation and the data in the adjacent higher hierarchy and quantizing the top hierarchy data D235 and a plurality of differential data between hierarchies D272 and D273 to generate a plurality of hierarchical coded data, prevents the transmission of the differential pixel data $\Delta Y_{11}$, $\Delta Y_{15}$, . . . , $\Delta X_{11}$, $\Delta X_{13}$, . . . which can be decoded by a mathematics operation using pixels in a hierarchy different from the top hierarchy and the corresponding pixels in the adjacent lower hierarchy, and when quantizing the pixel data in each hierarchy, alternatively inverses the polarity of the quantization error between the positive and the negative polarities, thereby improving compression efficiency with the degradation of image quality restrained.

(10) Tenth Embodiment

Figure 17:
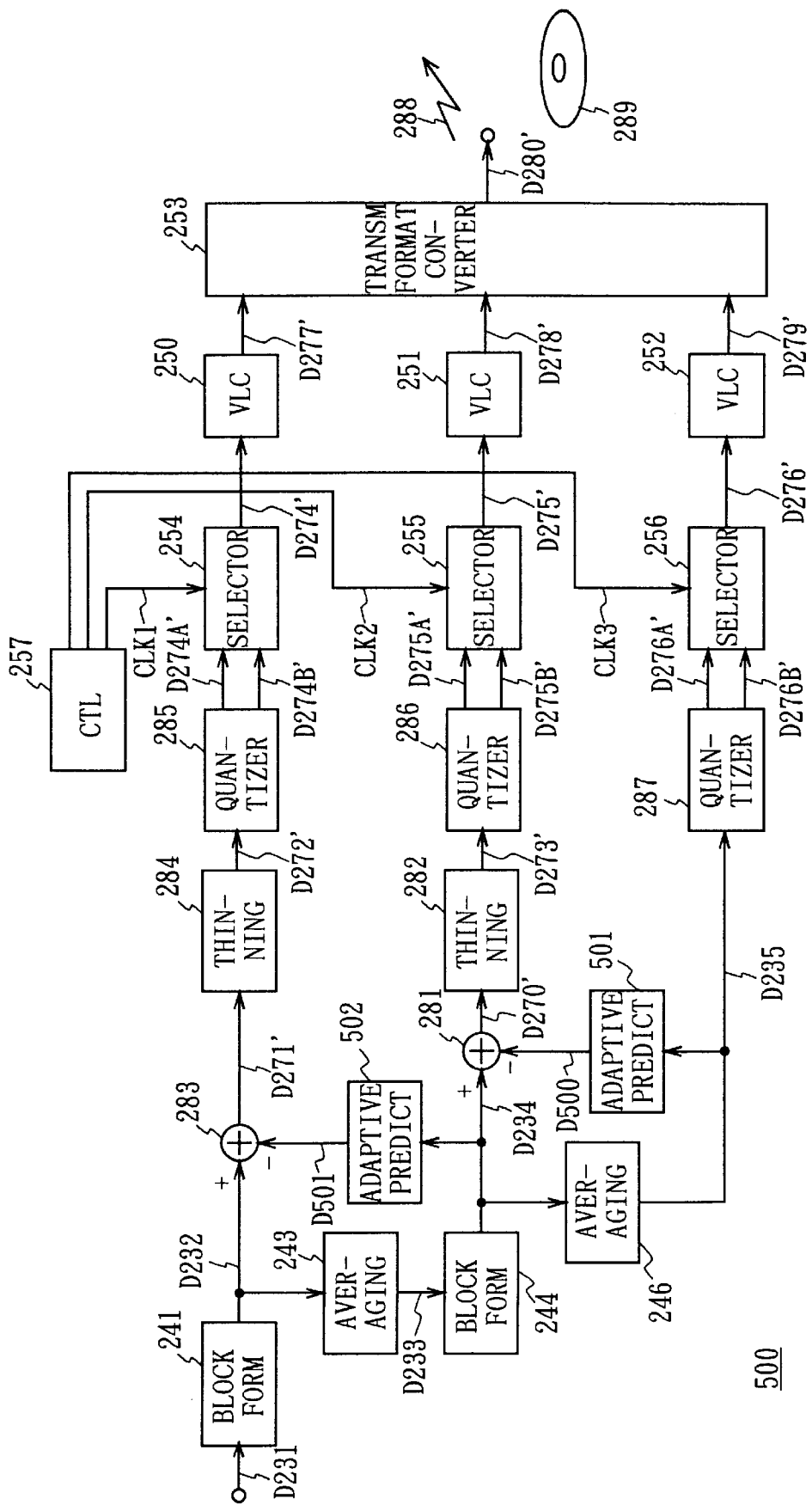
FIG. 17 is a block diagram showing the configuration of a video signal encoding apparatus according to the tenth embodiment.

FIG. 17 generally shows a video signal encoding apparatus 500 according to a tenth embodiment. Compared to the tenth embodiment, the video signal encoding apparatus 500 has a configuration similar to that of the video signal encoding apparatus 280 according to the tenth embodiment except for adaptive prediction circuits 501 and 502. Thus, the same components as in FIG. 16 have the same reference numerals.

The adaptive prediction circuit 501 executes predetermined prediction processing based on the third hierarchy image data D235 to generate second hierarchy predicted data D500 corresponding to the second hierarchy image data D234. The second hierarchy predicted data is then sent out to the differential circuit 281. Likewise, the adaptive prediction circuit 502 executes predetermined prediction processing based on the second hierarchy image data D234 to generate first hierarchy predicted data D501 corresponding to the first hierarchy image data D232. The first hierarchy predicted data is then sent out to the differential circuit 283.

In effect, the adaptive prediction circuits 501 and 502 utilize classification-adaptive processing to predict one lower hierarchy pixel from a plurality of higher hierarchy pixels. Specifically, the lower hierarchy pixel to be predicted is classified on the basis of the level distribution of a plurality of higher hierarchy pixels located spatially near the lower hierarchy pixel. In addition, the adaptive prediction circuits 501 and 502 have a memory that stores a plurality of prediction coefficients or one predicted value for each class which have been obtained through learning, and reads from this memory the plurality of prediction coefficients or one predicted value corresponding to the class determined through classification. The predicted value is directly used as a predicted pixel, while the prediction coefficients are linearly primarily combined with the plurality of pixels to generate a predicted value. If the predict ed value is normalized, it is subjected to predetermined processing to generate a predicted pixel. The details of such classification-adaptive processing are described in U.S. patent application Ser. No. 08/504,040. In addition,, algorithms for such classification-adaptive processing have been known. Although the classification-adaptive processing algorithm has been used in the adaptive prediction circuit according to the tenth embodiment, this invention is not limited to this aspect and other current prediction methods may be used.

As described above, to the video signal encoding apparatus 500 according to the tenth embodiment described above can implement not only produces the effects of the ninth embodiment but also further reduces the differential between first hierarchy differential data D271' and second hierarchy differential data D270' obtained from the differential circuits 283 and 281, respectively, to further reduce the amount of information to be transmitted.

Although the eighth to tenth embodiments described above have been-described in conjunction with the quantization in which the polarities of the quantization errors in adjacent pixel data are alternatively inverted in all the hierarchies, this invention is not limited to this aspect but such quantization may be carried out only in a hierarchy selected as required.

In addition, although the eighth to tenth embodiments described above have been described in conjunction with the quantization in which the polarities of the quantization errors in adjacent pixel data are alternatively inverted in all the hierarchies, the quantizer circuits in higher hierarchies may execute finer quantization with a larger number of quantization bits (a smaller quantization width). This can further reduce the degradation of image quality during decoding. This is because quantization errors in higher hierarchies may affect lower hierarchies during decoding, as described above. In addition, the effects of quantization errors in higher hierarchy data on lower hierarchy data are related to the number of hierarchies starting from the bottom hierarchy and the number of pixels used to generate top hierarchy data. Thus, the number of quantized bits or quantization width may depend on the above points.

Although the eighth to tenth embodiments described above have been described in conjunction with the quantization in which the polarities of the quantization errors in adjacent pixel data are alternatively inverted in all the hierarchies, this invention is not limited to this aspect, and the same effects as in the above embodiments can be obtained by, instead of alternatively inverting the polarity, randomly inverting the polarity of quantization errors in such a way that an excessive number of continuous errors of the same polarity are avoided.

As described above, the eighth to tenth inventions of this invention can implement hierarchical coding with the degradation of image quality reduced during decoding by randomly inverting the polarity of quantization errors in adjacent pixel data when quantizing image data in a plurality of hierarchies generated by the averaging operation.

As described above, the eighth to tenth inventions of this invention can implement hierarchical coding with the degradation of image quality reduced during decoding by randomly inverting the polarity of quantization errors in adjacent pixel data when quantizing image data in a plurality of hierarchies generated by the averaging operation.

(11) Eleventh Embodiment

Figure 18:
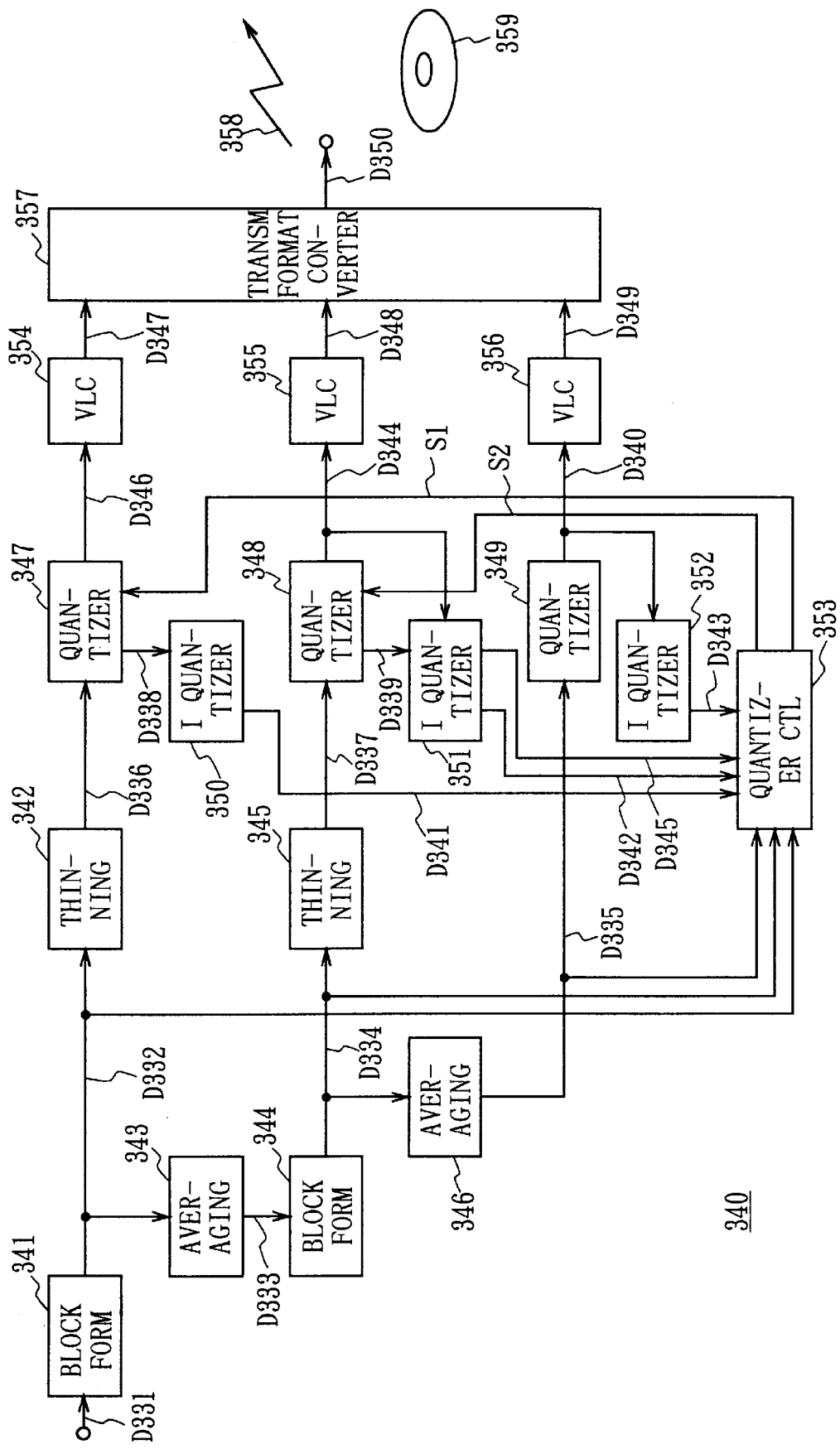
FIG. 18 is a block diagram showing the configuration of a video signal encoding apparatus according to a eleventh embodiment.

FIG. 18 generally shows a video signal encoding apparatus 340 according to an eleventh embodiment. The eleventh embodiment shows the case in which three hierarchies of hierarchical data is formed and each compressed and encoded before transmission, as in the first embodiment. The same components as in the first embodiment are described using the equations and drawings used in the first embodiment. The video signal encoding apparatus 340 uses a blocking circuit 341 to divide high resolution input data D331 (hereafter referred to as "first hierarchy image data") into small blocks of 2 lines×2 pixels to form first hierarchy blocked data D332 and to then send it out to a thinning circuit 342 and an averaging circuit 343.

The averaging circuit 343 averages the pixel values in each block of the blocked data D332 to compress input image data D330 to one-fourth into second hierarchy image data D333, and transmits it to a blocking circuit 344. As in the blocking circuit 341, the blocking circuit 344 divides the second hierarchy image data D333 into small blocks of 2 lines×2 pixels to form second hierarchy blocked data D334 and to then send it out to a thinning circuit 345 and an averaging circuit 346.

As in the averaging circuit 343, the averaging circuit 346 averages the pixel values in each block of the blocked data D334 to compress the second hierarchy image data D333 to one-fourth or the first hierarchy image data D331 to one-sixteenth into third hierarchy image data D335. That is, as shown by the dotted lines in FIG. 4C, the averaging circuit 343 uses four pixels in a block in the first hierarchy (for example, $X_{11}$, $X_{12}$, $X_{21}$, and $X_{22}$) to perform an averaging operation using the equation (1) described above in order to generate a single pixel (for example, $Y_{11}$) for the second hierarchy shown in FIG. 4B. Pixels $Y_{13}$, $Y_{31}$, . . . are similarly generated by averaging four pixels in the first hierarchy.

Similarly, the averaging circuit 346 uses four pixels in a block in the second hierarchy (for example, $Y_{11}$, $Y_{13}$, $Y_{31}$, and $Y_{33}$) to perform an averaging operation using the equation (2) described above in order to generate a single pixel for the third hierarchy shown in FIG. 4C (for example, $Z_{11}$). Pixels $Z_{15}$, $Z_{51}$, . . . are similarly generated by averaging four pixels in the second hierarchy.

The thinning circuits 342 and 345 receives the blocked data D332 and D334 from the blocking circuits 341 and 344, respectively, removes one pixel from the blocked data D332 and D334 composed of four pixels to form thinned-out data D336, D337 composed of the three remaining pixels, and sends the thinned-out data D336 and D337 out to quantizer circuits 347 and 348, respectively. That is, the thinning circuit 342 uses a thinning operation to remove the pixels $X_{11}$, $X_{13}$, . . . shown by the dotted lines in FIG. 4C, while the thinning circuit 345 uses a thinning operation to remove the pixels $Y_{11}$, $Y_{15}$, . . . shown by the dotted lines in FIG. 4B.

Thus, the quantizer circuit 347 in the first hierarchy and the quantizer circuit 348 in the second hierarchy quantizes the pixels $X_{12}$, $X_{21}$, $X_{22}$, . . . and $Y_{13}$, $Y_{31}$, $Y_{33}$, . . . shown by the solid lines in FIGS. 4C and 4B, respectively. For the first hierarchy, the number of pixels to be transmitted can be reduced to three-fourth compared to the quantization and transmission of all the pixels in the first hierarchy. For the second hierarchy, the number of pixels to be transmitted can be reduced to three-fourth compared to the quantization and transmission of all the pixels in the second hierarchy which are generated by the averaging operation.

In general, compared to the compression and transmission of only the first hierarchy image data D331, the video signal encoding apparatus 340 can transmit image data in a plurality of hierarchies using the same number of transmitted pixels. As a result, the video signal encoding apparatus 340 can transmit image data in a plurality of hierarchies without increasing the amount of transmitted information. The pixels removed by the thinning circuits 342 and 345 can be recovered by a decoder (a receiver) described below, using a simple equation.

Figure 19:
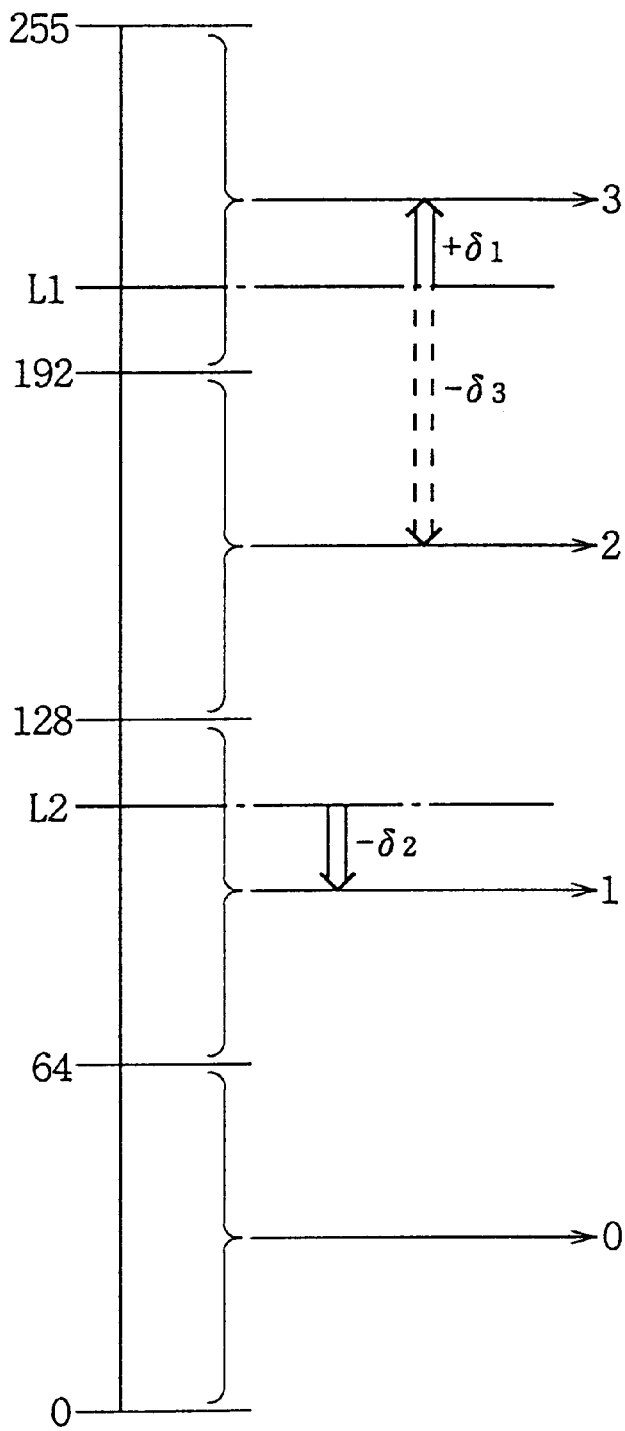
FIG. 19 is a diagram explaining the control of quantization characteristics according to the eleventh, a twelfth, and a thirteenth embodiments.

The quantization circuits 347, 348, and 349 re-quantizes each pixel (8 bits) in the thinned-out data D336 and D337 and the third hierarchy image data D335 according to the distortion minimization norm. For example, these quantizer circuits re-quantizes and compresses each input pixel into two bits to form re-quantized data D338, D339, and D340. That is, as shown in FIG. 19, if input data comprises eight bits per pixel and has a level between "0" and "255", a quantization value "0" is output for the level between "0" to "63", a quantization value "1" is output for the level between 64 to 127, a quantization value "2" is output for the level between "128" to "191", and a quantization value "3" is output for the level between "192" to "255". Thus, the quantization value "3" is output for level L1 input pixels, and the quantization value "1" is output for level L2 input pixels.

The quantizer circuits 347, 348, and 349 sends the re-quantized data D338, D339, and D340 out to inverse quantizer circuits 350, 351, and 352, respectively. The inverse quantizer circuits 350, 351, and 352 carries out inverse quantization to convert the re-quantized data D338, D339, and D340 back into the original 8-bit data in order to generate decoded data D341, D342, and D343, and transmits these data D341, D342, and D343 to a quantizer control circuit 353. That is, the re-quantized data D338 to D340 obtained by the quantizer circuits 347 to 349 is locally decoded by the inverse quantizer circuits 350, 351, and 352 and then input to the quantizer control circuit.

First, second, and third hierarchy image data D332, D334, and D335 is also supplied to the quantizer control circuit 353. The inverse quantizer circuit 353 compares the values of the decoded data D341 to D343 obtained from the inverse quantizer circuit 347 to 349 to the values of the hierarchical image data D332, D334, and D335 to determine the difference between the pre-quantization image data and the decoded data of the quantized image data, that is, the value of the quantization error. Depending on this value of the quantization error, the quantizer control circuit 353 outputs quantization signals S301 and S302 for controlling the quantization characteristics of the first and second hierarchy quantizer circuits 47 and 48, respectively.

Figure 20:
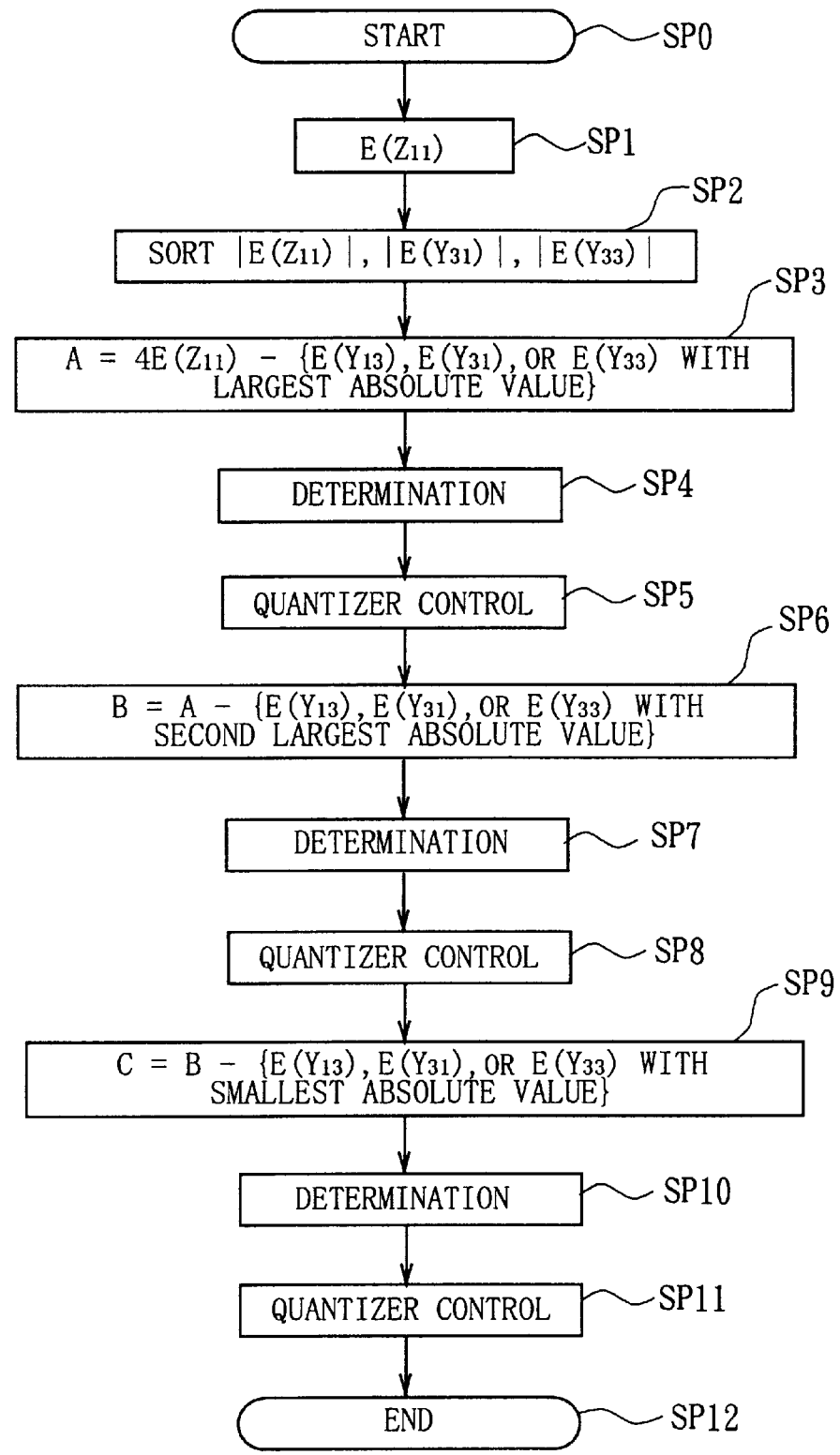
FIG. 20 is a flowchart explaining the quantizer control procedure according to the eleventh, the twelfth, and the thirteenth embodiments.

According to the eleventh embodiment, the quantizer control circuit 353 executes the quantizer control procedure shown in FIG. 20 in order to control the quantizer circuits 347 and 348. This quantizer control is provided for each spatially corresponding block in each hierarchy. That is, after initiating the processing procedure in step SP0, the quantizer control circuit 353 calculates the differential between the third hierarchy decoded data D343 obtained from the inverse quantizer circuit 352 and the third hierarchy image data D335 (that is, the true value) obtained from the averaging circuit 346 to determine the quantization error value of the third hierarchy, in the subsequent step SP1. FIG. 20 shows the quantization error value of the third hierarchy pixel $Z_{11}$ as $E(Z_{11})$.

Next, in step SP2, the quantizer control circuit 353 calculates the differential between the second hierarchy decoded data D342 obtained from the inverse quantizer circuit 351 and the second hierarchy image data D334 (that is, the true value) obtained from the blocking circuit 344 to determine the quantization error value of the second hierarchy. In this case, quantization error values $E(Y_{13})$, $E(Y_{31})$, and $E(Y_{33})$ spatially corresponding to the third hierarchy pixel $Z_{11}$ are shown. In step SP2, these quantization error values $E(Y_{13})$, $E(Y_{31})$, and $E(Y_{33})$ are arranged in the descending order of their absolute values.

Next, in step SP3, the quantizer circuit 353 calculates the differential between the quantization error value of the third hierarchy $E(Z_{11})$ and the largest absolute value of the spatially corresponding quantization error values of the second hierarchy $E(Y_{13})$, $E(Y_{3j})$, and $E(Y_{33})$. In this case, the lower hierarchy is affected by the quadruple value of the quantization error in the third hierarchy. Thus, if $E(Y_{13})$ has the largest absolute value, "A=4×$E(Z_{11})$−$E(Y_{13})$" is calculated. In step SP4, the polarity and magnitude of the differential "A" are determined. As a result, in step SP5, the quantizer control circuit 353 transmits to the quantizer circuit 348 the quantizer control signal S2 corresponding to the result of determination. The quantizer control circuit 353 controls the quantizer circuit 348 to reduce the differential "A" in order to quantize the input pixel Y13. That is, control is provided so as to allow the output of such a quantization value as to reduce the effects of the quantization error in the third hierarchy on the second hierarchy.

That is, the quantization value of the pixel $Y_{13}$ finally output from the quantizer circuit 348 has not been quantized according to the distortion minimization norm described above (that is, in such a way that the quantization error will be minimum relative to the input pixel) but so as to reduce the differential "A" (that is, to reduce the effects of the quantization error in the third hierarchy). If, for example, the pixel $Y_{13}$ is at the level L1 shown in FIG. 19, the quantization value "3" is output according to the distortion minimization norm, but according to this eleventh embodiment, a quantization value other than "3", for example, "2" may be output due to the control of the quantizer control circuit 348.

Next, in step SP6, the quantizer circuit 353 calculates the differential between the differential "A" and the second largest absolute value of the quantization error values $E(Y_{13})$, $E(Y_{31})$, and $E(Y_{33})$. If, for example, $E(Y_{31})$ has the second largest absolute value, "B=A−E(Y31)" is calculated.

In the subsequent step SP7, the polarity and magnitude of the differential "B" are determined. As a result, in step SP8, the quantizer control circuit 353 transmits to the quantizer circuit 348 the quantizer control signal S2 corresponding to the result of determination. The quantizer control circuit 353 controls the quantizer circuit 348 to reduce the differential B in order to quantize the input pixel Y31. That is, control is provided so as to allow the output of such a quantization value as to reduce the effects of the quantization error in the third hierarchy on the second hierarchy. That is, as described above, the quantization value of the pixel Y31 finally output from the quantizer circuit 348 has not been quantized according to the distortion minimization norm described above (that is, in such a way that the quantization error will be minimum relative to the input pixel) but so as to reduce the differential "B" (that is, so as to reduce the effects of the quantization error in the third hierarchy on the second hierarchy).

Next, in step SP9, the quantizer control circuit 353 calculates the differential between the differential "B" and the smallest absolute value of the quantization error values $E(Y_{13})$, $E(Y_{31})$, and $E(Y_{33})$. If, for example, $E(Y_{33})$ has the smallest absolute value, "C=B−E(Y33)" is calculated.

In the subsequent step SP10, the polarity and magnitude of the differential "C" are determined. As a result, in step SP11, the quantizer control circuit 353 transmits to the quantizer circuit 348 the quantizer control signal S2 corresponding to the result of determination. The quantizer control circuit 353 controls the quantizer circuit 348 to reduce the differential "B" in order to quantize the input pixel $Y_{31}$. That is, control is provided so as to allow the output of such a quantization value as to reduce the effects of the quantization error in the third hierarchy on the second hierarchy. That is, as described above, the quantization value of the pixel $Y_{33}$ finally output from the quantizer circuit 348 has not been quantized according to the distortion minimization norm described above (that is, in such a way that the quantization error will be minimum relative to the input pixel) but so as to reduce the differential "C" (that is, so as to reduce the effects of the quantization error in the third hierarchy).

As a result, the values obtained in the order of steps SP3, SP6, and SP9 ideally gradually decreases. In step SP12, the quantizer control circuit 53 finishes the quantizer control procedure for the second hierarchy pixels $Y_{13}$, $Y_{31}$, and $Y_{33}$ spatially corresponding to the third hierarchy pixel $Z_{11}$.

The quantizer control circuit 353 carries out this processing for the second hierarchy pixels spatially corresponding to the respective third hierarchy pixels $Z_{11}$, $Z_{15}$, . . . . As a result, the quantizer circuit 348 outputs a quantization output value D344 to the quantizer circuit 48 and to the inverse quantizer circuit 51 as new re-quantization data D339. The inverse quantizer circuit 55 decodes the new quantization data D339 to supply decoded data to the quantizer control circuit 353 as new decoded data D345. The quantizer control circuit 353 calculates the differential between the second hierarchy decoded data D345 obtained from the inverse quantizer circuit 351 and the second hierarchy image data (the true value) obtained from the blocking circuit 344 in order to determine a new quantization error value for the second hierarchy.

Figure 21:
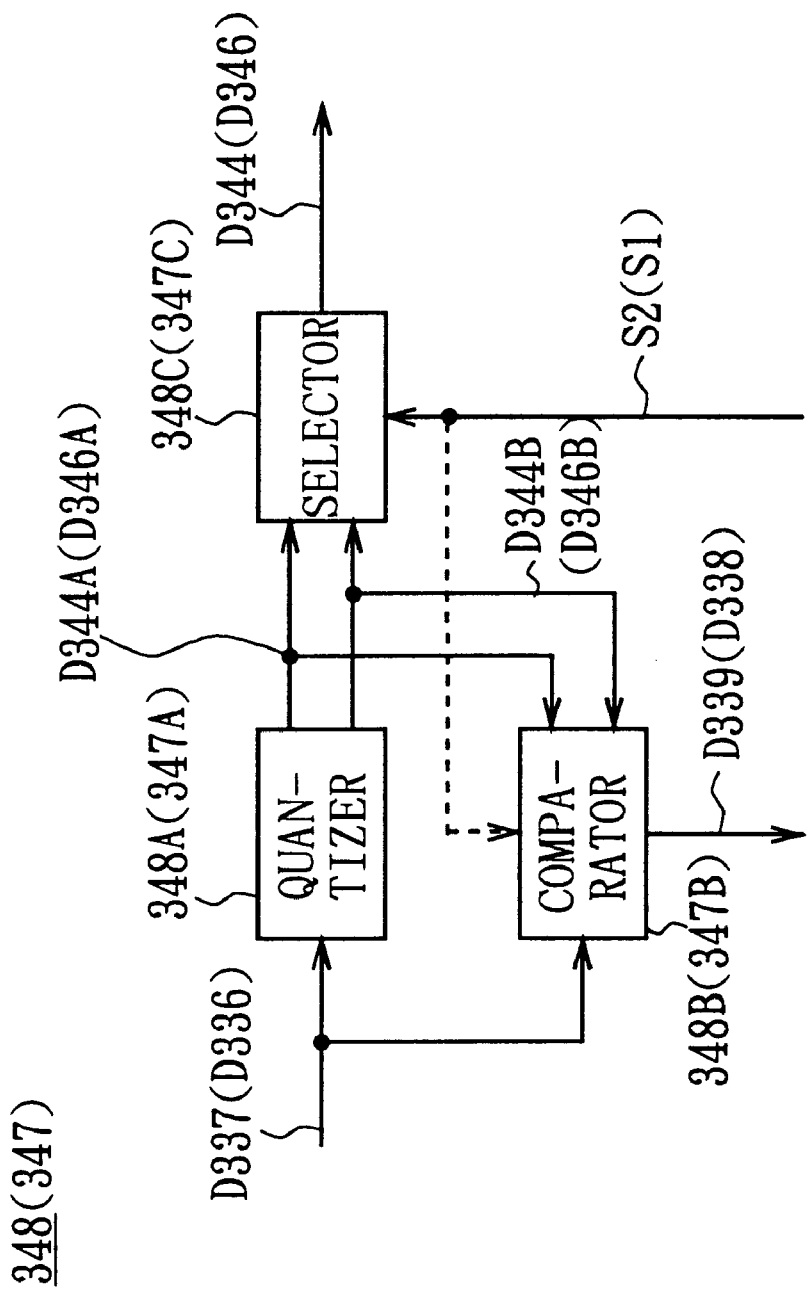
FIG. 21 is a block diagram showing the configuration of a quantizer according to the eleventh, the twelfth, and the thirteenth embodiments.

The quantizer control circuit 353 uses the new second hierarchy quantization error value and the first hierarchy quantization error value that has been obtained from the decoded data D341 and the first hierarchy image data D332 in order to provide quantizer control between the first hierarchy and the second hierarchy based on a quantization procedure similar to the one shown in FIG. 21, thereby controlling the quantization characteristics of the first hierarchy quantizer circuit 347 for each input pixel. The quantizer circuit 347 then outputs as re-quantized data D346 new re-quantized data obtained under the control of the quantizer control circuit 353.

Re-quantized data D346, D344, and D340 output from the quantizer circuits 347, 348, and 349 is supplied to variable length coding circuits (VLC) 354, 355, and 356. The variable length coding circuits 354 to 356 each assign a shorter Hoffman code to a more frequently-generated quantization code in the re-quantized data D346, D344, and D340 to form first hierarchy coded data D347, second hierarchy coded data D348, and third hierarchy coded data D349 which represent the re-quantized data D346, D344, and D340, respectively, using as small amount of codes as possible, and send these data D347, D348, and D349 out to a transmission format conversion circuit 357.

The transmission format conversion circuit 357 forms transmit image data D350 by arranging the first hierarchy coded data D347, the second hierarchy coded data D348, and the third hierarchy coded data D349 in a specified order or providing identification codes for identifying the hierarchy of each coded data, and outputs the data D350. The output transmit image data D350 is subsequently supplied to the receiver via a communication path 358 or recorded on a recording medium 359 such as a disc, a tape, or a semiconductor memory via a recording path.

A video signal decoder for decoding the transmit image data D350 formed in this manner can be configured, for example, as shown in FIG. 5 described above.

As described above, the video signal encoding apparatus 340 according to the eleventh embodiment of this invention uses the average value of a plurality of lower hierarchy pixels to generate higher hierarchy pixels in order to produce image data D331, D333, and D335 for the plurality of hierarchies.

In addition, for image data in those hierarchies other than the top hierarchy, that is, the third hierarchy, the video signal encoding apparatus 340 excludes one of the pixels used in the same averaging operation because it can be recovered by the decoder using a simple mathematics operation. Consequently, the video signal encoding apparatus 340 can implement hierarchical coding processing without an increase in the number of pixels to be transmitted due to the hierarchical structure.

Next, an example of the configuration of the quantizer circuit according to the eleventh embodiment is described.

According to one embodiment, the quantizer circuit 348 is generally configured, for example, as shown in FIG. 21. The quantizer circuit 347 has a constitution similar to that of the quantizer circuit 348 except for the path shown by the dotted line in FIG. 21. Thus, the quantizer circuit 348 is explained below, and the description of the quantizer circuit 347 is omitted. The quantizer circuit 348 inputs thinned-out data D337 to a quantization section 348A, which then quantizes the data D337 composed of eight bits per pixel.

In this case, if, for example, the thinned-out data D337, which has been input, is at the level L1 shown in FIG. 19, the quantization section 348A outputs as quantization outputs D344A and D344B, the quantization value "3" that is more positive than the truth value and the quantization value "2" that is more negative than the truth value, respectively.

The quantization outputs D344A and D344B are each supplied to a selector 348C and a comparison section 348A. The comparison section 348B inverse-quantizes the quantization outputs D344A and D344B and compares each of them to the truth value (the thinned-out data D37). One of the quantization outputs D334A and D334B which includes a smaller error (quantization error) is supplied to the inverse quantizer circuit 51 (FIG. 18) as the re-quantized data D39. That is, the processing by the quantization section 348A and the comparison section 348A is equivalent to the quantization according to the distortion minimization norm. Consequently, the results of quantization (re-quantized data D339) are sent to the quantizer control circuit 353 via the inverse quantizer circuit 351.

The inputs 344A and 344B are supplied to the selector 348C. The quantizer control signal S2 is also provided to the selector 48C (348C) as a switch signal. The quantization signal S2 selects either the quantization output D344A or D344B so as to output a quantization value that reduces quantization errors between hierarchies (in this case, quantization errors between the third hierarchy and the second hierarchy). Thus, based on the quantizer control signal S2, either the quantization output D344A or D344B is selectively output as the re-quantized data D344.

The quantizer control signal S2 is supplied to the comparison section 348B. The comparison section 348A also outputs as the re-quantized data D339, the same quantization value as selected by the selector 348C because it is used to generate the first hierarchy re-quantized data D346. Thus, this constitution is not included in the quantizer 347.

Although this embodiment provides two quantization values one of which is selected on the basis of the quantizer control signal from the quantizer control circuit 353, this invention is not limited to this aspect and more than two quantization values can be used. In this case, the quantization section may be directly controlled without using the selectors.

Furthermore, an example of the determination step taken by the quantizer control circuit according to the eleventh embodiment is described in detail. The quantizer control circuit 353 provides that same control to the quantizer circuits 348 and 347, the control of the quantizer circuit 347 is omitted. The determination step SP4 is carried out based on the polarity and magnitude of differentials. That is, the determination step SP4 compares the polarity and magnitude of the differentials "A" and $E(Z_{11})$ to generate the quantizer control signal S2 such that the quantizer 348 outputs as the output D344 a quantization value that makes the differential "A" smaller than the differential $E(Z_{11})$ multiplied by four and closer to zero.

In addition, the determination step SP7 compares the polarity and magnitude of the differentials "B" and "A" to generate the quantizer control signal S2 such that the quantizer 348 outputs as the output D344 a quantization value that makes the differential "B" smaller than the differential "A" and closer to zero. In this embodiment, however, due to the provision of only two quantization values, the differential "B" may not be smaller than the differential "A" depending on the result of the determination step SP4. In this case, the quantizer control circuit outputs a quantizer control signal S2 that allows a quantization value to be selected according to the distortion minimization norm.

Furthermore, the determination step SP7 compares the polarity and magnitude of the differentials "C" and "B" to generate the quantizer control signal S2 such that the quantizer 348 outputs as the output D344 a quantization value that makes the differential "C" smaller than the differential "B" and closer to zero. In this embodiment, however, due to the provision of only two quantization values, the differential "C" may not be smaller than the differential "B" depending on the results of the determination steps SP4 and/or SP7. In this case, the quantizer control circuit outputs a quantizer control signal S2 that allows a quantization value to be selected according to the distortion minimization norm.

The quantizer control circuit 353 is only an example, and may have any configuration as long as it implements a method that modifies quantization values in the descending order of the magnitude of the quantization error until the quantization error relative to a higher hierarchy becomes close to zero. In addition, although this embodiment modifies quantization errors in the descending order of the quantization error relative to the input pixel, the quantization error between a higher hierarchy and three pixels in a lower hierarchy may be first determined, and based on the result, the quantization value for each hierarchy comprehensively determined.

As in the above embodiments, the video signal coding apparatus 340 uses the quantizer circuits 347 to 349 to re-quantize image data in each hierarchy in order to compress the data in each hierarchy. As a result, the re-quantized data D346, D344, and D340 each necessarily include a quantization error occurring during re-quantization. As the quantization error becomes larger, decoded image data D363, D361, and D359 have a larger difference from the true values, thereby degrading image quality.

That is, the decoded pixel value $Y_{11}'$ is affected by the quadruple value of the quantization error in $Z_{11}$. In addition, the decoded pixel values $X_{13}'$, $X_{31}'$ and $X_{33}'$ are affected by the quadruple values of the quantization errors in $Y_{13}$, $Y_{31}$, and $Y_{33}$. Furthermore, the decoded pixel values $X_{11}'$ is affected by the quadruple values in the quantization errors in $Y_{13}$, $Y_{31}$, and $Y_{33}$ and the value sixteen times as large as the quantization error in $Z_{11}$.

The magnitude of the effects of the quantization errors $E(Z_{11})$, $E(Y_{13})$, $E(Y_{31})$, . . . on the decoded image values $Z_{11}'$, $Y_{11}'$, $Y_{13}'$, . . . are shown in FIG. 6 described above, and as in apparent from this figure, quantization errors in a higher hierarchy significantly affect decoded values in a lower hierarchy.

The eleventh embodiment thus controls the quantization characteristics used for a lower hierarchy taking into consideration quantization errors propagated from a higher hierarchy to the lower hierarchy decoding, thereby compensating for possible quantization errors in the higher hierarchy to reduce the degradation of image quality during decoding. For example, in the equation (7) described above, the decoded value $Y_{11}'$ of the pixel $Y_{11}$ has an error equivalent to $4 \times E(Z_{11})-E(Y_{13})-E(Y_{31})-E(Y_{33})$, but the use of the quantizer control procedure described in FIG. 20 enables quantization to be carried out in such a way as to minimize this error.

This eliminates possible impulse-like noises in the first hierarchy (corresponding to pixel values generated by the image generation circuit 71) to obtain good recovered images without significant degradation of image quality.

Likewise, in the equation (10) described above, the decoded value $X_{11}'$ of the pixel $X_{11}$ has an error equivalent to $4 \times E(Y_{11}) - E(X_{12}) - E(X_{21}) - E(X_{22})$, but quantizer control similar to the quantizer control procedure described in FIG. 20 can be provided between the second hierarchy and the first hierarchy to minimize this error. This also eliminates possible impulse-like noises in the first hierarchy to obtain good recovered images.

The above configuration prevents the transmission of the pixel data $Y_{11}, Y_{15}, \ldots, X_{11}, X_{13}, \ldots$ corresponding to one of a plurality of lower hierarchy pixels used in the same averaging operation to generate one pixel for a higher hierarchy, and controls the quantization characteristics used in quantizing the lower hierarchy pixels spatially corresponding to higher hierarchy pixels so as to compensate for possible quantization errors taking into consideration the propagation of quantization errors from the higher hierarchy pixels during decoding, thereby enabling the amount of transmitted image information to be reduced to improve image efficiency and also reducing possible errors relative to the true values when those pixels which have not been transmitted are decoded in order to reduce the degradation of image quality.

(12) Twelfth Embodiment

Figure 22:
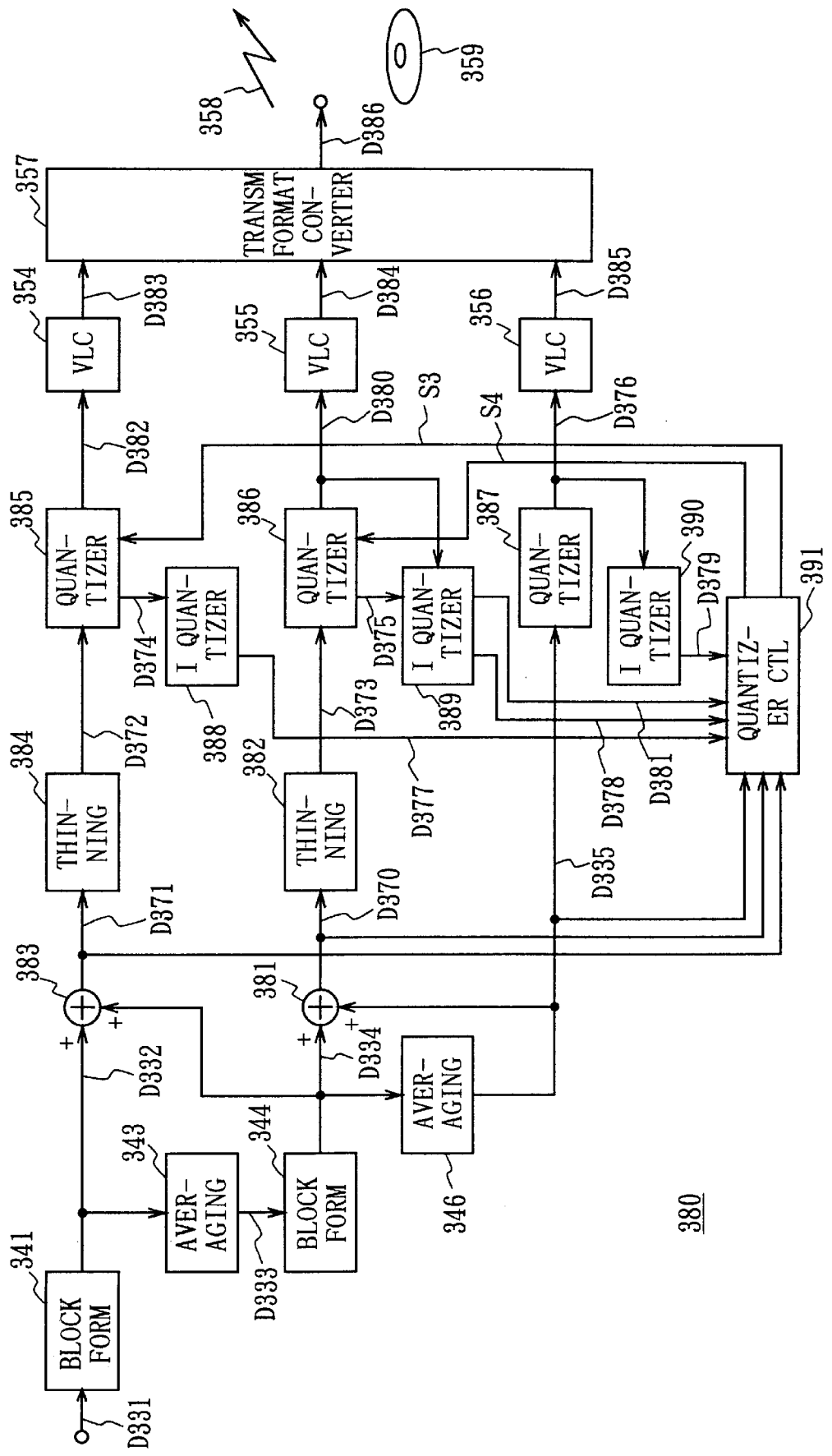
FIG. 22 is a block diagram showing the configuration of a video signal encoding apparatus according to the twelfth embodiment.

FIG. 22 generally shows a video signal encoding apparatus 380 according to an twelfth embodiment of this invention. Compared to the eleventh embodiment, this apparatus has the same configuration as the video signal encoding apparatus 340 in FIG. 21 except that the differential data between hierarchies is compressed and coded except for the top hierarchy. Thus, the same components as in FIG. 21 has the same reference numerals.

While the video signal encoding apparatus 340 according to the eleventh embodiment transmits each pixel using the pulse code modulation (PCM), the video signal encoding apparatus 380 according to the twelfth embodiment transmits each pixel using the differential pulse code modulation (DPCM). Thus, the video signal encoding apparatus 380 can further reduce the amount of information to be transmitted.

Specifically, the video signal encoding apparatus 380 supplies the third hierarchy image data D335 and the second hierarchy blocked data D334 to a differential circuit 381. The differential circuit 181 then calculates the differential between a pixel in the third hierarchy image data D335 and the spatially corresponding pixels in the second hierarchy blocked data D334 to form second hierarchy differential data D370, and sends this data D370 to a thinning circuit 382. In this case, the differential circuit 381 determines the differential values $\Delta Y_{13}, \Delta Y_{31}$, and $\Delta Y_{33}$ of the second hierarchy pixels $Y_{13}, Y_{31}$, and $Y_{33}$ as described in the equation (11), using the higher hierarchy pixel $Z_{11}$ corresponding to these pixels.

The video signal encoding apparatus 380 similarly supplies the second hierarchy image data D334 and the first hierarchy blocked data D332 to a differential circuit 383. The differential circuit 383 then calculates the differential between pixels in the second hierarchy image data D334 and the spatially corresponding pixels in the first hierarchy blocked data D332 to form first hierarchy differential data D371, and sends this data D371 to a thinning circuit 384. In this case, the differential circuit 383 determines the differential values $\Delta X_{12}, \Delta X_{21}$, and $\Delta X_{22}$ of the first hierarchy pixels $X_{12}, X_{21}$, and $X_{22}$ as described in the equation (12), using the higher hierarchy pixel $Y_{11}$ corresponding to these pixels.

The thinning circuits 384 and 382 receive the blocked data D332 and D334 from the blocking circuit 342 and the blocked data D344, respectively, as in the thinning circuits 142 and 145 shown in FIG. 10. The thinning circuits 184 and 182 remove one pixel from the first and second hierarchy differential data D371 and D370, respectively, including four pixels in each block so as to correspond to the blocked data D332 and D334 composed of four pixels, respectively. The thinning circuits 384 and 382 thus form hierarchical differential thinned-out data D372 and D373 composed of the three remaining pixels, and transmit the hierarchical differential thinned-out data D372 and D373 to quantizer circuits 385 and 386, respectively.

The quantizer circuits 385, 386, and 387 quantize each pixel data (8 bits) in the first hierarchy differential thinned-out data D373, the second hierarchy differential thinned-out data D372, and the third image data D335 according to the distortion minimization norm to generate re-quantized data D375, D376, and D377 composed of two bits. The re-quantized data D375, D376, and D377 is transmitted to the inverse re-quantizer circuits 388, 389, and 390, respectively. The inverse quantizer circuits 388, 389, and 390 executes inverse quantization to convert the re-quantized data D374, D375, and D376 back into eight bits in order to generate decoded data D377, D378, and D379 and sends these data D377, D378, and D379 to the quantizer control circuit 391.

The first hierarchy differential data D371, the second hierarchy differential data D370, and the third image data D335 is supplied to the quantizer control circuit 391. As in the eleventh embodiment, the quantizer control circuit 391 compares the value of the decoded data obtained from the inverse quantizer circuits 388 to 390 to the values of the first and second hierarchy differential data D371 and D370 and the third hierarchy image data in order to determine quantization error values. Depending on the quantization error values, the quantizer control circuit 391 outputs quantizer control signals S303 and S304 to control the quantization by the first and second hierarchy quantizer circuits 385 and 386.

As in the eleventh embodiment, quantization is controlled by determining the quantization error value of the third hierarchy pixel and then determining the quantization error value of the second hierarchy pixel spatially corresponding to the third hierarchy pixel. The quantization error values determined in the second hierarchy are then arranged in the descending order of their absolute values, and the differential between each of the quantization error values and the spatially corresponding third hierarchy pixel is sequentially determined according to this order. In this case, the quantization of each pixel in the second hierarchy quantization circuit 386 is controlled so as to sequentially reduce the result of subtraction.

Quantization control is executed as described above to allow the inverse quantizer circuit 389 to decode new re-quantized data D380 output from the second hierarchy quantizer circuit 386 and to output the decoded data to the quantizer control circuit 391 as decoded data D381. The quantizer control circuit 391 executes quantizer control similar to the one between the third hierarchy and the second hierarchy described above using the quantization error values between the new second hierarchy differential decoded data D381 received from the inverse quantizer circuit 389 and the second differential data obtained from the second hierarchy differential decoded data D381 and the second hierarchy differential data D370, thereby controlling the quantization characteristics of the first hierarchy quantizer circuit 385 for each input pixel.

The quantizer control circuit 391 controls the quantizer circuits 385 and 386 in such a manner that the quantization step width becomes smaller around zero so as to apply re-quantization for smaller quantization errors to the hierarchical differential thinned-out data D372 and D373 in which the data concentrates around zero.

The re-quantized data D382, D380, and D376 thus obtained by the quantizer circuits 385, 386, and 387, respectively, is variable-length-coded by the variable length coding circuits (VLCs) 354, 355, and 356 and output as the first, second, and third hierarchy coded data D377, D378, and D379. The first, second, and third hierarchy coded data D377, D378, and D379 is then input to the transmission format conversion circuit 357. The transmission format conversion circuit 353 forms and outputs transmit image data D386. The output transmit image data D386 is subsequently supplied to the receiver via a communication path 358 or recorded on a recording medium 359 such as a disc, a tape, or a semiconductor memory via a recording path.

A video signal decoder for decoding the transmit image data D386 formed in this manner can be configured as shown in FIG. 8.

The video signal encoding apparatus 380 according to the twelfth embodiment transmits hierarchical differential data between hierarchies as transmit data except for top hierarchy data, as in the second embodiment. That is, the equation (7) described above has a multiplication coefficient of "4" for the quantization error $E(Z_{11})$ of the third hierarchy pixel $Z_{11}$, whereas the equation (19) described above has a multiplication coefficient of "2" for the same error $E(Z_{11})$. This means that the coding and decoding according to the fifth embodiment can reduce the effects of quantization errors in third hierarchy pixels on the decoding of second hierarchy pixels to half. That is, as is apparent from the equations (18) and (19), since the differential between hierarchies is calculated, the quantization error in the third hierarchy pixel $Z_{11}$ is reflected in all the second hierarchy decoded pixel values $Y_{11}'$, $Y_{13}'$, $Y_{31}'$, and $Y_{33}'$. This embodiment can thus reduce the effects of quantization errors in third hierarchy pixels on the decoding of second hierarchy pixels.

In addition, as described above, the eleventh embodiment does not generate differential data between hierarchies. The decoded value $X_{11}'$ of the first hierarchy pixel $X_{11}$ is affected by the quadruple value of the quantization error in $Z_{11}$. Due to the generation of differential data between hierarchies, the twelfth embodiment significantly reduces the effects of the quantization error in $Y_{11}$ on the decoded value $X_{11}'$ compared to the fourth embodiment.

That is, the eleventh embodiment reflects the quantization error in the second hierarchy pixel $Y_{11}$ only in the first hierarchy decoded pixel value $X_{11}'$ and not in the first hierarchy decoded pixels $X_{12}'$, $X_{21}'$, and $X_{22}'$.

According to the twelfth embodiment, however, since the differential between hierarchies is calculated, the quantization error in the second hierarchy pixel $Y_{11}$ is reflected in the first hierarchy decoded pixels $X_{11}'$, $X_{12}'$, $X_{21}'$, and $Y_{22}'$. This embodiment can thus reduce the effects of quantization errors in second hierarchy pixels on the decoding of first hierarchy pixels.

Consequently, compared to the eleventh embodiment, the video signal decoder can recover pixels thinned out by the video signal encoding apparatus 380 so as to have values close to the true ones, thereby obtaining good recovered images with a small amount of impulse-like noises.

Thus, according to the video signal encoding apparatus in accordance with the twelfth embodiment, the video signal coding apparatus 380 for generating hierarchical differential data between the image data in each of a plurality of hierarchies obtained from the input image data D331 through the averaging operation and the data in the adjacent higher hierarchy and quantizing the top hierarchy data D335 and the plurality of differential data between hierarchies D372 and D373 to generate a plurality of hierarchical coded data, prevents the transmission of the differential pixel data $\Delta Y_{11}, \Delta Y_{15}, \ldots, \Delta X_{11}, \Delta X_{13}, \ldots$ which can be decoded by a mathematics operation using pixels in a hierarchy different from the top hierarchy and the corresponding pixels in the adjacent lower hierarchy, and taking into consideration the effects of quantization errors in higher hierarchy pixels on lower hierarchy decoded values, controls the quantization characteristics used in quantizing lower hierarchy pixels spatially corresponding to a specific higher hierarchy pixel in such a way that the quantization errors will be compensated for, thereby not only providing the effects of the eleventh embodiment but also further improving compression coding efficiency and reducing the degradation of image quality.

(13) Thirteenth Embodiment

Figure 23:
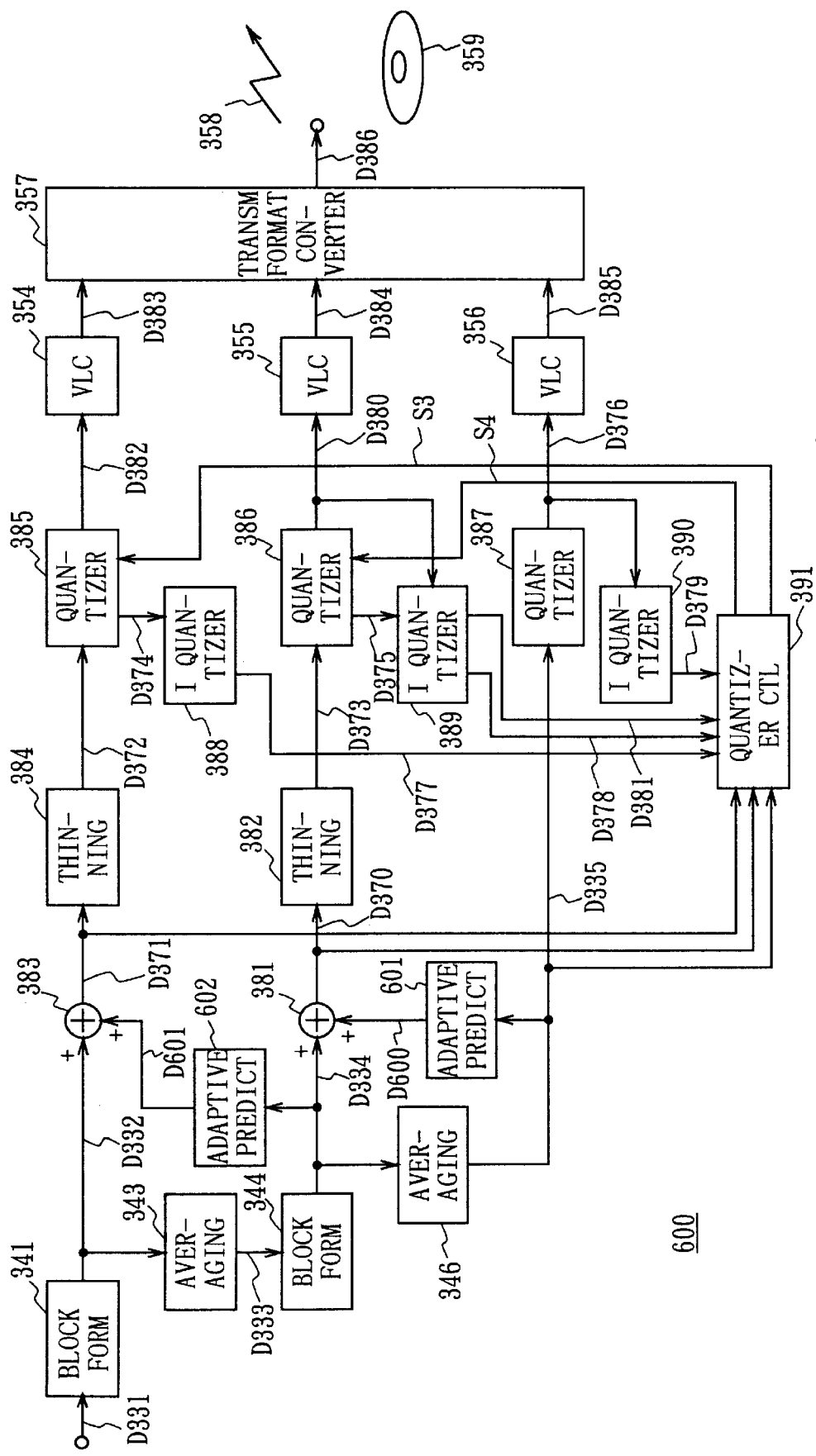
FIG. 23 is a block diagram showing the configuration of a video signal encoding apparatus according to the thirteenth embodiment.

FIG. 23 generally shows a video signal encoding apparatus 600 according to a thirteenth embodiment. Compared to the twelfth embodiment, the video signal encoding apparatus 600 has a configuration similar to that of the video signal coding apparatus 380 according to the twelfth embodiment except for adaptive prediction circuits 601 and 602. Thus, the same components as in FIG. 22 have the same reference numerals.

The adaptive prediction circuit 601 executes predetermined prediction processing based on the third hierarchy image data D335 to generate second hierarchy predicted data D600 corresponding to the second hierarchy image data D334. The second hierarchy predicted data is then sent out to the differential circuit 381. Likewise, the adaptive prediction circuit 602 executes predetermined prediction processing based on the second hierarchy image data D334 to generate first hierarchy predicted data D601 corresponding to the first hierarchy image data D332. The first hierarchy predicted data is then sent out to the differential circuit 383.

In effect, the adaptive prediction circuits 601 and 602 utilize classification-adaptive processing to predict one lower hierarchy pixel from a plurality of higher hierarchy pixels. Specifically, the lower hierarchy pixel to be predicted is classified on the basis of the level distribution of a plurality of higher hierarchy pixels located spatially near the lower hierarchy pixel. In addition, the adaptive prediction circuits 601 and 602 have a memory that stores a plurality of prediction coefficients or one predicted value for each class which have been obtained through learning, and reads from this memory the plurality of prediction coefficients or one predicted value corresponding to the class determined through classification. The predicted value is directly used as a predicted pixel, while the prediction coefficients are linearly primarily combined with the plurality of pixels to generate a predicted value. If the predicted value is normalized, it is subjected to predetermined processing to generate a predicted pixel. The details of such classification-adaptive processing are described in U.S. patent application Ser. No. 08/504,040. In addition, algorithms for such classification-adaptive processing have been known. Although the classification-adaptive processing algorithm has been used in the adaptive prediction circuit according to thirteenth embodiment, this invention is not limited to this aspect and other current prediction methods may be used.

As described above, the video signal encoding apparatus 600 according to the thirteenth embodiment can further reduce the differential between the first hierarchy differential data D371 and the second hierarchy differential data D370 obtained from the differential circuits 383 and 381, respectively, in order to further improve compression coding efficiency, thereby further reducing the amount of information to be transmitted.

Although the eleventh, twelfth, and thirteenth embodiments have been described with the quantization characteristics with which lower hierarchy image data is sequentially quantized so as to compensate for quantization errors occurring when higher image data has been quantized, this invention is not limited to this aspect, but the quantization characteristics used in quantizing higher hierarchy image data may be controlled so as to compensate for quantization errors occurring when lower image data has been quantized.

Furthermore, the image data in all the hierarchies may be quantized and locally decoded to simultaneously determine the quantization characteristics of all the quantizer circuits from the differences between the locally decoded values in all the hierarchies and the true values in such a way that the propagation of quantization errors will be minimized during decoding. That is, taking into consideration the propagation of quantization errors occurring when recovering image data that has been removed through thinning, the quantization characteristics used for each pixel data may be controlled in such a manner that the effects of propagated quantization errors will be generally minimized.

In addition, although the eleventh to thirteenth embodiments have been described with the quantization in which the polarity of quantization errors in adjacent image data is alternatively inverted, the quantizer circuits in higher hierarchies may execute finer quantization with a larger number of quantization bits (a smaller quantization width). This further reduces the degradation of image quality during decoding. This is because the quantization errors in a higher hierarchy affect the lower hierarchy during decoding, as described above. In addition, the effects of quantization errors in a higher hierarchy on a lower hierarchy are related to the number of hierarchies starting from the bottom hierarchy and the number of pixels used to generate top hierarchy pixels. Thus, the number of quantization bits or the quantization width may be determined according to these points.

In addition, as described above, the eleventh to thirteenth embodiments of this invention exclude from the pixel data in each hierarchy except the top hierarchy with the lowest resolution, those pixels which can be recovered using the pixel data in one hierarchy and in the adjacent higher hierarchy, and taking into consideration the effects of the propagation of quantization errors occurring when recovering pixel data that has been removed through thinning during decoding, control the quantization characteristics used for each pixel data in such a way that the effects of the quantization errors will be reduced, thereby implementing hierarchical coding with compression coding efficiency improved and the degradation of image quality reduced.

(4) Other Embodiments

Although the above embodiments have been described with the generation, compression-coding, and transmission of the hierarchical image data D31, D34, and D35 in the three hierarchies, this invention is not limited to this aspect but is applicable to the case in which the average operation is repeated to generate four or five hierarchies of image data and in which the data is then compression-coded by quantizing and transmitted.

In addition, although the above embodiments have been a described in conjunction with the generation of one higher hierarchy pixel by the averaging operation using four lower hierarchy pixels, this invention is not limited to this aspect, and hierarchical image data may be generated by using the averaging operation with, for example, six or more lower hierarchical pixels to generate one higher hierarchy pixel.

In addition, although the above embodiments have been described in conjunction with the quantizers that are all linear, this invention is not limited to this aspect but is applicable to non-linear or adaptive quantization or dynamic range-compatible applied quantization.

Furthermore, although the embodiments of this invention are implemented as hardware using the block diagrams, this invention is not limited to this aspect but can be implemented as software using a CPU and a memory.

Various variations and modifications are conceivable without deviating from the spirits of this invention. Therefore, this invention is not limited to the embodiments.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A video signal encoding method for generating from input image data a plurality of hierarchical image data with different resolutions to encode each of the hierarchical image data, comprising:

a step for averaging a plurality of pixel values in each hierarchical image data to form higher hierarchy image data;

a step for excluding from the pixel data in each hierarchy other than the top hierarchy with the lowest resolution, pixel data corresponding to one of a plurality of lower hierarchy pixels used in the same averaging operation to generate one pixel for a higher hierarchy in order to form thinned-out data formed of the remaining pixels; and a quantization step for compression-coding each of the top hierarchy image data and the thinned-out data in respective hierarchies except said top hierarchy to generate a plurality of hierarchical coded data, wherein: said quantization step quantizes the data in higher hierarchies more finely.

2. The video signal encoding method according to claim 1 wherein said quantization step quantizes each of said hierarchical image data taking into consideration the degree of the effects of quantization errors in a higher hierarchy on decoded pixel values when lower hierarchy image data is decoded.

3. The video signal encoding method according to claim 1 wherein said quantization step quantizes each of said hierarchical image data depending on the number of stages starting from the lowest hierarchy with the highest resolution and/or the number of pixels used to generate a higher hierarchy.

4. A video signal encoding method for generating from input image data a plurality of hierarchical image data with different resolutions to encode each of the hierarchical image data, comprising:

a step for averaging a plurality of image values in each hierarchical image data to form higher hierarchy image data;

a step for calculating the differential between each hierarchical image data other than the top hierarchy with the lowest resolution and the image data in the adjacent higher hierarchy to form hierarchical differential data;

a step for excluding from said hierarchical differential data in each hierarchy, differential pixel data that is recovered by a mathematics operation using the differential data in one hierarchy and in the adjacent higher hierarchy in order to form thinned-out data formed of the remaining pixels; and a quantization step for compression-coding each of the top hierarchy image data and the thinned-out data in respective hierarchies except said top hierarchy to generate a plurality of hierarchical coded data, wherein: said quantization step quantizes the data in higher hierarchies more finely.

5. The video signal encoding method according to claim 4 wherein said quantization step quantizes each of said hierarchical image data taking into consideration the degree of the effects of quantization errors in a higher hierarchy on decoded pixel values when lower hierarchy differential data is decoded.

6. The video signal encoding method according to claim 5 wherein said step for calculating said hierarchical differential data forms said hierarchical differential data by calculating the differential between each of said hierarchical image data and the image data in the adjacent lower hierarchy predictively generated by a predetermined mathematics operation using said image data in the adjacent higher hierarchy.

7. The video signal encoding method according to claim 4 wherein said quantization step quantizes each of said hierarchical image data depending on the number of stages starting from the lowest hierarchy with the highest resolution and/or the number of pixels used to generate a higher hierarchy.

8. The video signal encoding method according to claim 4 wherein said step for calculating said hierarchical differential data forms said hierarchical differential data by calculating the differential between each of said hierarchical image data and the image data in the adjacent lower hierarchy predictively generated by a predetermined mathematics operation using said image data in the adjacent higher hierarchy.

9. A video signal encoding apparatus for generating from input image data a plurality of hierarchical image data with different resolutions to encode each of the hierarchical image data, comprising:

a unit for averaging a plurality of pixel values in each hierarchical image data to form higher hierarchy image data;

a unit for excluding from the pixel data in each hierarchy other than the top hierarchy with the lowest resolution, pixel data corresponding to one of a plurality of lower hierarchy pixels used in the same averaging operation to generate one pixel for a higher hierarchy in order to form thinned-out data formed of the remaining pixels; and a quantization unit for compression-coding each of the top hierarchy image data and the thinned-out data in respective hierarchies except said top hierarchy to generate a plurality of hierarchical coded data, wherein: said quantization unit quantizes the data in higher hierarchies more finely.

10. The video signal encoding apparatus according to claim 9 wherein said quantization unit quantizes each of said hierarchical image data taking into consideration the degree of the effects of quantization errors in a higher hierarchy on decoded pixel values when lower hierarchy image data is decoded.

11. The video signal encoding apparatus according to claim 9 wherein said quantization unit quantizes each of said hierarchical image data depending on the number of stages starting from the lowest hierarchy with the highest resolution and/or the number of pixels used to generate a higher hierarchy.

12. A video signal encoding apparatus for generating from input image data a plurality of hierarchical image data with different resolutions to encode each of the hierarchical image data, comprising:

a unit for averaging a plurality of image values in each hierarchical image data to form higher hierarchy image data;

a unit for calculating the differential between each hierarchical image data other than the top hierarchy with the lowest resolution and the image data in the adjacent higher hierarchy to form hierarchical differential data;

a unit for excluding from said hierarchical differential data in each hierarchy, differential pixel data that is recovered by a mathematics operation using the differential data in one hierarchy and in the adjacent higher hierarchy in order to form thinned-out data formed of the remaining pixels; and a quantization unit for compression-coding each of the top hierarchy image data and the thinned-out data in respective hierarchies except said top hierarchy to generate a plurality of hierarchical coded data, wherein: said quantization unit quantizes the data in higher hierarchies more finely.

13. The video signal encoding apparatus according to claim 12 wherein said quantization unit quantizes each of said hierarchical image data taking into consideration the degree of the effects of quantization errors in a higher hierarchy on decoded pixel values when lower hierarchy differential data is decoded.

14. The video signal encoding apparatus according to claim 13 wherein said unit for calculating said hierarchical differential data forms said hierarchical differential data by calculating the differential between each of said hierarchical image data and the image data in the adjacent lower hierarchy predictively generated by a predetermined mathematics operation using said image data in the adjacent higher hierarchy.

15. The video signal encoding apparatus according to claim 12 wherein said quantization unit quantizes each of said hierarchical image data depending on the number of stages starting from the lowest hierarchy with the highest resolution and/or the number of pixels used to generate a higher hierarchy.

16. The video signal encoding apparatus according to claim 12 wherein said unit for calculating said hierarchical differential data forms said hierarchical differential data by calculating the differential between each of said hierarchical image data and the image data in the adjacent lower hierarchy predictively generated by a predetermined mathematics operation using said image data in the adjacent higher hierarchy.

17. A video signal transmitting method for generating from input image data a plurality of hierarchical image data with different resolutions to code each of the hierarchical image data and transmitting the coded data, comprising:

a step for averaging a plurality of pixel values in each hierarchical image data to form higher hierarchy image data;

a step for excluding from the pixel data in each hierarchy other than the top hierarchy with the lowest resolution, pixel data corresponding to one of a plurality of lower hierarchy pixels used in the same averaging operation to generate one pixel for a higher hierarchy in order to form thinned-out data formed of the remaining pixels;

a quantization step for compression-coding each of the top hierarchy image data and the thinned-out data in respective hierarchies except said top hierarchy to generate transmission image data; and a step for transmitting said transmission image data, wherein:

said quantization step quantizes the data in higher hierarchies more finely.

18. The video signal transmitting method according to claim 17 wherein said quantization step quantizes each of said hierarchical image data taking into consideration the degree of the effects of quantization errors in a higher hierarchy on decoded pixel values when pixel data corresponding to one of removed pixels is decoded.

19. The video signal transmitting method according to claim 17 wherein said quantization step determines the number of quantized bits in each of hierarchy depending on the number of stages starting from the lowest hierarchy with the highest resolution and/or the number of pixels used to generate a higher hierarchy.

20. A video signal transmitting method for generating from input image data a plurality of hierarchical image data with different resolutions to code each of the hierarchical image data and transmitting the coded data, comprising:

a step for averaging a plurality of image values in each hierarchical image data to form higher hierarchy image data;

a step for calculating the differential between each hierarchical image data other than the top hierarchy with the lowest resolution and the image data in the adjacent higher hierarchy to form hierarchical differential data;

a step for excluding from said hierarchical differential data in each hierarchy, differential pixel data that is recovered by a mathematics operation using the differential data in one hierarchy and in the adjacent higher hierarchy in order to form thinned-out data formed of the remaining pixels;

a quantization step for compression-coding each of the top hierarchy image data and the thinned-out data in respective hierarchies except said top hierarchy to generate a plurality of hierarchical coded data as transmission image data; and a step for transmitting said transmission image data, wherein:

said quantization step quantizes the data in higher hierarchies more finely.

21. The video signal transmitting method according to claim 20 wherein said quantization step quantizes each of said hierarchical image data taking into consideration the degree of the effects of quantization errors in a higher hierarchy on decoded pixel values when removed differential pixel data is decoded.

22. The video signal transmitting method according to claim 21 wherein said step for calculating said hierarchical differential data forms said hierarchical differential data by calculating the differential between each of said hierarchical image data and the image data in the adjacent lower hierarchy predictively generated by a predetermined mathematics operation using said image data in the adjacent higher hierarchy.

23. The video signal transmitting method according to claim 20 wherein said quantization step quantizes each of said hierarchical image data depending on the number of stages starting from the lowest hierarchy with the highest resolution and/or the number of pixels used to generate a higher hierarchy.

24. The video signal transmitting method according to claim 20 wherein said step for calculating said hierarchical differential data forms said hierarchical differential data by calculating the differential between each of said hierarchical image data and the image data in the adjacent lower hierarchy predictively generated by a predetermined mathematics operation using said image data in the adjacent higher hierarchy.

25. A recording medium that is decoded by a decoder and has a recording signal which is decoded by said decoder, wherein said recording signal is formed by:

a step for averaging a plurality of pixel values in each hierarchical image data to form higher hierarchy image data;

a step for excluding from the pixel data in each hierarchy other than the top hierarchy with the lowest resolution, pixel data corresponding to one of a plurality of lower hierarchy pixels used in the same averaging operation to generate one pixel for a higher hierarchy in order to form thinned-out data formed of the remaining pixels; and a quantization step for compression-coding each of the top hierarchy image data and the thinned-out data in respective hierarchies except said top hierarchy to generate a plurality of hierarchical coded data, wherein:

said quantization step quantizes the data in higher hierarchies more finely.

26. A recording medium that is decoded by a decoder and has a recording signal which is decoded by said decoder, wherein said recording signal is formed by:

a step for averaging a plurality of pixel values in each hierarchical image data to form higher hierarchy image data;

a step for calculating the differential between each hierarchical image data other than the top hierarchy with the lowest resolution and the image data in the adjacent higher hierarchy to form hierarchical differential data;

a step for excluding from said hierarchical differential data in each of said hierarchy, differential pixel data that is recovered by a mathematics operation using the differential data in one hierarchy and in the adjacent higher hierarchy in order to form thinned-out data formed of the remaining pixels; and a quantization step for compression-coding each of the top hierarchy image data and the thinned-out data in respective hierarchies except said top hierarchy to generate a plurality of hierarchical coded data, wherein:

said quantization step quantizes the data in higher hierarchies more finely.

* * * * *